(12) United States Patent
Isoya et al.

(10) Patent No.: US 10,697,916 B2
(45) Date of Patent: Jun. 30, 2020

(54) PHYSICAL QUANTITY DETECTION DEVICE

(71) Applicant: Hitachi Automotive Systems, Ltd., Hitachinaka-shi, Ibaraki (JP)

(72) Inventors: Yuki Isoya, Hitachinaka (JP); Hiroaki Hoshika, Hitachinaka (JP); Takayuki Yogo, Hitachinaka (JP); Takahiro Miki, Hitachinaka (JP); Takeo Hosokawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 205 days.

(21) Appl. No.: 15/741,552

(22) PCT Filed: Jul. 29, 2016

(86) PCT No.: PCT/JP2016/072252
§ 371 (c)(1),
(2) Date: Jan. 3, 2018

(87) PCT Pub. No.: WO2017/056672
PCT Pub. Date: Apr. 6, 2017

(65) Prior Publication Data
US 2018/0195984 A1 Jul. 12, 2018

(30) Foreign Application Priority Data

Sep. 30, 2015 (JP) ................. 2015-192512

(51) Int. Cl.
*G01N 25/62* (2006.01)
*F02M 35/10* (2006.01)

(52) U.S. Cl.
CPC ....... *G01N 25/62* (2013.01); *F02M 35/10393* (2013.01)

(58) Field of Classification Search
CPC ................. G01N 25/62; F02M 35/10373
(Continued)

(56) References Cited

U.S. PATENT DOCUMENTS 5,327,772 A * 7/1994 Fredricks ............... G01N 25/60
374/40
5,814,726 A * 9/1998 Mitter .................. G01N 27/223
324/664

(Continued)

FOREIGN PATENT DOCUMENTS

EP 1 965 200 A2 9/2008
JP 50-120885 A 9/1975
(Continued)

OTHER PUBLICATIONS

International Search Report (PCT/ISA/210) issued in PCT Application No. PCT/JP2016/072252 dated Dec. 6, 2016 with English translation (5 pages).
(Continued)

*Primary Examiner* — Marrit Eyassu
(74) *Attorney, Agent, or Firm* — Crowell & Moring LLP

(57) ABSTRACT

The purpose of the present invention is to enhance the detection accuracy of an absolute humidity determined from at least temperature and relative humidity when carrying out temperature control using a heating element according to detection characteristics for temperature and relative humidity. A physical quantity detection device according to the present invention is provided with a humidity sensor for detecting relative humidity and temperature, a heater for heating the humidity sensor, and a microcomputer and controls the heat generation amount of the heater by using the heater for heating and stopping heating such that an environment under measurement is at least a room temperature and is a temperature at which a relative humidity detection characteristic and temperature detection charac-
(Continued)

teristic for the humidity sensor improve, thereby enhancing the accuracy of absolute humidity detection.

4 Claims, 48 Drawing Sheets

(58) Field of Classification Search
USPC .................................................. 73/25.04
See application file for complete search history.

(56) References Cited

U.S. PATENT DOCUMENTS

| | | | | |
|---|---|---|---|---|
| 7,062,968 | B2 * | 6/2006 | Ueno | .................... F01N 3/0814 |
| | | | | 73/25.04 |
| 7,077,004 | B2 * | 7/2006 | Mitter | .................. G01N 27/223 |
| | | | | 73/29.01 |
| 7,176,700 | B2 * | 2/2007 | Itakura | ................. G01N 27/223 |
| | | | | 324/670 |
| 8,683,845 | B2 * | 4/2014 | Fleischer | ........... G01N 27/4143 |
| | | | | 73/23.21 |
| 2002/0078733 | A1 | 6/2002 | Seakins et al. | |
| 2005/0028588 | A1 * | 2/2005 | Mitter | .................. G01N 27/223 |
| | | | | 73/335.04 |

FOREIGN PATENT DOCUMENTS

| | | |
|---|---|---|
| JP | 10-10072 A | 1/1998 |
| JP | 11-142256 A | 5/1999 |
| JP | 2002-286677 A | 10/2002 |
| JP | 2014-38056 A | 2/2014 |

OTHER PUBLICATIONS

Japanese-language Written Opinion (PCT/ISA/237) issued in PCT Application No. PCT/JP2016/072252 dated Dec. 6, 2016 (4 pages).
Extended European Search Report issued in counterpart European Application No. 16850849.7 dated May 14, 2019 (eight (8) pages).

* cited by examiner

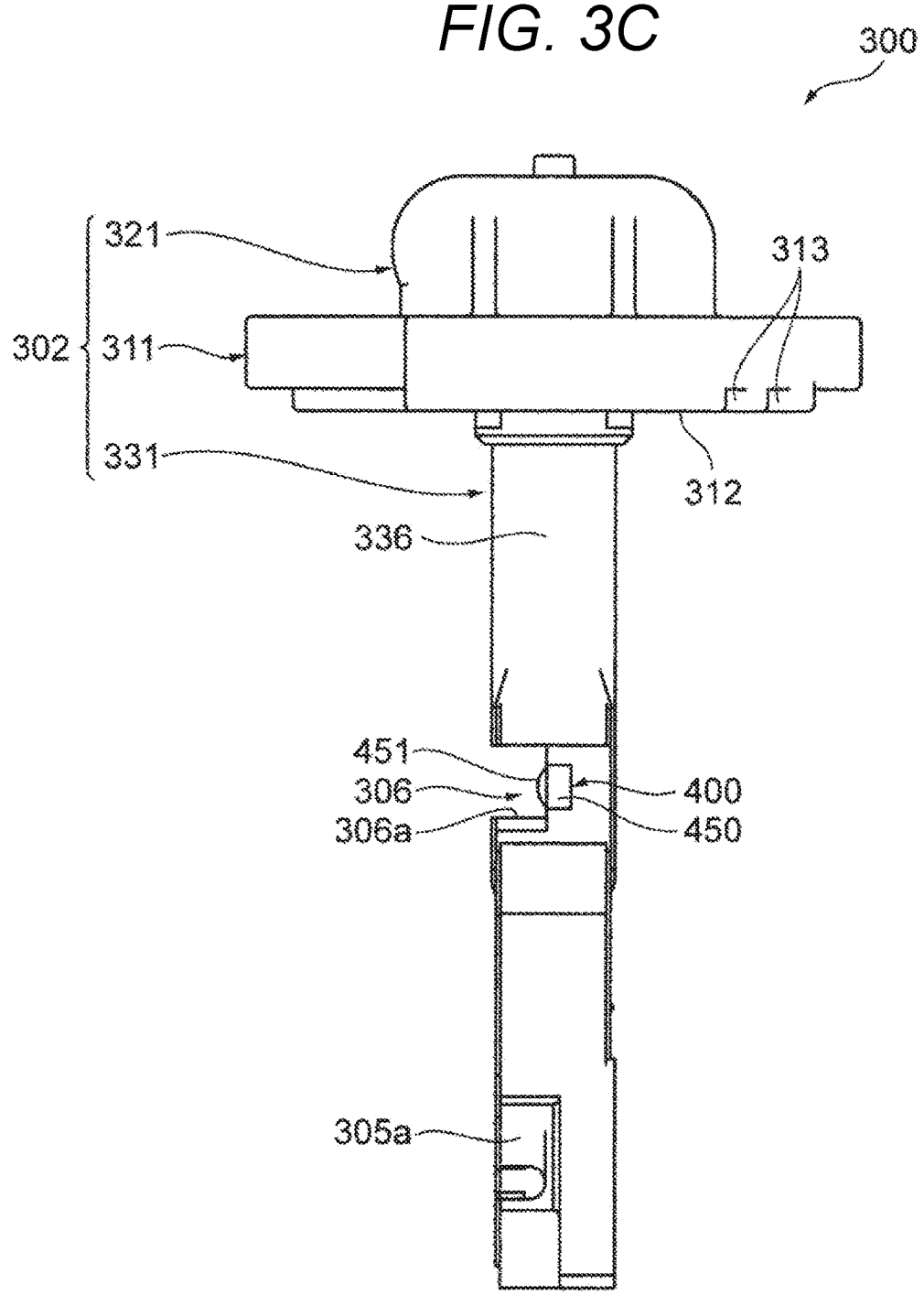

CROSS-SECTION ALONG LINE B-B

CROSS-SECTION ALONG LINE B-B

CROSS-SECTION ALONG LINE C-C

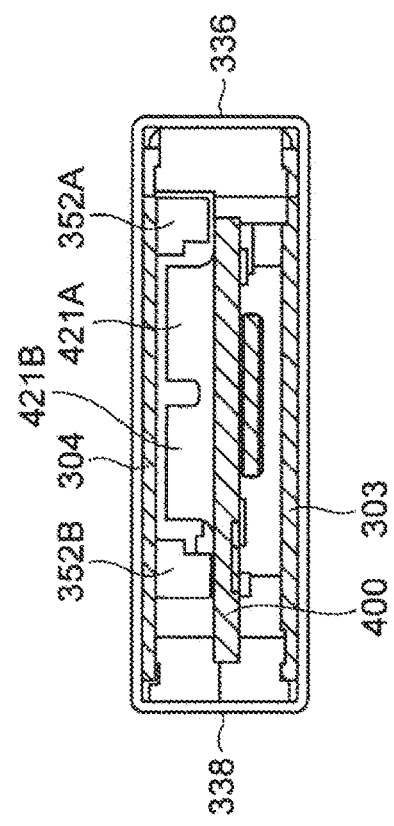
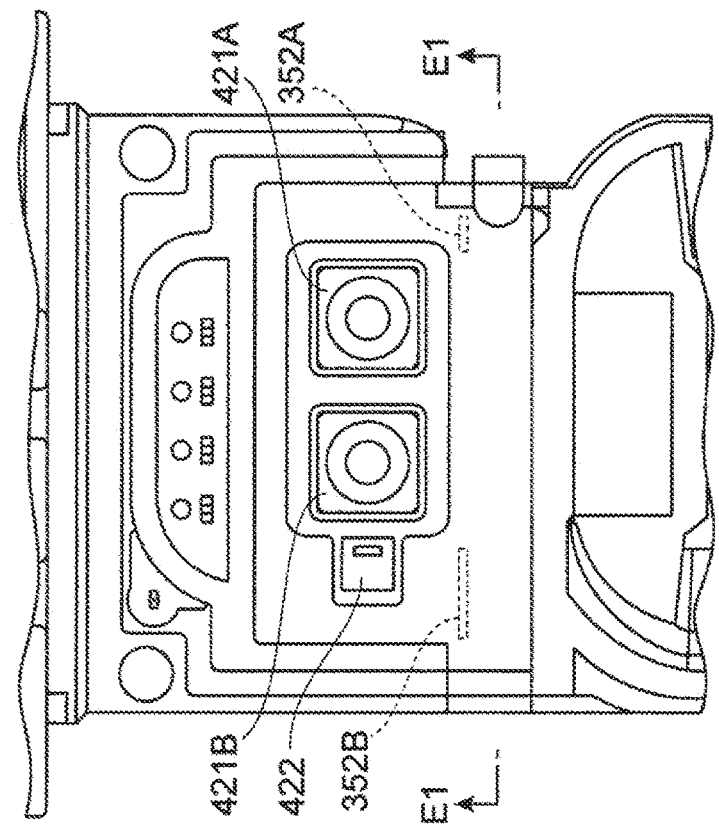
FIG. 8B
FIG. 8A

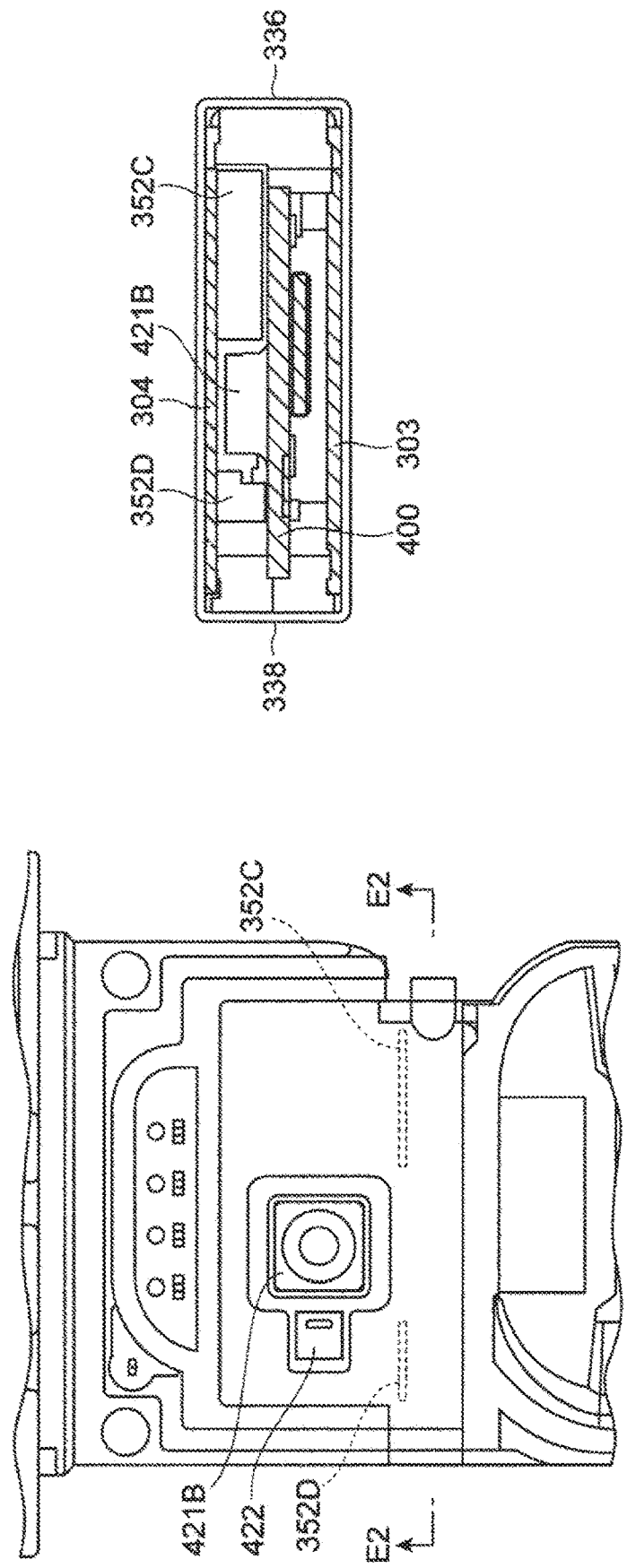

PHYSICAL QUANTITY DETECTION DEVICE

TECHNICAL FIELD

The present invention relates to a physical quantity measuring device of intake air of an internal combustion engine.

BACKGROUND ART

PTL 1 discloses a method of measuring specific humidity of air by using a sensor means constituted by a capacitive sensor, a temperature sensor, and a heating element, providing a predetermined humidity limit value, and changing temperature of the capacitive sensor when reaching the predetermined humidity limit value. In the method, a capacity of the capacitive sensor for obtaining a certain capacity value, humidity of air until reaching the predetermined humidity limit value is measured by evaluating the capacity value, the capacitive sensor is heated to adjust temperature of the sensor means such that the capacitive sensor is adjusted to a constant capacity when reaching the predetermined humidity limit value, and the temperature is evaluated. According to PTL 1, it is possible to stably and accurately measure the specific humidity for a long period of time even in the vicinity of a dew point without causing a measurement result to be affected by an error nor causing a drift in a sensor signal even if being used for a long period of time in a high-humidity range, and thus, it is also possible to stably measure relative humidity for a long period of time near 100% of relative humidity.

CITATION LIST

Patent Literature

PTL 1: JP H10-010072 A

SUMMARY OF INVENTION

Technical Problem

As disclosed in PTL 1, in the method of adjusting the temperature of the sensor means so as to adjust the capacitive sensor to the constant capacity when reaching the predetermined humidity limit value, the temperature control is not performed in the environment below the predetermined humidity limit value, and there remains room for improvement in accuracy in detection of an absolute water content obtained on the basis of at least temperature and relative humidity due to detection characteristics of the capacitive sensor and the temperature sensor. Therefore, it is necessary to perform the temperature control according to the detection characteristics of temperature and relative humidity in order to improve the accuracy in detection of the absolute water content.

The present invention has been made in view of the above points, and an object of the present invention is to provide a physical quantity measuring device with high accuracy in detection of an absolute water content.

Solution to Problem

In order to solve the above problem, a physical quantity measuring device of the present invention is characterized by including at least each one of a relative humidity measurement element, a heating element for heating the relative humidity measurement element, a temperature measurement element, and a control element for processing a physical quantity detected by each of the measurement elements, in which heat generation temperature of the heating element is determined by temperature of a measured gas and relative humidity.

Advantageous Effects of Invention

According to the present invention, it is possible to reduce an error in detection of an absolute water content, caused by a relative humidity detection error due to a detection characteristic of the relative humidity measurement element and a temperature detection error due to a detection characteristic of the temperature measurement element, by performing the temperature control using the heating element. Incidentally, other objects, configurations, and effects will be apparent from the following description of embodiments.

BRIEF DESCRIPTION OF DRAWINGS

FIG. 3C is a left side view illustrating a state where the front cover and the rear cover are removed from the physical quantity measuring device.

FIGS. 8A and 8B are diagrams for describing a structure of a sensor chamber, FIG. 8A is an enlarged view of the sensor chamber, and FIG. FIG. 8B is a cross-sectional view taken along a line E1-E1 of FIG. 8A.

FIGS. 8C and 8D are diagrams for describing a structure of another embodiment of the sensor chamber, FIG. 8C is an enlarged view of the sensor chamber, and FIG. 8D is a cross-sectional view taken along a line E2-E2 of FIG. 8C.

FIG. 8E is an enlarged view of the sensor chamber, and FIG. 8F is a cross-sectional view taken along a line E3-E3 of FIG. 8E.

DESCRIPTION OF EMBODIMENTS

A mode for carrying out the invention (hereinafter, an embodiment) to be described later solves various problems desired to be solved as an actual product, and particularly solves various types of problems desired for the use as a detection device which detects a physical quantity of intake air of a vehicle, and achieves various effects. One of the various problems to be solved by the following embodiment corresponds to the content that has been described in the above-described section of Technical Problem. In addition, one of the various effects to be achieved by the following embodiment corresponds to the effect described in the above-described section of Advantageous Effects of Invention. The various problems to be solved by the following embodiment and the various effects to be achieved by the following embodiment will be described in the description of the following embodiment. Accordingly, problems and the advantages to be solved and achieved by the following embodiment other than the content in the section of Technical Problem and the content in the section of Advantageous Effects of Invention will also be described.

In the following embodiment, the same reference signs represent the same configurations even among different drawing numbers, and achieve the same effects. There is also a case where only a reference sign is given to a figure with respect to a configuration that has already been described in a drawing and a description thereof is omitted.

Figure 1:
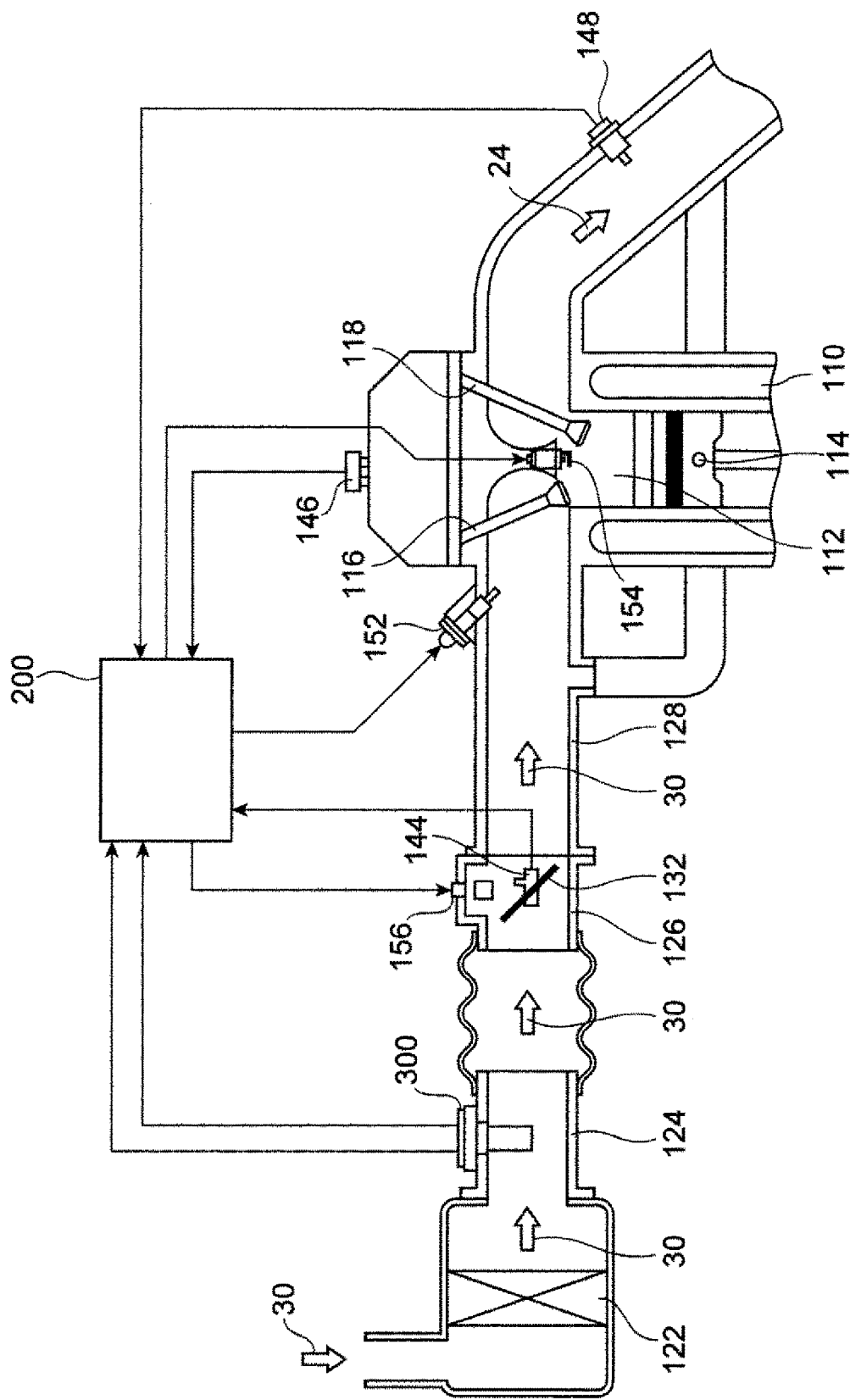
FIG. 1 is a system diagram illustrating an embodiment in which a physical quantity measuring device according to the present invention is used in an internal combustion engine control system.

1. Embodiment in Which Physical Quantity Measuring Device According to Present Invention Is Used in Internal Combustion Engine Control System FIG. 1 is a system diagram illustrating the embodiment in which the physical quantity measuring device according to the present invention is used in an electronic fuel injection-type internal combustion engine control system. Intake air is sucked from an air cleaner 122 as a measured gas 30 on the basis of an operation of an internal combustion engine 110, which includes an engine cylinder 112 and an engine piston 114, and is guided to a combustion chamber of the engine cylinder 112 via, for example, an intake body as an air intake system 124, a throttle body 126, and an intake manifold 128. A physical quantity of the measured gas 30, which is the intake air guided to the combustion chamber, is detected by a physical quantity measuring device 300 according to the present invention. Fuel is supplied by a fuel injection valve 152 on the basis of the detected physical quantity, and is guided to the combustion chamber in the state as an air-fuel mixture with the intake air 20. Incidentally, the fuel injection valve 152 is provided at an intake port of the internal combustion engine in the present embodiment, and the fuel injected to the intake port molds the air-fuel mixture together with the measured gas 30 as the intake air. The air-fuel mixture is guided to the combustion chamber via an intake valve 116 and is burnt to generate mechanical energy.

The fuel and air guided to the combustion chamber form a mixed state of the fuel and the air, and is explosively burnt by spark ignition of a spark plug 154, thereby generating the mechanical energy. After burning, the gas is guided into an exhaust pipe from an exhaust valve 118, and is discharged, as an exhaust gas 24, outside a car from the exhaust pipe. A flow rate of the measured gas 30 as the intake air guided to the combustion chamber is controlled by a throttle valve 132 whose opening degree is changed based on an operation of an accelerator pedal. A supply amount of fuel is controlled on the basis of the flow rate of the intake air guided to the combustion chamber, and a driver can control the mechanical energy generated by the internal combustion engine by controlling the opening degree of the throttle valve 132 and controlling the flow rate of the intake air guided to the combustion chamber.

1.1 Overview of Control of Internal Combustion Engine Control System

The physical quantity, such as the flow rate, temperature, humidity, and pressure, of the measured gas 30, which is the intake air taken from the air cleaner 122 and flowing in the air intake system 124, is detected by the physical quantity measuring device 300, and an electric signal indicating the physical quantity of the intake air is input to a control device 200 from the physical quantity measuring device 300. In addition, output of a throttle angle sensor 144, which measures the opening degree of the throttle valve 132, is input to the control device 200. Further, output of a rotation angle sensor 146 is input to the control device 200 in order to measure a position or a state of the engine piston 114, the intake valve 116, or the exhaust valve 118 of the internal combustion engine, and rotation speed of the internal combustion engine. Output of an oxygen sensor 148 is input to the control device 200 in order to measure a state of a mixing ratio between the amount of fuel and the amount of air on the basis of the state of the exhaust gas 24.

The control device 200 computes a fuel injection amount and an ignition timing on the basis of the physical quantity of the intake air as the output of the physical quantity measuring device 300 and the rotation speed of the internal combustion engine measured on the basis of the output of the rotation angle sensor 146. The fuel amount to be supplied from the fuel injection valve 152 and the ignition timing ignited by the spark plug 154 are controlled on the basis of these computation results. Practically, the amount of fuel supply and the ignition timing are further finely controlled on the basis of a change state of the temperature or a throttle angle detected by the physical quantity measuring device 300, a change state of the engine rotation speed, and a state of an air-fuel ratio measured by the oxygen sensor 148. The control device 200 further controls the amount of air bypassing the throttle valve 132 using an idle air control valve 156 in an idle operation state of the internal combustion engine and controls the rotation speed of the internal combustion engine in the idle operation state.

1.2 Importance of Improvement of Detection Accuracy of Physical Quantity Measuring Device and Equipment Environment of Physical Quantity Measuring Device Both the fuel supply amount and the ignition timing, which are major control variables of the internal combustion engine, are computed using the output of the physical quantity measuring device 300 as the main parameter. Accordingly, improvement of detection accuracy of the physical quantity measuring device 300, suppression of a change over time, and improvement of reliability are important in regard to improvement of control accuracy of a vehicle and securing of the reliability.

In particular, recently, a request for fuel saving of vehicles has extremely increased, and further, a request for purification of an exhaust gas has extremely increased. In order to respond to such requests, it is very important to improve the detection accuracy of the physical quantity of the intake air 20 which is detected by the physical quantity measuring device 300. In addition, it is also important for the physical quantity measuring device 300 to maintain high reliability.

A vehicle to which the physical quantity measuring device 300 is equipped is used under environment where a change in temperature or humidity is great. It is desirable that the physical quantity measuring device 300 be configured on consideration of response to such a change in temperature or humidity in the use environment and response to dust, pollutants and the like.

In addition, the physical quantity measuring device 300 is mounted to the intake pipe which is affected by heat generated from the internal combustion engine. Thus, the heat generated from the internal combustion engine is transferred to the physical quantity measuring device 300 via the intake pipe serving as the air intake system 124. The physical quantity measuring device 300 detects the flow rate of the measured gas by performing the heat transfer with the measured gas, and thus, it is important to suppress influence of heat from the outside as much as possible.

The physical quantity measuring device 300 equipped in the car, as will be described later, not only solves the problem described in the section of Technical Problem and achieves the effects described in the section of Advantageous Effects of Invention but also solves various problems and achieves various effects which are required as the product on sufficient consideration of the above-described various problems as will be described later. Specific problems to be solved and specific effects to be achieved by the physical quantity measuring device 300 will be described in the following description of the embodiment.

2. Configuration of Physical Quantity Measuring Device 300

2.1 External Structure of Physical Quantity Measuring Device 300

Figure 2A:
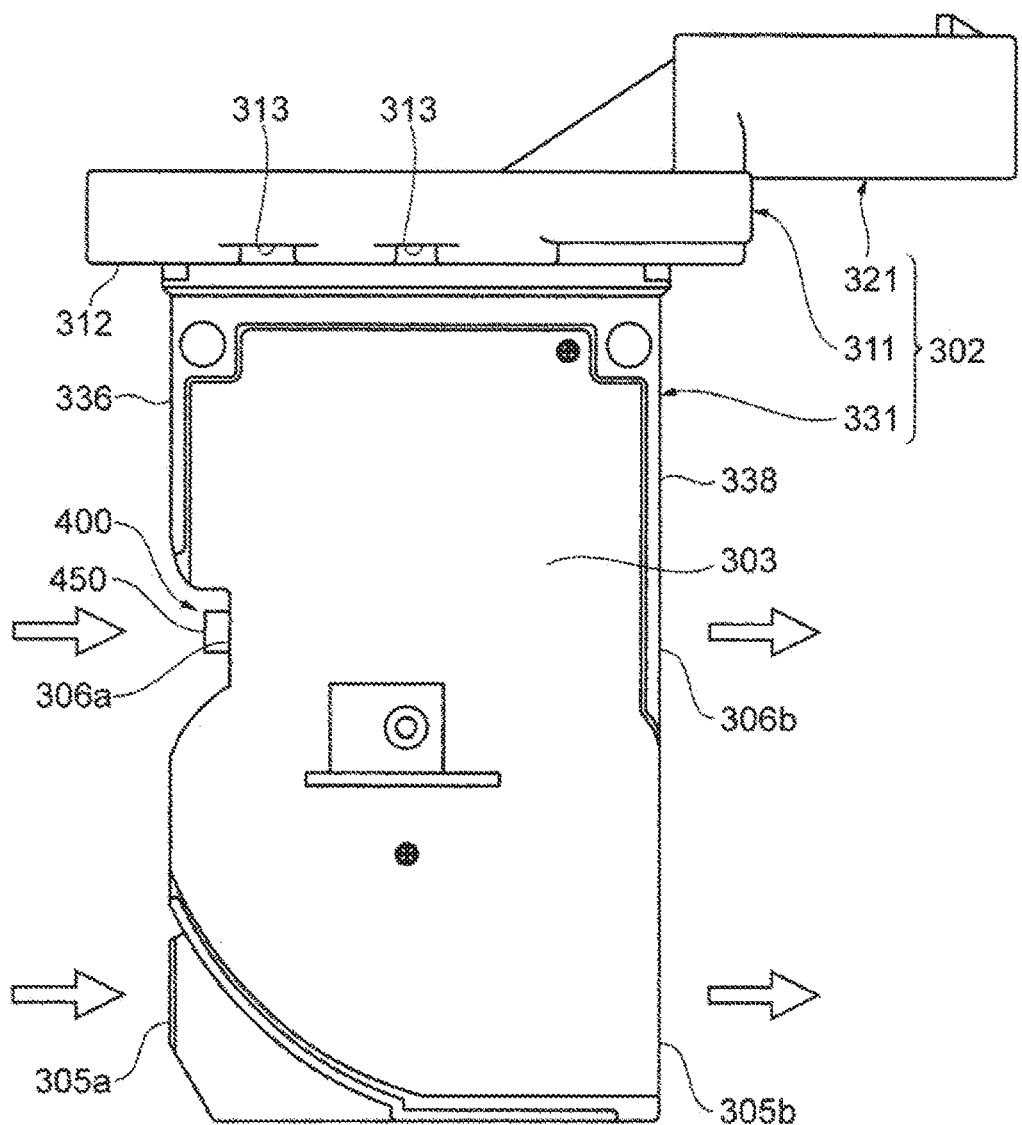
FIG. 2A is a front view of the physical quantity measuring device.
Figure 2B:
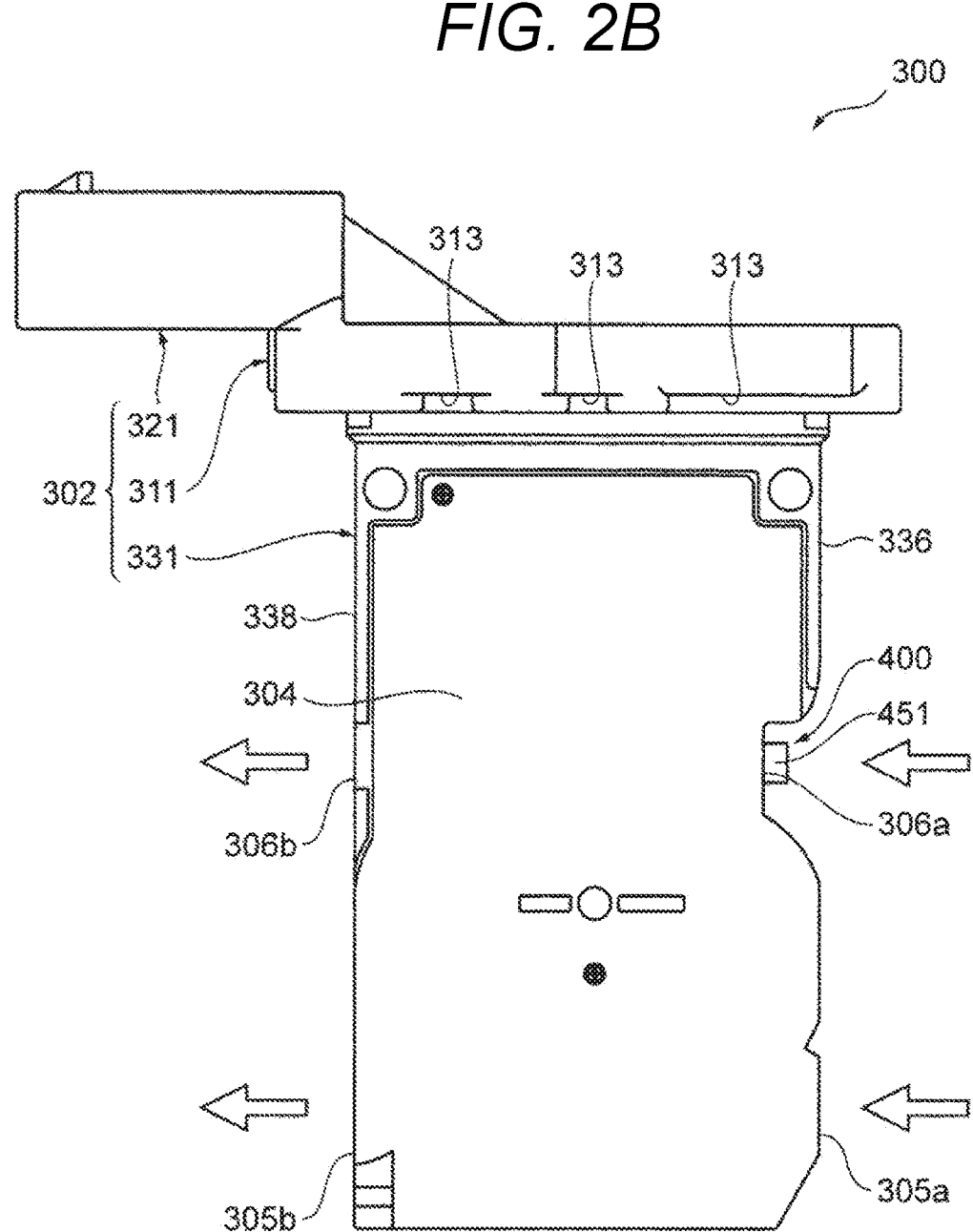
FIG. 2B is a back view of the physical quantity measuring device.
Figure 2C:
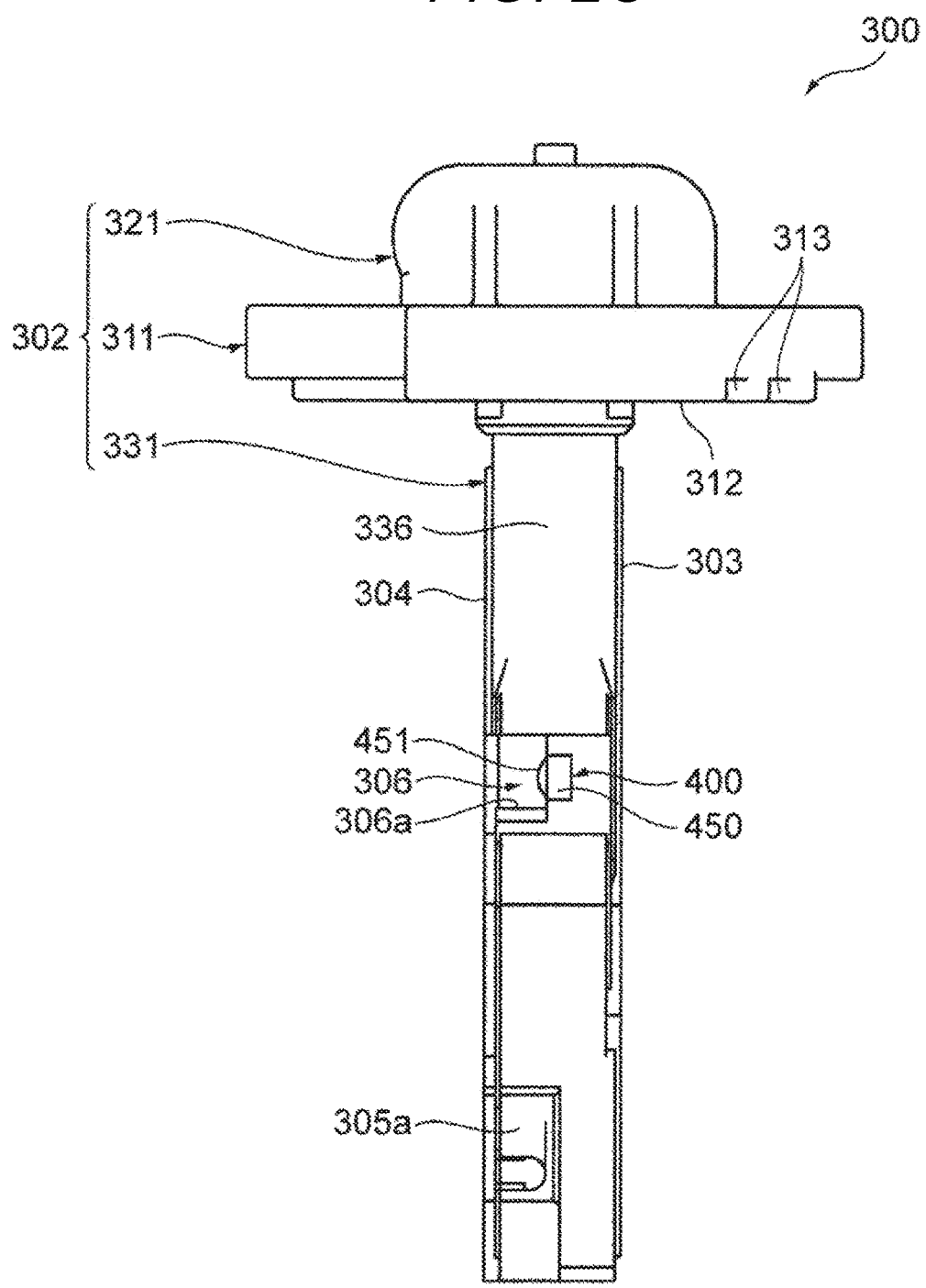
FIG. 2C is a left side view of the physical quantity measuring device.
Figure 2D:
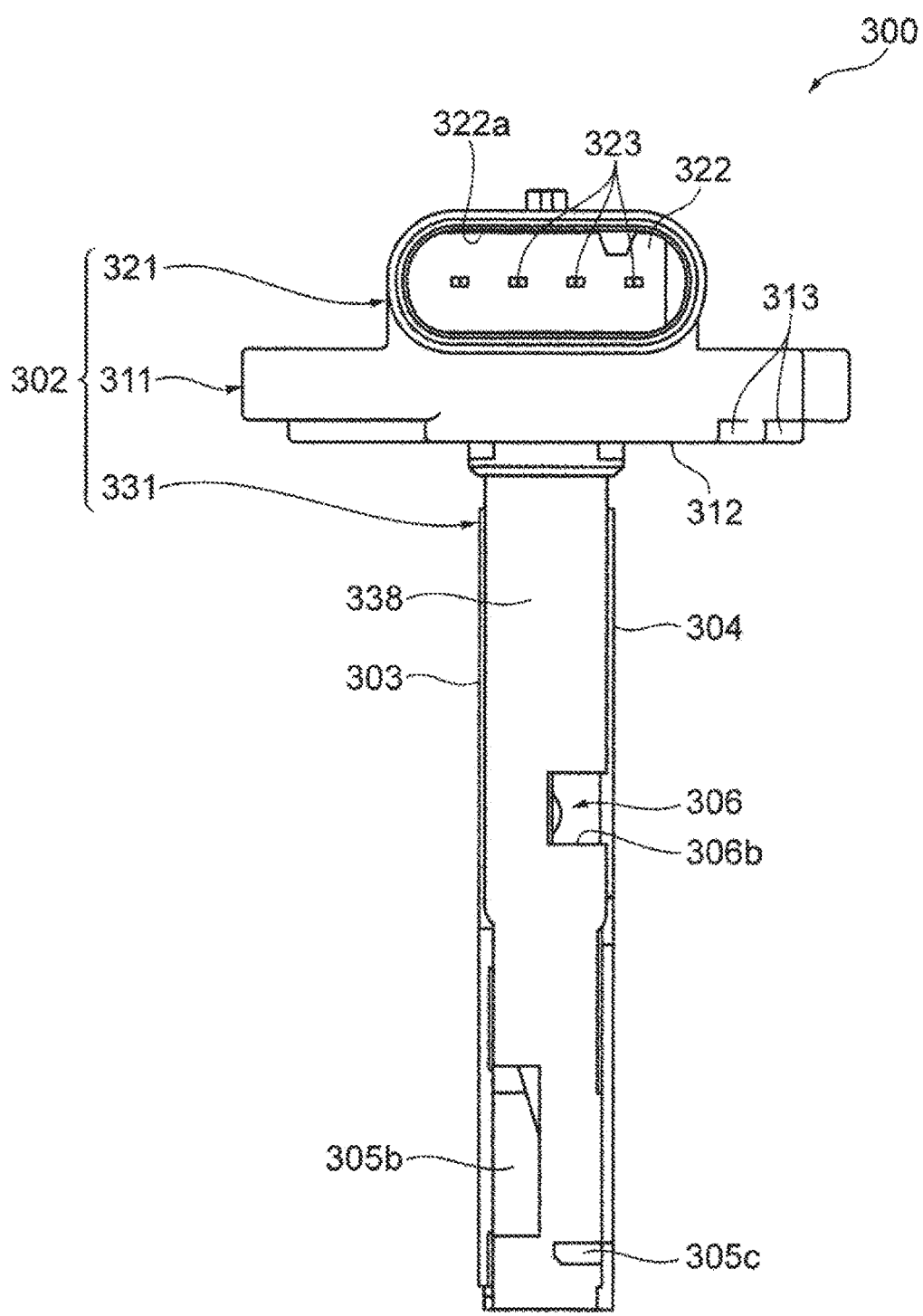
FIG. 2D is a right side view of the physical quantity measuring device.
Figure 2E:
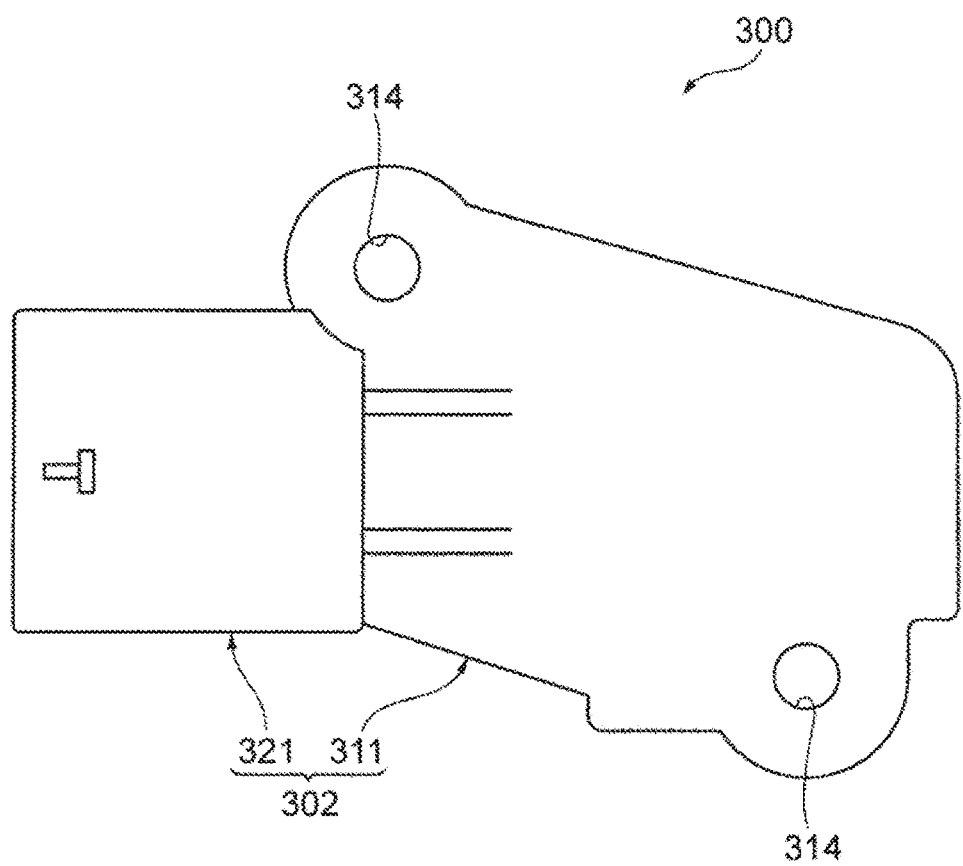
FIG. 2E is a plan view of the physical quantity measuring device.
Figure 2F:
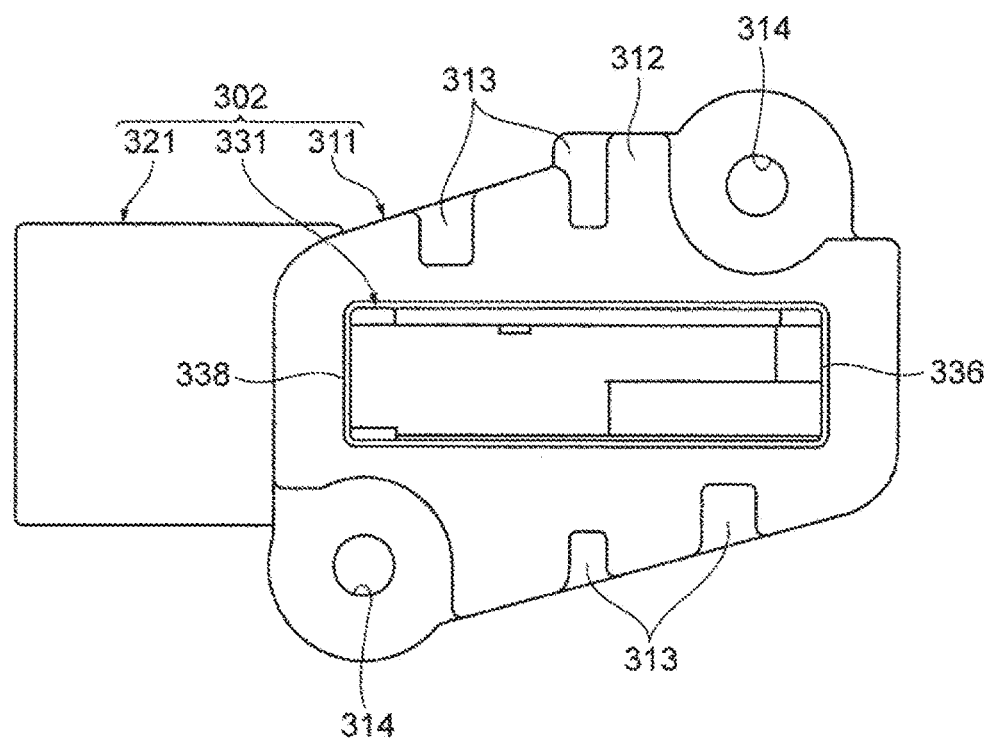
FIG. 2F is a bottom view of the physical quantity measuring device.

FIGS. 2A to 2F are diagrams illustrating appearance of the physical quantity measuring device 300. FIG. 2A is a front view of the physical quantity measuring device 300, FIG. 2B is a back view thereof, FIG. 2C is a left side view thereof, FIG. 2D is a right side view thereof, FIG. 2E is a plan view thereof, and FIG. 2F is a bottom view thereof.

The physical quantity measuring device 300 includes a housing 302, a front cover 303, and a rear cover 304. The housing 302 is configured by molding a synthetic resin material using a mold, and includes a flange 311 configured to fix the physical quantity measuring device 300 to the intake body as the air intake system 124, an external connection portion 321 configured to protrude from the flange 311 and have a connector to perform electrical connection with an external device, and a measurement unit 331 which extends to protrude from the flange 311 toward the center of the air intake system 124.

A circuit board 400 is provided to be integrated with the measurement unit 331 by insert-molding at the time of molding the housing 302 using the mold (see FIGS. 3-1 and 3-2). The circuit board 400 is provided with at least one detection unit, configured to detect the physical quantity of the measured gas 30 flowing in the air intake system 124 and a circuit unit configured to process a signal detected by the detection unit. The detection unit is arranged at a position to be exposed to the measured gas 30, and the circuit unit is arranged in a circuit chamber sealed by the front cover 303.

An auxiliary passage groove is provided on a front surface and a rear surface of the measurement unit 331, and a first auxiliary passage 305 is formed through collaboration of the front cover 303 and the rear cover 304. A first auxiliary passage inlet 305a, configured to cause a part of the measured gas 30, such as the intake air, to be taken into the first auxiliary passage 305, and a first auxiliary passage outlet 305b, configured to cause the measured gas 30 to return to the air intake system 124 from the first auxiliary passage 305, are provided at a distal end of the measurement unit 331. A part of the circuit board 400 protrudes in the middle of the first auxiliary passage 305, and a measurement element of air flow 602 (see FIG. 3A) as the detection unit is arranged at the corresponding protruding portion so as to detect the flow rate of the measured gas 30.

A second auxiliary passage 306, configured to cause apart of the measured gas 30, such as the intake air, to be taken into a sensor chamber Rs, is provided at a middle portion of the measurement unit 331 closer to the flange 311 than the first auxiliary passage 305. The second auxiliary passage 306 is formed through collaboration of the measurement unit 331 and the rear cover 304. The second auxiliary passage 306 includes a second auxiliary passage inlet 306a, opened at an upstream outer wall 336 to take the measured gas 30, and a second auxiliary passage outlet 306b opened at a downstream outer wall 338 to cause the measured gas 30 to return to the air intake system 124 from the second auxiliary passage 306. The second auxiliary passage 306 communicates with the sensor chamber Rs formed on a back surface of the measurement unit 331. A measurement element of pressure and a measurement element of relative humidity, which are the detection units provided on the rear surface of the circuit board 400, are arranged in the sensor chamber Rs.

2.2 Effect Based on External Structure of Physical Quantity Measuring Device 300

In the physical quantity measuring device 300, the second auxiliary passage inlet 306a is provided at the middle portion of the measurement unit 331 extending toward the center of the air intake system 124 from the flange 311, and the first auxiliary passage inlet 305a is provided at the distal end of the measurement unit 331. Accordingly, it is possible to take a gas, which is not in the vicinity of the inner wall surface of the air intake system 124 but in a portion close to a central portion separated from the inner wall surface, into the first auxiliary passage 305 and the second auxiliary passage 306. Accordingly, the physical quantity measuring device 300 can measure the physical quantity of the gas in the portion separated from the inner wall surface of the air intake system 124 and reduce an error in the measurement of the physical quantity caused by heat or a decrease in flow speed in the vicinity of the inner wall surface.

The measurement unit 331 forms a shape extending long along an axis toward the center from an outer wall of the air intake system 124, and a width is formed to be narrow as illustrated in FIGS. 2-3 and 2-4. That is, the measurement unit 331 of the physical quantity measuring device 300 forms the shape in which a width of a side surface is thin and a front surface has a substantially rectangular shape. Accordingly, the physical quantity measuring device 300 can include the first auxiliary passage 305 having a sufficient length, and can suppress a fluid resistance to a small value with respect to the measured gas 30. Thus, the physical quantity measuring device 300 can measure the flow rate of the measured gas 30 with high accuracy while suppressing the fluid resistance to the small value.

2.3 Structure and Effect of Flange 311

The flange 311 is provided with a plurality of dents 313 on a lower surface 312 opposing the air intake system 124 to reduce a heat transfer surface with respect to the air intake system 124, and make the physical quantity measuring device 300 hardly be affected by heat. The measurement unit 331 is inserted inside the physical quantity measuring device 300 through amounting hole provided in the air intake system 124, and the lower surface 312 of the flange 311 opposes the air intake system 124. The air intake system 124 is, for example, the intake body, and the air intake system 124 is maintained at high temperature in many cases. Conversely, it is considered that the air intake system 124 is maintained at extremely low temperature at the time of being started in a cold area. The measurement accuracy decreases if such a high-temperature or low-temperature state of the air intake system 124 gives influence to measurement of various types of physical quantities. The flange 311 includes the dent 313 on the lower surface 312, and a space is formed between the lower surface 312 opposing the air intake system 124 and the air intake system 124. Accordingly, it is possible to reduce the heat transfer from the air intake system 124 to the physical quantity measuring device 300, and prevent the decrease of measurement accuracy caused by heat.

Screw holes 314 of the flange 311 are configured to fix the physical quantity measuring device 300 to the air intake system 124, and a space is formed between a surface opposing the air intake system 124 around each of the screw holes 314 and the air intake system 124 such that the surface opposing the air intake system 124 around each of the screw holes 314 is away the air intake system 124. In this manner, the structure capable of reducing the heat transfer from the air intake system 124 to the physical quantity measuring device 300 and preventing the decrease of measurement accuracy caused by heat is provided.

2.4 Structure of External Connection Portion 321

The external connection portion 321 is provided on an upper surface of the flange 311 and includes a connector 322 which protrudes from the flange 311 toward a downstream side in the flow direction of the measured gas 30. The connector 322 is provided with an insertion hole 322a configured to allow a communication cable for connection with the control device 200 to be inserted therethrough. Four external terminals 323 are provided inside the insertion hole 322a as illustrated in FIG. 2D. The external terminals 323 serve as a terminal to output information on the physical quantity as the measurement result of the physical quantity measuring device 300 and a power supply terminal to supply DC power for the operation of the physical quantity measuring device 300.

The connector 322 has a shape of protruding from the flange 311 toward the downstream side in the flow direction of the measured gas 30 and being inserted toward an upstream side from the downstream side in the flow direction, but is not limited to this shape, and may have a shape, for example, of vertically protruding from the upper surface of the flange 311 and being inserted in the extension direction of the measurement unit 331, and various modifications thereof can be made.

3. Overall Structure of Housing 302 and Effect Thereof

3.1 Overall Structure of Housing 302

Figure 3A:
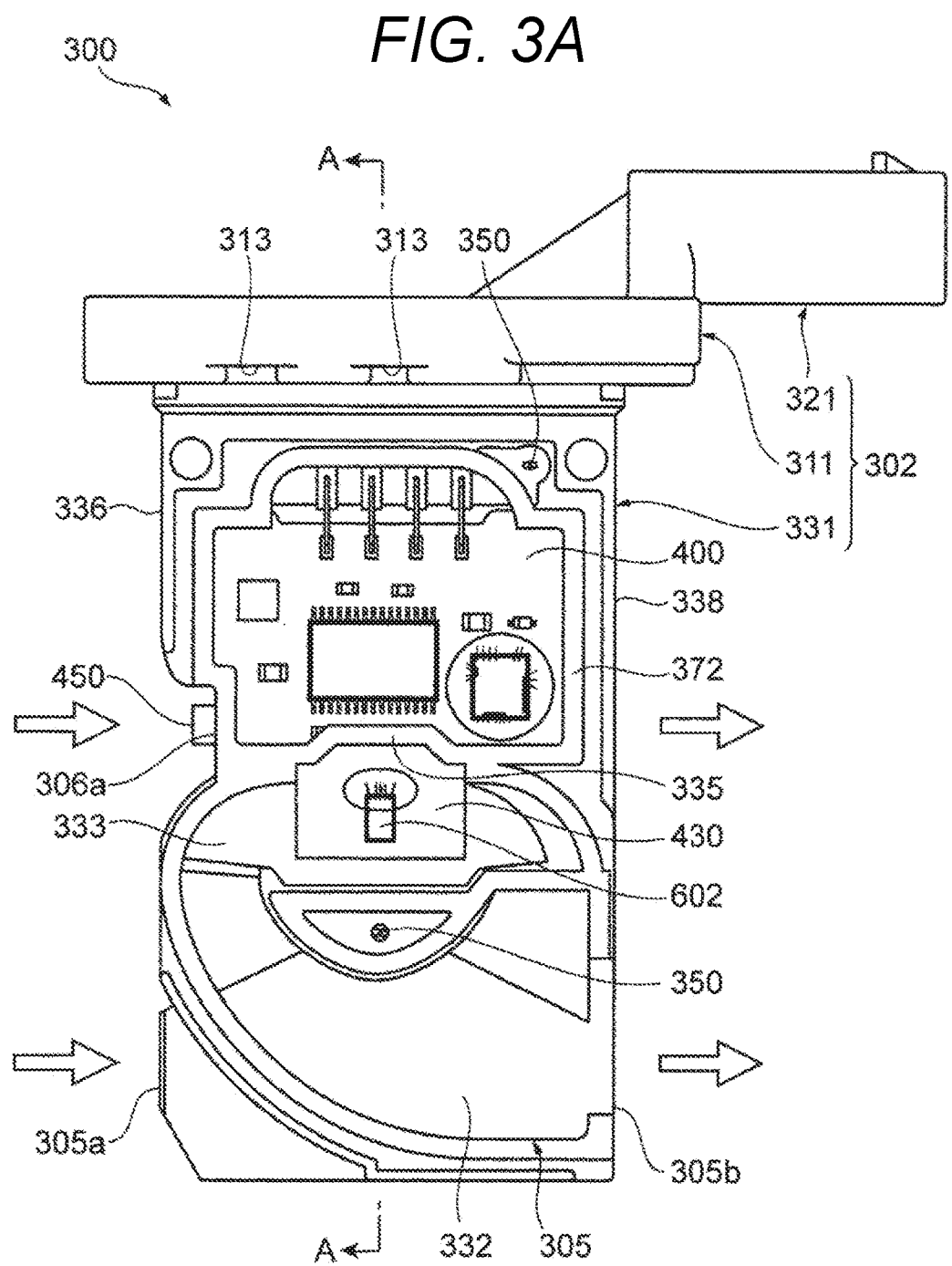
FIG. 3A is a front view illustrating a state where a front cover is removed from the physical quantity measuring device.
Figure 3B:
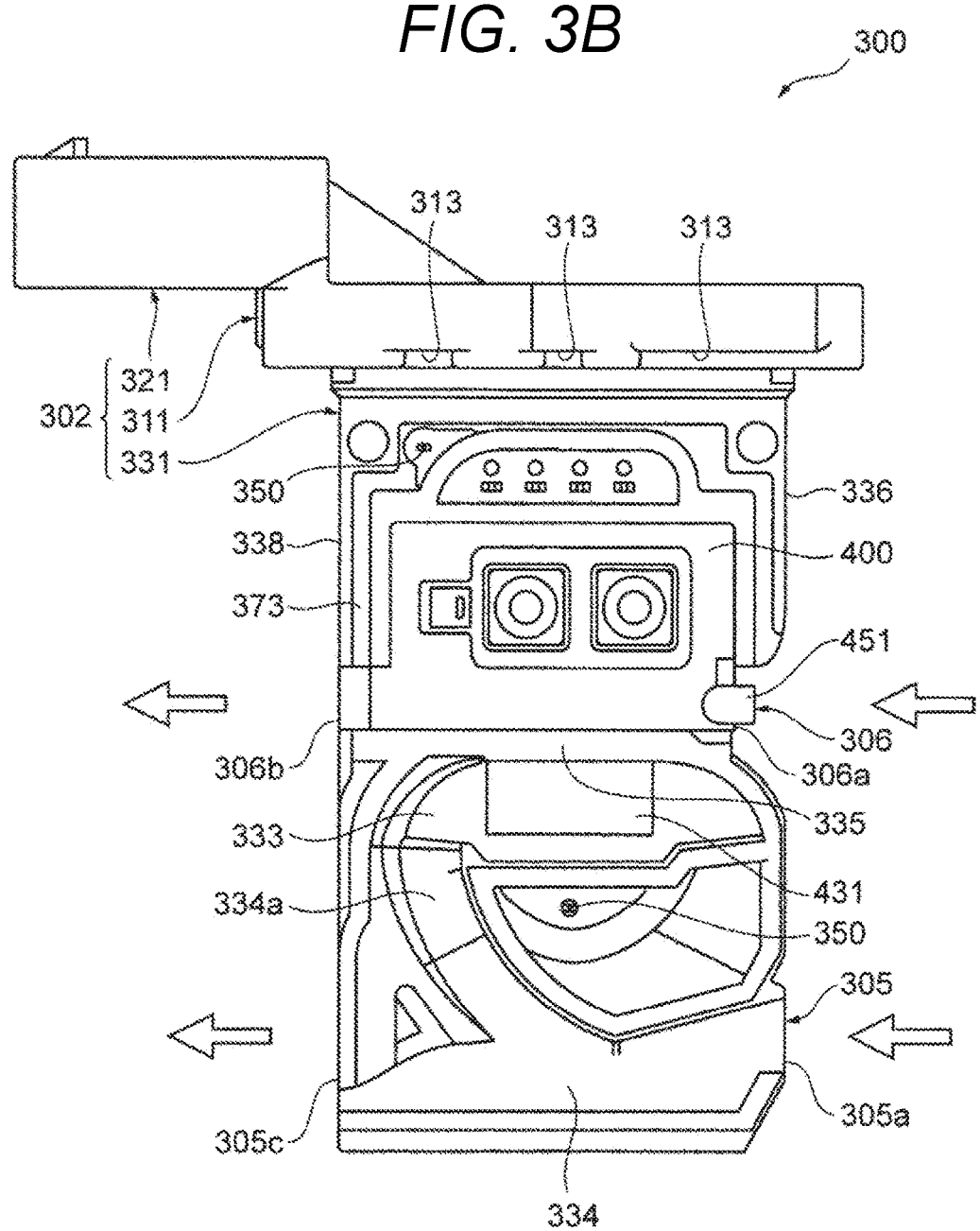
FIG. 3B is a back view illustrating a state where a rear cover is removed from the physical quantity measuring device.
Figure 3D:
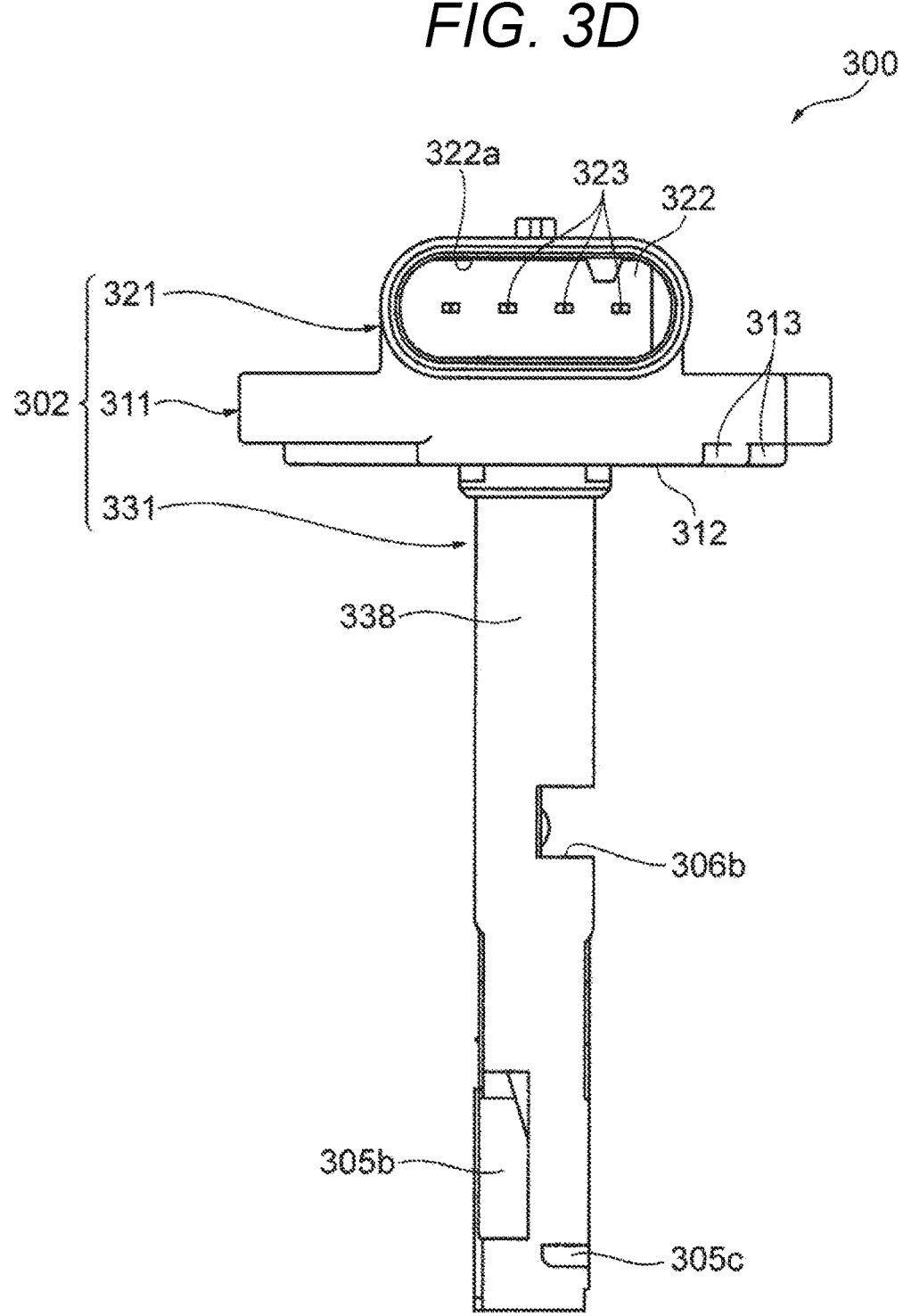
FIG. 3D is a right side view illustrating a state where the front cover and the rear cover are removed from the physical quantity measuring device.
Figure 3E:
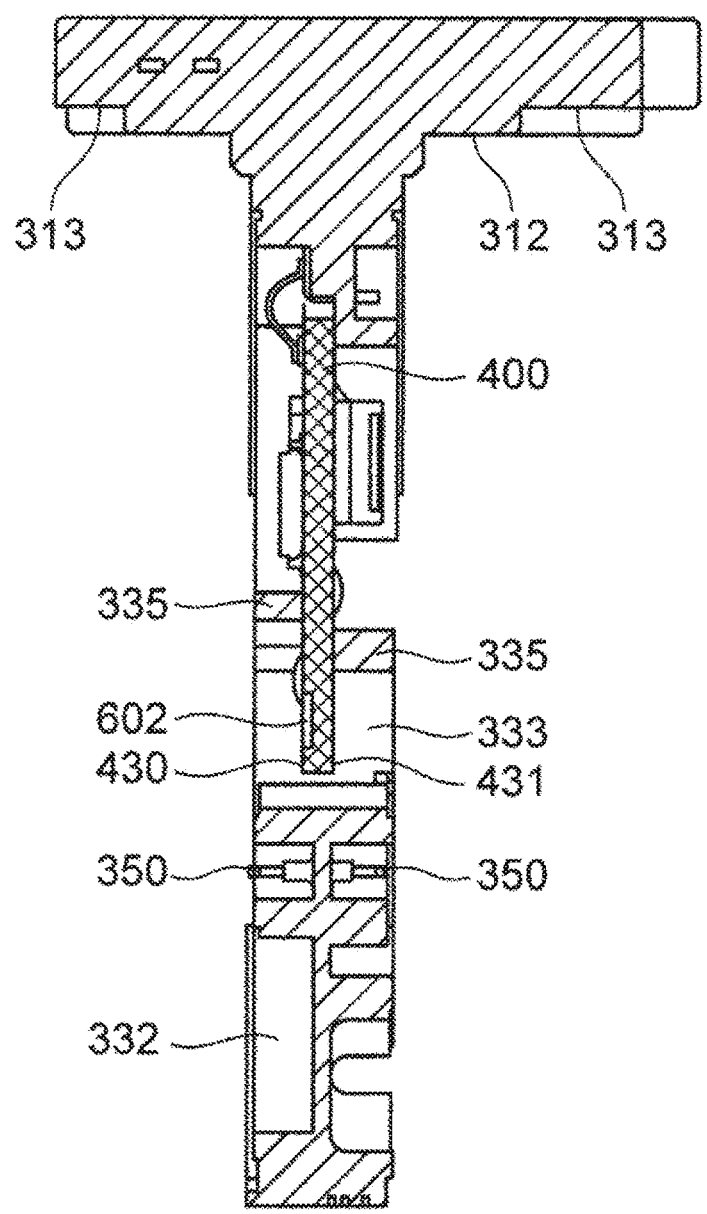
FIG. 3E is a cross-sectional view taken along a line of arrows A-A of FIG. 3A.

Next, the overall structure of the housing 302 will be described with reference to FIGS. 3-1 to 3-5. FIGS. 3-1 to 3-5 are diagrams illustrating a state of the housing 302 in which the front cover 303 and the rear cover 304 are removed from the physical quantity measuring device 300. FIG. 3A is a front view of the housing 302, FIG. 3B is a back view of the housing 302, FIG. 3C is a right side view of the housing 302, FIG. 3D is a left side view of the housing 302, and FIG. 3E is a cross-sectional view taken along a line A-A of FIG. 3A.

The housing 302 has a structure in which the measurement unit 331 extends from the flange 311 toward the center of the air intake system 124. The circuit board 400 is insert-molded on a proximal end side of the measurement unit 331. The circuit board 400 is arranged to be parallel with a surface of the measurement unit 331 at an intermediate position between the front surface and the rear surface of the measurement unit 331, and is molded to be integrated with the housing 302, thereby partitioning the proximal end side of the measurement unit 331 between one side and the other side in the thickness direction.

A circuit chamber Rc housing the circuit unit of the circuit board 400 is formed on the front surface of the measurement unit 331, and the sensor chamber Rs housing a measurement element of pressure 421 and a measurement element of relative humidity 422 is formed on the rear surface thereof. The circuit chamber Rc is sealed by attaching the front cover 303 to the housing 302, and is completely isolated from the outside. On the other hand, the second auxiliary passage 306 and the sensor chamber Rs, which is an interior space communicating with the outside of the measurement unit 331 via the second auxiliary passage 306, are formed by attaching the rear cover 304 to the housing 302. A part of the circuit board 400 protrudes inside the first auxiliary passage 305 from a partition wall 335 that partitions the circuit chamber Rc of the measurement unit 331 and the first auxiliary passage 305, and the measurement element of air flow 602 is provided on a measurement flow path surface 430 in this protruding portion.

3.2 Structure of Auxiliary Passage Groove

Auxiliary passage grooves configured to form the first auxiliary passage 305 are provided at a distal end side of the measurement unit 331 in a length direction. The auxiliary passage grooves configured to form the first auxiliary passage 305 include a front auxiliary passage groove 332 illustrated in FIG. 3A and a rear auxiliary passage groove 334 illustrated in FIG. 3B. As illustrated in FIG. 3A, the front auxiliary passage groove 332 is gradually curved toward the flange 311 on the proximal end side of measurement unit 331 as proceeding from the first auxiliary passage outlet 305b opened at the downstream outer wall 338 of the measurement unit 331 toward the upstream outer wall 336, and communicates with an opening portion 333, which penetrates through the measurement unit 331 in the thickness direction, at a position near the upstream outer wall 336. The opening portion 333 is formed along the air intake system 124 in the flow direction of the measured gas 30 so as to extend over a portion between the upstream outer wall 336 and the downstream outer wall 338.

As illustrated in FIG. 3B, the rear auxiliary passage groove 334 progresses from the upstream outer wall 336 toward the downstream outer wall 338 and is divided into two branches at an intermediate position between the upstream outer wall 336 and the downstream outer wall 338 such that one branch extends in a straight line directly as a discharge passage and is opened at an outlet 305c of the downstream outer wall 338, and the other branch is gradually curved toward the flange 311 on the proximal end side of the measurement unit 331 as progressing toward the downstream outer wall 338 and communicates with the opening portion 333 at the position near the downstream outer wall 338.

The rear auxiliary passage groove 334 forms an inlet groove through which the measured gas 30 flows from the air intake system 124, and the front auxiliary passage groove 332 forms an outlet groove which causes the measured gas 30 taken from the rear auxiliary passage groove 334 to return to the air intake system 124. The front auxiliary passage groove 332 and the rear auxiliary passage groove 334 are provided at a distal end of the housing 302, and thus, can take a gas in a portion separated from the inner wall surface of the air intake system 124, in other words, a gas flowing in a portion close to a central portion of the air intake system 124 as the measured gas 30. The gas flowing in the vicinity of the inner wall surface of the air intake system 124 receives influence of temperature of a wall surface of the air intake system 124, and often has temperature different from an average temperature of a gas such as the intake air 20 that flows in the air intake system 124. In addition, the gas flowing in the vicinity of the inner wall surface of the air intake system 124 flows at speed lower than average flow speed of the gas flowing in the air intake system 124 in many cases. Such influence is hardly received in the physical quantity measuring device 300 according to the embodiment, and thus, it is possible to suppress the decrease of the measurement accuracy.

As illustrated in FIG. 3B, a part of the measured gas 30 flowing in the air intake system 124 is taken into the rear auxiliary passage groove 334 from the first auxiliary passage inlet 305a, and flows inside the rear auxiliary passage groove 334. Further, a substance with a large mass contained in the measured gas 30 directly flows into the discharge passage extending in the straight line along with the part of the measured gas from the branch, and is discharged to the air intake system 124 through the outlet 305c of the downstream outer wall 338.

The rear auxiliary passage groove 334 has a shape of deepening in a progressing direction, and the measured gas 30 gradually moves to the front side of the measurement unit 331 as flowing along the rear auxiliary passage groove 334. In particular, the rear auxiliary passage groove 334 is provided with an abruptly inclined portion 334a which is abruptly deepened in front of the opening portion 333, and a part of air with a small mass moves along the abruptly inclined portion 334a and flows on the measurement flow path surface 430 side of the circuit board 400 inside the opening portion 333. On the other hand, the substance with a large mass flows on a rear surface of the measurement flow path surface 431 side since an abrupt route change thereof is difficult.

As illustrated in FIG. 3A, the measured gas 30 moving to the front side at the opening portion 333 flows along the measurement flow path surface 430 of the circuit board so that heat transfer with the measurement element of air flow 602, provided on the measurement flow path surface 430, is performed, thereby measuring the flow rate. The air flowing into the front auxiliary passage groove 332 from the opening portion 333 flows along the front auxiliary passage groove 332 together with the gas, and is discharged to the air intake system 124 through the first auxiliary passage outlet 305b opened at the downstream outer wall 338.

The substance with a large mass, such as dirt, mixed in the measured gas 30 has a large inertial force, and thus, hardly changes its route in an abrupt manner in a depth direction of the groove along the front surface of a portion of the abruptly inclined portion 334a at which a depth of the groove is abruptly deepened. Thus, the substance with a large mass moves on a side of the rear surface of the measurement flow path surface 431, and thus, it is possible to prevent the substance from passing the portion close to the measurement element of air flow 602. In the embodiment, it is configured such that most of the substances with a large mass except for the gas pass through the rear surface of the measurement flow path surface 431, which is a back surface of the measurement flow path surface 430. Thus, it is possible to reduce influence of contamination caused by the substance such as oil content, carbon and dirt, and to suppress the decrease of the measurement accuracy. That is, the shape is formed such that the route of the measured gas 30 is abruptly changed along an axis crossing an axis of flow of the air intake system 124, and thus, it is possible to reduce the influence of the substance mixed in the measured gas 30.

3.3 Structure and Effect of Second Auxiliary Passage and Sensor Chamber

The second auxiliary passage 306 is formed in a straight line over a portion between the second auxiliary passage inlet 306a and the second auxiliary passage outlet 306b to be parallel with the flange 311 in the flow direction of the measured gas 30. The second auxiliary passage inlet 306a is formed by cutting out a part of the upstream outer wall 336, and the second auxiliary passage outlet 306b is formed by cutting out a part of the downstream outer wall 338. To be specific, the second auxiliary passage inlet 306a and the second auxiliary passage outlet 306b are formed by cutting a part of the upstream outer wall 336 and a part of the downstream outer wall 338, respectively, from a rear surface side of the measurement unit 331 at a position continuously along an upper surface of the partition wall 335 as illustrated in FIG. 3C. The second auxiliary passage inlet 306a and the second auxiliary passage outlet 306b are cut out up to a depth position to be flush with the rear surface of the circuit board 400. The measured gas 30 passes along a rear surface of a substrate main body 401 of the circuit board 400, and thus, the second auxiliary passage 306 functions as a cooling channel which cools the substrate main body 401. The circuit board 400 has heat in many cases, such as an LSI and a microcomputer, and it is possible to transfer such heat to the rear surface of the substrate main body 401, and to discharge the heat using the measured gas 30 passing through the second auxiliary passage 306.

The sensor chamber Rs is provided closer to the proximal end of the measurement unit 331 than the second auxiliary passage 306. A part of the measured gas 30 flowing into the second auxiliary passage 306 from the second auxiliary passage inlet 306a flow into the sensor chamber Rs, and pressure and relative humidity are detected by the measurement element of pressure 421 and the measurement element of relative humidity 422, respectively, inside the sensor chamber Rs. Since the sensor chamber Rs is arranged closer to the proximal end of the measurement unit 331 than the second auxiliary passage 306, it is possible to reduce influence of dynamic pressure on the measured gas 30 passing through the second auxiliary passage 306. Accordingly, it is possible to improve the detection accuracy of the measurement element of pressure 421 inside the sensor chamber Rs.

Further, since the sensor chamber Rs is arranged closer to the proximal end of the measurement unit 331 than the second auxiliary passage 306, it is possible to prevent contaminants or water drops flowing into the second auxiliary passage 306 together with the measured gas 30 from adhering on the measurement element of pressure 421 and the measurement element of relative humidity 422 arranged at the downstream side thereof when the distal end of the measurement unit 331 is attached to an intake passage in an attitude state of facing downward, for example.

In particular, the measurement element of pressure 421 having a relatively larger outer shape is arranged at the upstream side, and the measurement element of relative humidity 422 having a relatively smaller outer shape is arranged at the downstream side of the measurement element of pressure 421 inside the sensor chamber Rs in the present embodiment. Thus, the contaminants or water drops that have flowed together with the measured gas 30 adhere on the measurement element of pressure 421, and the adhesion on the measurement element of relative humidity 422 thereof is suppressed. Accordingly, it is possible to secure the measurement element of relative humidity 422 having a low resistance with respect to the contaminants or water drops.

The measurement element of pressure 421 and the measurement element of relative humidity 422 are hardly affected by the flow of the measured gas 30 as compared to the measurement element of air flow 602. In particular, the measurement element of relative humidity 422 may be secured just to a level of diffusing moisture in the measured gas 30, and thus, can be provided in the sensor chamber Rs which is adjacent to the linear second auxiliary passage 306. On the contrary, the measurement element of air flow 602 requires a certain level of flow speed or higher, and further, needs to be kept away from dust or contaminants, and be configured on consideration of influence with respect to pulsation. Accordingly, the measurement element of air flow 602 is provided in the first auxiliary passage 305 which has a shape of circling in a loop shape.

Figure 4A:
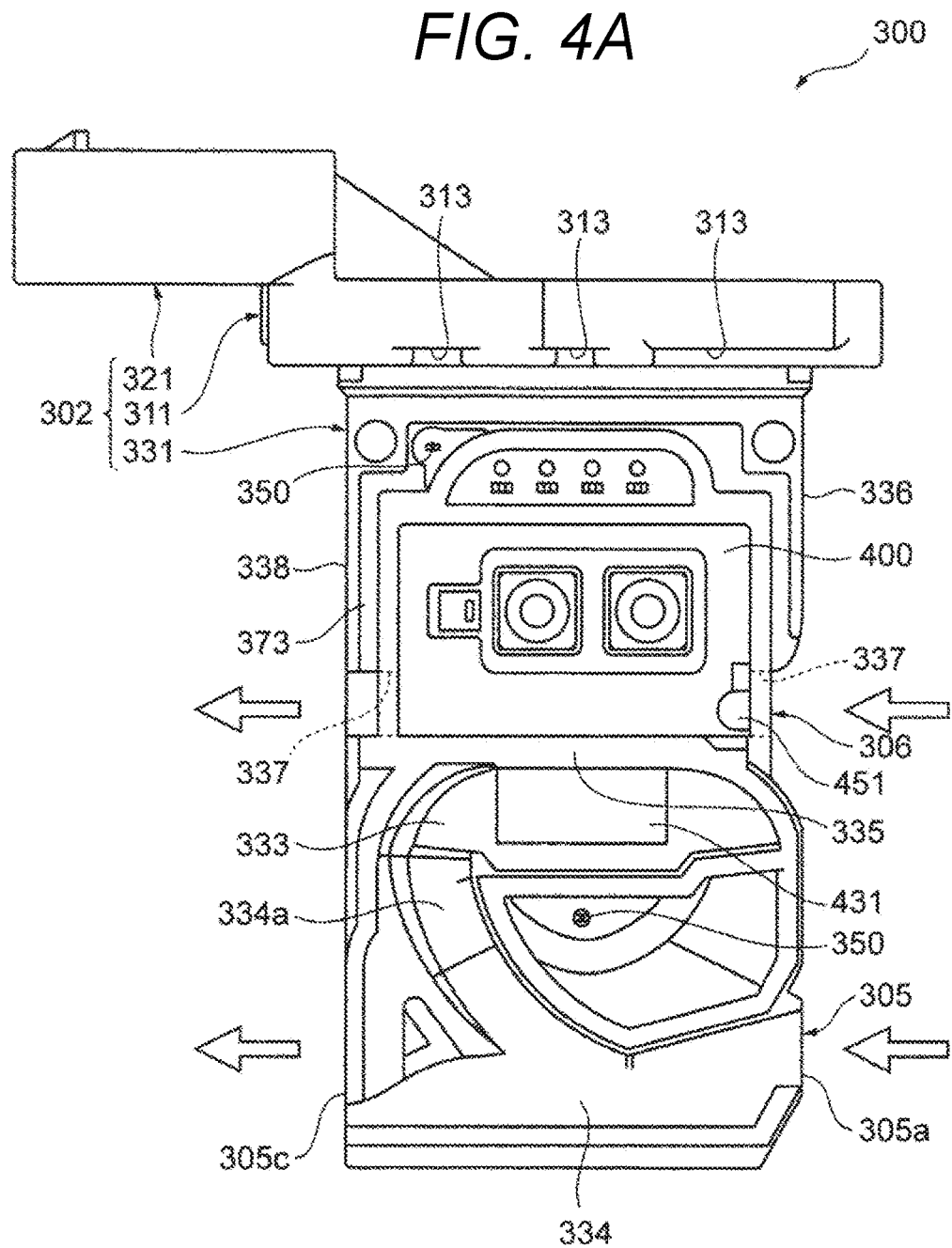
FIG. 4A is a back view for describing another embodiment of a housing.
Figure 4B:
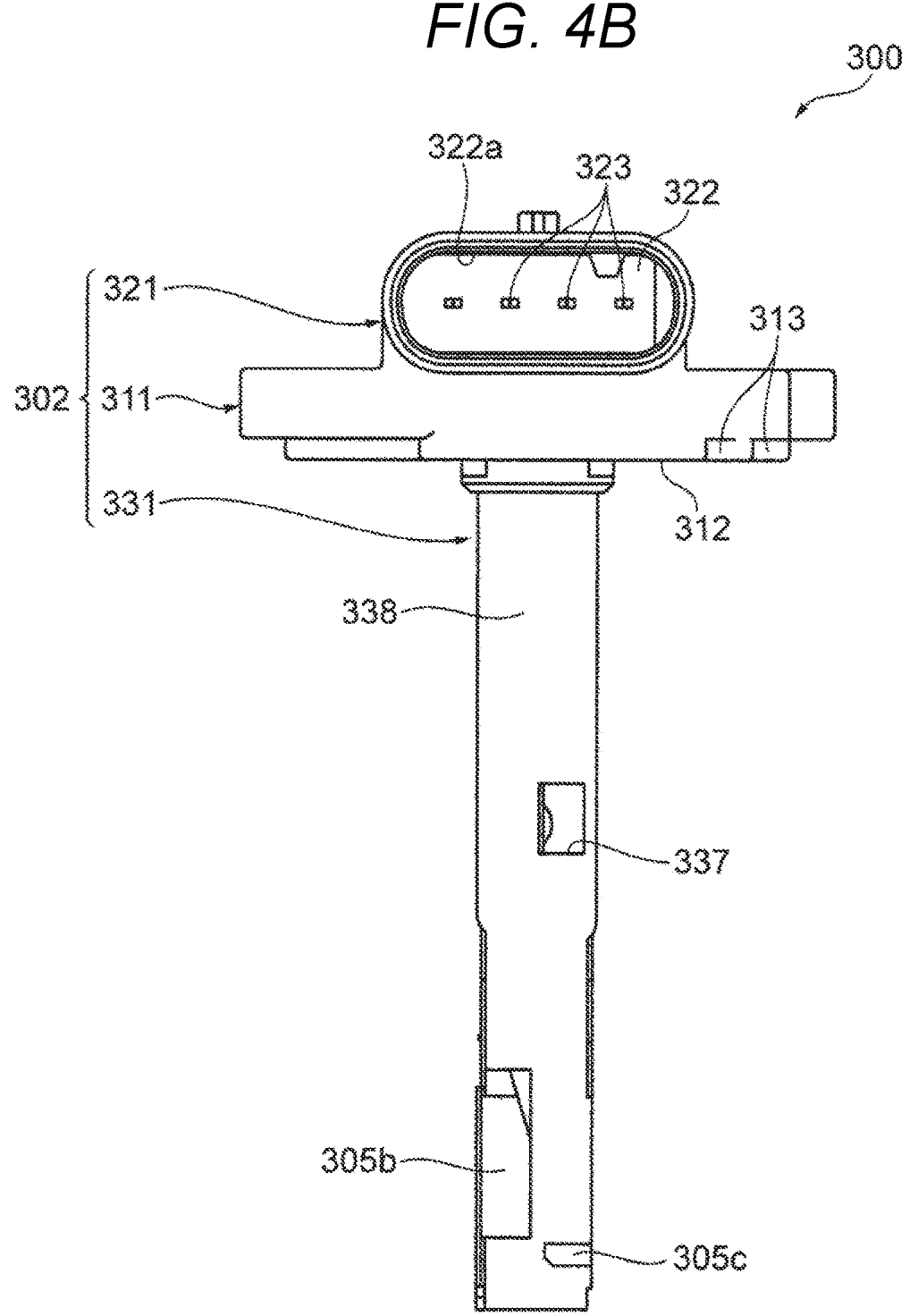
FIG. 4B is a right side view of the housing illustrated in FIG. 4A.

FIGS. 4A and 4B are diagrams illustrating another mode of the second auxiliary passage.

In this mode, the second auxiliary passage inlet 306a and the second auxiliary passage outlet 306b are formed by providing through-holes 337 in the upstream outer wall 336 and the downstream outer wall 338 instead of cutting out the upstream outer wall 336 and the downstream outer wall 338. When the second auxiliary passage inlet 306a and the second auxiliary passage outlet 306b are formed by cutting out the upstream outer wall 336 and the downstream outer wall 338, respectively, as in the second auxiliary passage illustrated in FIGS. 3-2 to 3-5 described above, a width of the upstream outer wall 336 and a width of the downstream outer wall 338 are set to be locally narrow at the corresponding positions. Thus, there is a risk that the measurement unit 331 may be distorted in substantially a dogleg shape from the notch as a starting point due to heat sink and the like at the time of molding. Since the through-hole is provided instead of the notch according to this mode, it is possible to prevent the measurement unit 331 from being folded in substantially a dogleg shape. Accordingly, it is possible to prevent the detection accuracy from being affected by a change of a position or a direction of the detection unit with respect to the measured gas 30 due to the distortion in the housing 302, and to constantly secure the certain detection accuracy without individual differences.

FIGS. 8A to 8F are diagrams illustrating another mode of the second auxiliary passage.

A partition wall to partition the second auxiliary passage 306 and the sensor chamber Rs may be provided in the rear cover 304. According to such a configuration, it is possible to cause the measured gas 30 to indirectly flow into the sensor chamber Rs from the second auxiliary passage 306, and to suppress the adhesion of contaminants or water drops to the measurement element of relative humidity by reducing the influence of the dynamic pressure with respect to the measurement element of pressure.

In the example illustrated in FIGS. 8A and 8B, two measurement elements of pressure 421A and 421B are provided in the sensor chamber Rs to be side by side in a line along the second auxiliary passage 306, and the single measurement element of relative humidity 422 is provided at a downstream side thereof. Partition walls 352A and 352B are provided in the rear cover 304, and is arranged to extend between the second auxiliary passage 306 and the sensor chamber Rs by attaching the rear cover 304 to the housing 302. To be specific, the partition wall 352A is arranged between the measurement element of pressure on an upstream side and an upstream wall of the sensor chamber Rs, and the partition wall 352B is arranged along the measurement element of relative humidity over a portion between the measurement element of pressure on the downstream side and a downstream wall of the sensor chamber Rs.

The example illustrated in FIGS. 8C and 8D illustrates the specification including only the measurement element of pressure 421B on the downstream side, and the measurement element of pressure 421A on the upstream side is omitted therein, and thus, a partition wall 352C is illustrated to be long for that. A partition wall 352D on the downstream side is arranged along the measurement element of relative humidity over a portion between the measurement element of pressure on the downstream side and the downstream wall of the sensor chamber Rs, similarly to the partition wall 352B in FIGS. 8A and 8B. Accordingly, the partition walls 352A and 352C can prevent the measured gas 30 from directly contacting the measurement element of pressure and reduce the influence of the dynamic pressure. In addition, the partition walls 352B and 352D can suppress adhesion of contaminants or water drops to the measurement element of relative humidity.

Figure 8F:
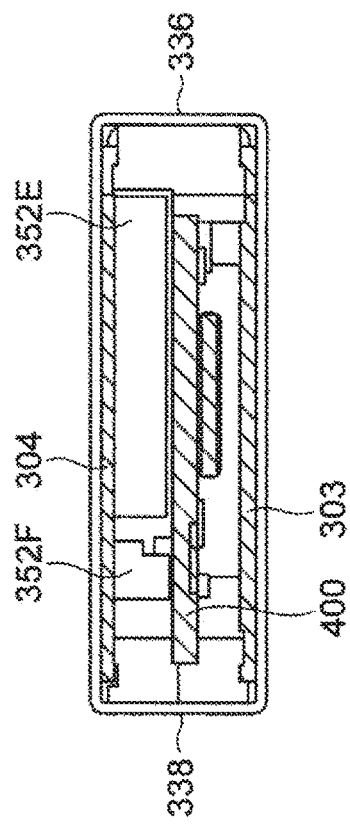
FIGS. 8E and 8F are diagrams for describing a structure of still another embodiment of the sensor chamber.
Figure 8E:
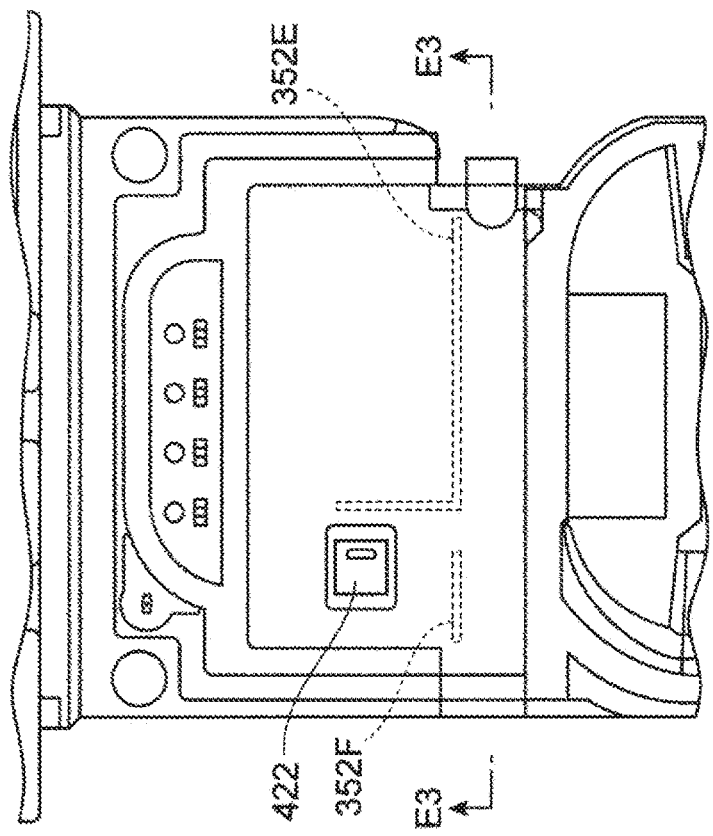

The example illustrated in FIGS. 8E and 8F illustrates the specification in which both the two measurement elements of pressure 421A and 421B are omitted, and only the single measurement element of relative humidity 422 is provided in the sensor chamber Rs. A partition wall 352E on the upstream side extends to an upstream position of the measurement element of relative humidity from the upstream wall of the sensor chamber Rs along the portion between the second auxiliary passage 306 and the sensor chamber Rs, and has substantially an L shape of being folded at the downstream end and opposing the upstream side of the measurement element of relative humidity. A partition wall 352F is arranged along the measurement element of relative humidity over the portion between the measurement element of pressure on the downstream side and the downstream wall of the sensor chamber Rs, similarly to the partition walls 352B and 352D. Accordingly, the partition wall 352E can prevent contaminants or water drops, contained in the measured gas 30 passing through the second auxiliary passage 306, from moving toward the measurement element of relative humidity and can secure the measurement element of relative humidity from such contaminants and the like.

3.4 Shape and Effect of Front Cover 303 and Rear Cover 304

Figure 5A:
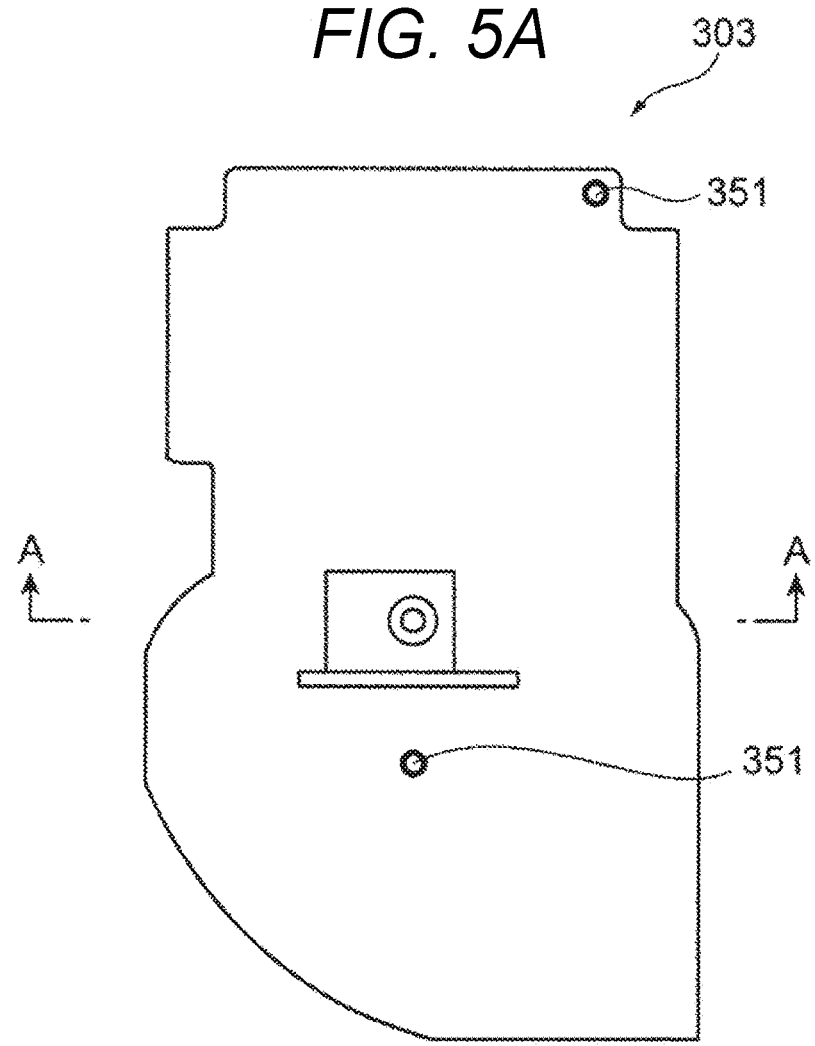
FIGS. 5A and 5B are diagrams for describing a configuration of a front-side cover.
Figure 5B:
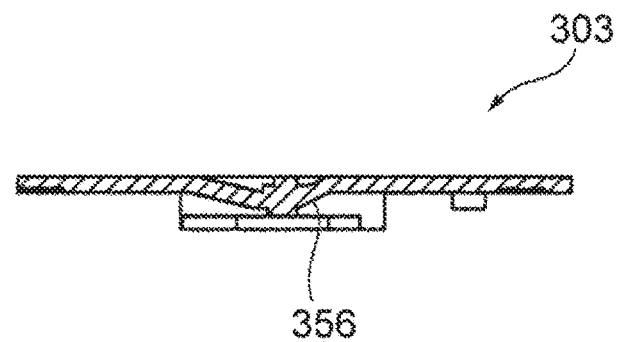
Figure 6A:
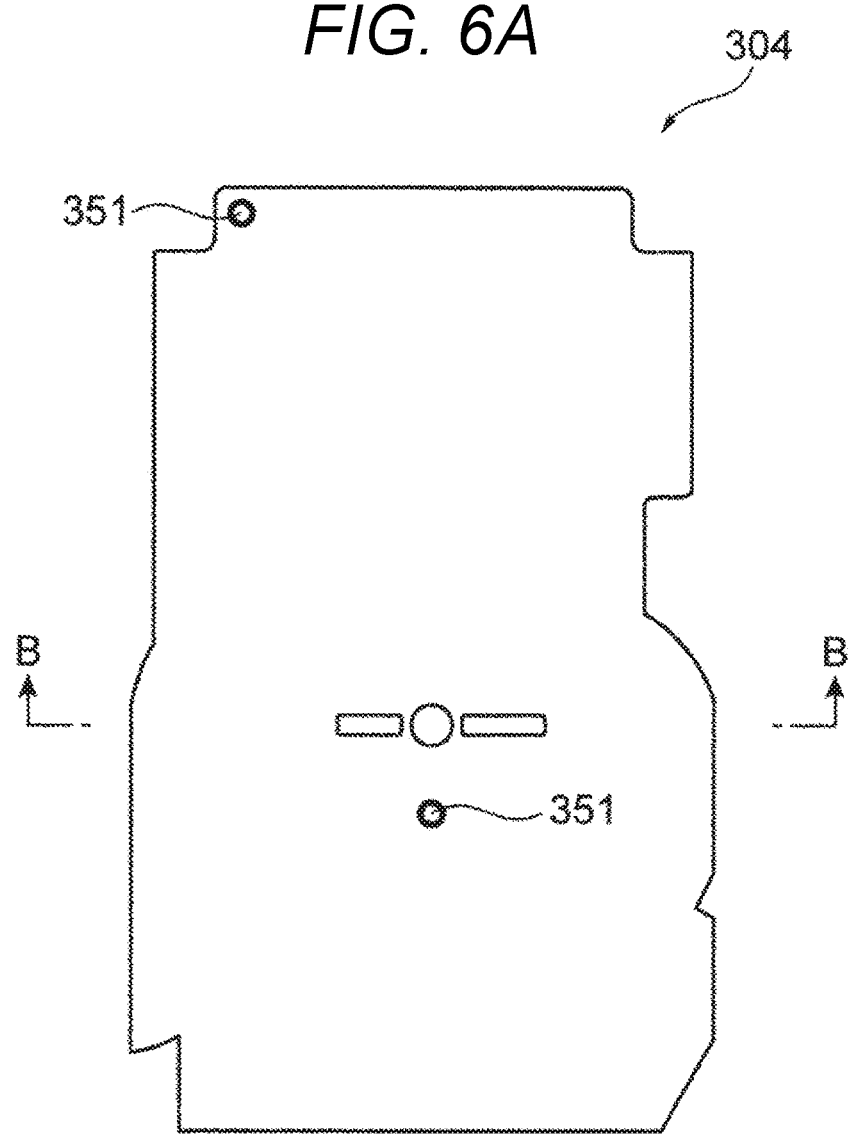
FIGS. 6A and 6B are diagrams for describing a configuration of a back-side cover.
Figure 6B:
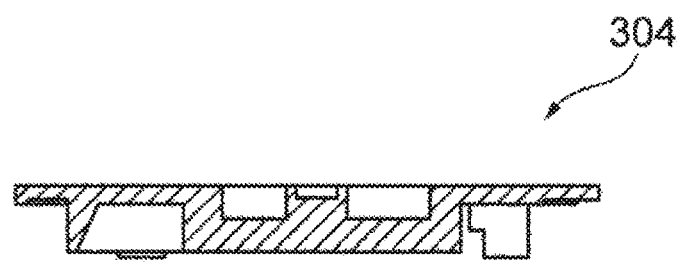

FIGS. 5A and 5B are diagrams illustrating appearance of the front cover 303. FIG. 5A is a front view, and FIG. 5B is a cross-sectional view taken along a line B-B of FIG. 5A. FIGS. 6A and 6B are diagrams illustrating appearance of the rear cover 304. FIG. 6A is a front view, and FIG. 6B is a cross-sectional view taken along a line B-B of FIG. 6A.

In FIGS. 5A, 5B, 6A, and 6B, the front cover 303 and the rear cover 304 create the first auxiliary passage 305 by blocking the front auxiliary passage groove 332 and the rear auxiliary passage 334 of the housing 302. In addition, the front cover 303 creates the sealed circuit chamber Rc, and the rear cover 304 creates the second auxiliary passage 306 and the sensor chamber Rs communicating with the second auxiliary passage 306 by blocking a concave portion on the rear surface side of the measurement unit 331.

The front cover 303 is provided with a protruding portion 356 at a position opposing the measurement element of air flow 602, and is used for creation of an aperture against the measurement flow path surface 430. Thus, it is desirable that molding accuracy be high. The front cover 303 and the rear cover 304 are created by a resin molding process of injecting thermoplastic resin into a mold, and thus, can be created with high molding accuracy.

The front cover 303 and the rear cover 304 are provided with a plurality of fixing holes 351 into which a plurality of fixing pins 350 protruding from the measurement unit 331 are inserted, respectively. The front cover 303 and the rear cover 304 are attached to the front surface and the rear surface of the measurement unit 331, respectively. At this time, the fixing pin 350 is inserted into the fixing hole 351 and positioning thereof is performed. Further, the front auxiliary passage groove 332 and the rear auxiliary passage groove 334 are bonded to each other along each edge by laser welding and the like, and the circuit chamber Rc and the sensor chamber Rs are bonded to each other along each edge by laser welding and the like.

3.5 Fixing Structure and Effect According to Housing 302 of Circuit Board 400

Next, fixing according to the resin molding process of the circuit board 400 into the housing 302 will be described. The circuit board 400 is molded to be integrated with the housing 302 such that the measurement element of air flow 602 of the circuit board 400 is arranged at a predetermined location of the auxiliary passage groove forming the auxiliary passage, for example, the opening portion 333 which is a connecting portion between the front auxiliary passage groove 332 and the rear auxiliary passage groove 334 in the present embodiment.

In the measurement unit 331 of the housing 302, portions which embed an outer circumferential edge of a base portion 402 of the circuit board 400 by resin molding to be fixed to the housing 302 are provided as fixing portions 372 and 373. The fixing portions 372 and 373 fix the outer circumferential edge of the base portion 402 of the circuit board 400 by sandwiching the both between a front side and a rear side thereof.

The housing 302 is manufactured by the resin molding process. In this resin molding process, the circuit board 400 is built in the resin of the housing 302 and is fixed inside the housing 302 by resin molding. In this manner, it is possible to maintain the auxiliary passage to allow the measurement element of air flow 602 to perform heat transfer with respect to the measured gas 30 to measure the flow rate, for example, a positional relationship, a directional relationship, or the like, the relationship with the shape of the front auxiliary passage groove 332 or the rear auxiliary passage groove 334 with extremely high accuracy, and it is possible to suppress an error or a variation generated for each of the circuit boards 400 to an extremely small value. As a result, it is possible to significantly improve the measurement accuracy of the circuit board 400. For example, it is possible to dramatically improve the measurement accuracy as compared to a fixing method of the related art using an adhesive.

The physical quantity measuring device 300 is often produced by mass-production, and there is a limit in the method of performing adhesion using the adhesive while performing thorough measurement in terms of the improvement of measurement accuracy. However, it is possible to significantly reduce the variation in measurement accuracy and to significantly improve the measurement accuracy of each of the physical quantity measuring devices 300 by molding the auxiliary passage through the resin molding process of molding the auxiliary passage in which the measured gas 30 flows and fixing the circuit board 400 at the same time as in the present embodiment.

When a description is further given with reference to the embodiment illustrated in, for example, FIGS. 3-1 to 3-5, the circuit board 400 can be fixed to the housing 302 with high accuracy such that a relationship among the front auxiliary passage groove 332, the rear auxiliary passage groove 334, and the measurement element of air flow 602 becomes a defined relationship. In the physical quantity measuring device 300 mass-produced in this manner, it is possible to regularly obtain the positional relationship between the measurement element of air flow 602 of each of the circuit boards 400 and the first auxiliary passage 305 or the relationship between the shapes thereof with extremely high accuracy.

In regard to the first auxiliary passage 305 to which the measurement element of air flow 602 of the circuit board 400 is fixed and arranged, work of molding the first auxiliary passage 305 using these auxiliary passage grooves 332 and 334 corresponds to work of covering both the surfaces of the housing 302 using the front cover 303 and the rear cover 304 since the front auxiliary passage groove 332 and the rear auxiliary passage groove 334 can be molded with extremely high accuracy, for example. This work requires a work process which is very simple and has few factors that cause deterioration in measurement accuracy. In addition, the front cover 303 and the rear cover 304 are produced in a process using resin molding with high molding accuracy. Accordingly, it is possible to complete the auxiliary passage provided to have the defined relationship with the measurement element of air flow 602 of the circuit board 400 with high the accuracy. According to this method, it is possible to obtain high productivity in addition to the improvement of measurement accuracy.

On the contrary, a thermal flow meter is produced in the related art by manufacturing an auxiliary passage, and then, attaching a measurement unit to the auxiliary passage using an adhesive. In such a method of using the adhesive, a variation in thickness of the adhesive is great and an adhesion position and an adhesion angle vary for each product. Thus, there is a limit in the improvement of measurement accuracy. Further, when these kinds of work are performed in the mass-production process, the improvement of measurement accuracy becomes very difficult.

In the embodiment according to the present invention, the circuit board 400 is fixed by the resin molding and the auxiliary passage groove for molding of the first auxiliary passage 305 is molded by the resin molding at the same time. In this manner, it is possible to fix the shape of the auxiliary passage groove and to fix the measurement element of air flow 602 to the auxiliary passage groove with extremely high accuracy.

Portions relating to measurement of the flow rate, for example, the measurement element of air flow 602 and the measurement flow path surface 430 to which the measurement element of air flow 602 is attached are provided on the front surface of the circuit board 400. The measurement element of air flow 602 and the measurement flow path surface 430 are exposed from the resin molding the housing 302. That is, the measurement element of air flow 602 and the measurement flow path surface 430 are configured not to be covered by the resin that molds the housing 302. The measurement element of air flow 602 of the circuit board 400 and the measurement flow path surface 430 are also used after the resin molding of the housing 302, without any change, for the flow rate measurement of the physical quantity measuring device 300. In this manner, the measurement accuracy is improved.

In the embodiment according to the present invention, the circuit board 400 is fixed to the housing 302 including the first auxiliary passage 305 by molding the circuit board 400 to be integrated with the housing 302, and thus, it is possible to reliably fix the circuit board 400 to the housing 302. In particular, the structure in which a protruding portion 403 of the circuit board 400 penetrates the partition wall 335 to protrude toward the first auxiliary passage 305 is given, and thus, the sealability between the first auxiliary passage 305 and the circuit chamber Rc is high. Further, it is possible to prevent the measured gas 30 from being leaked into the circuit chamber Rc from the first auxiliary passage 305, and to prevent circuit parts, wiring and the like of the circuit board 400 from contacting the measured gas 30 and corroding.

3.6 Structure and Effect of Terminal-Connecting Portion 320

Figure 10A:
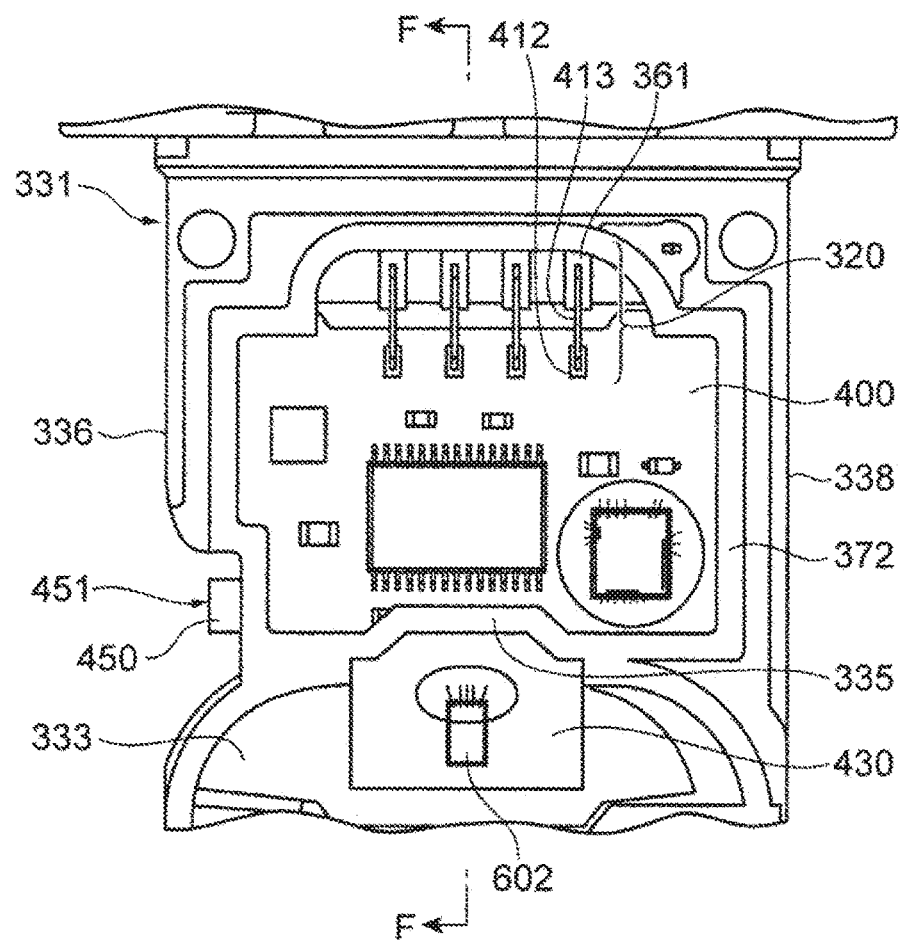
FIG. 10A is a diagram for describing a structure of a terminal-connecting portion.
Figure 10B:
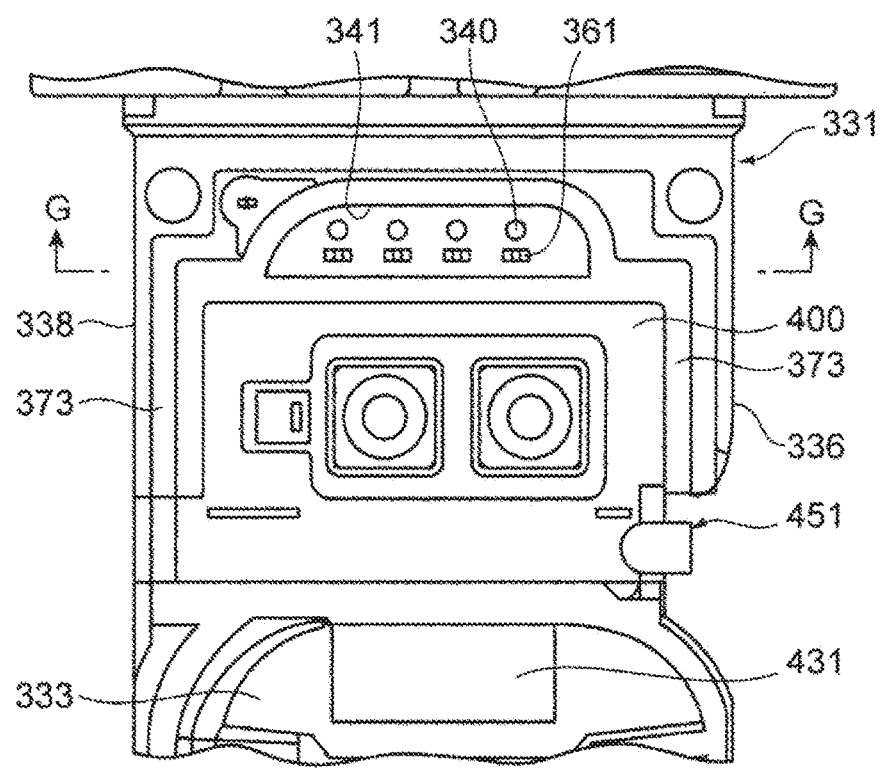
FIG. 10B is a diagram for describing the structure of the terminal-connecting portion.

Next, a structure of a terminal-connecting portion will be described hereinafter with reference to FIGS. 10A to 10E. FIG. 10A is a diagram for describing the structure of the terminal-connecting portion, FIG. 10B is a diagram for describing the structure of the terminal-connecting portion, FIG. 10C is a cross-sectional view taken along a line F-F of FIG. 10A, and FIGS. 10D and 10E are cross-sectional views taken along a line of G-G in FIG. 10B.

The terminal-connecting portion 320 has a configuration in which an inner end portion 361 of the external terminal 323 and a connection terminal 412 of the circuit board 400 are connected using a gold wire 413. As illustrated in FIG. 10A, the inner end portions 361 of the respective external terminals 323 protrude inside the circuit chamber Rc from the flange 311, and the inner end portions 361 of the respective external terminals 323 are arranged side by side with a predetermined interval interposed therebetween in accordance with a position of the connection terminal 412 of the circuit board 400.

Figure 10C:
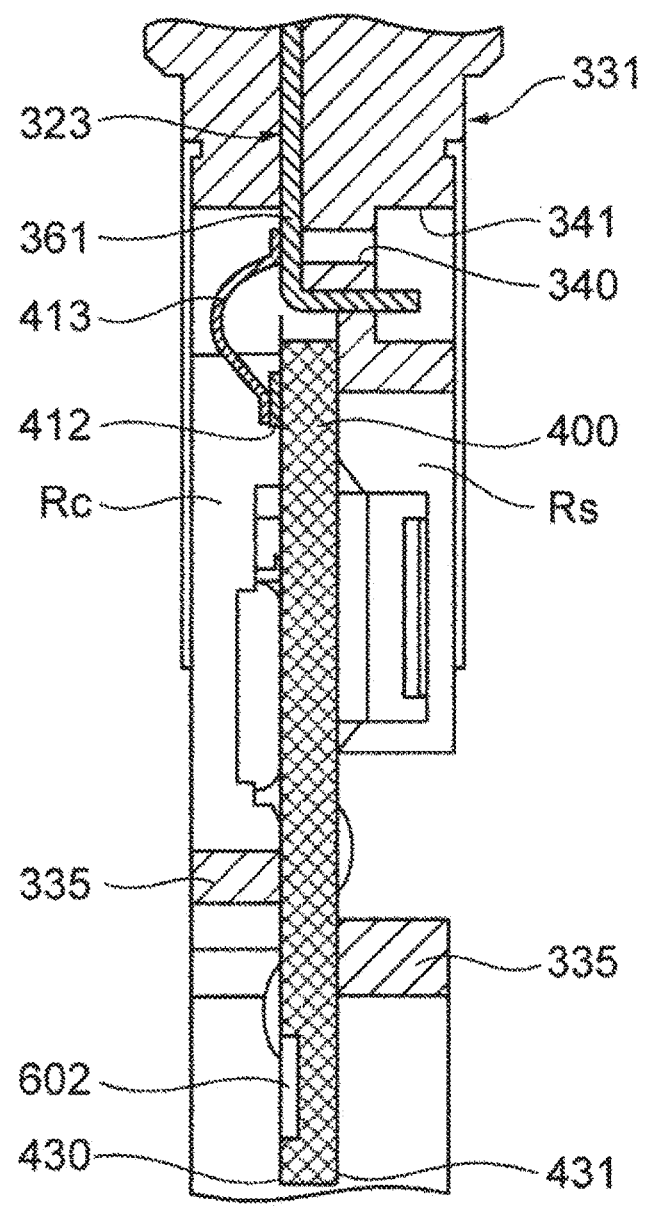
FIG. 10C is a cross-sectional view taken along a line F-F of FIG. 10A.
Figure 10D:
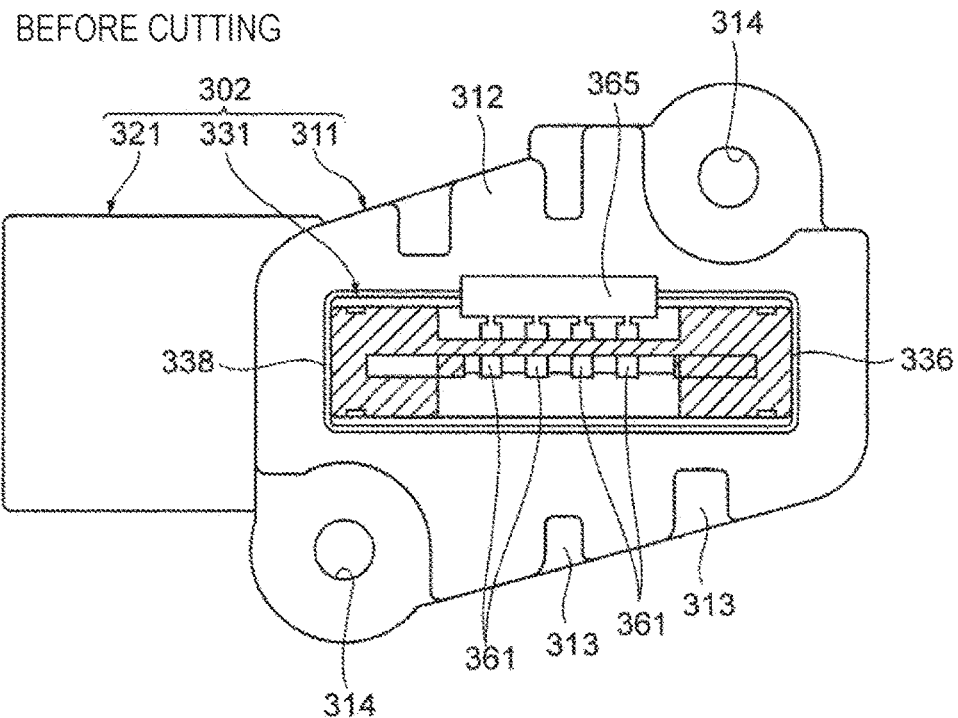
FIGS. 10D and 10E are cross-sectional views taken along a line G-G of FIG. 10B.
Figure 10E:
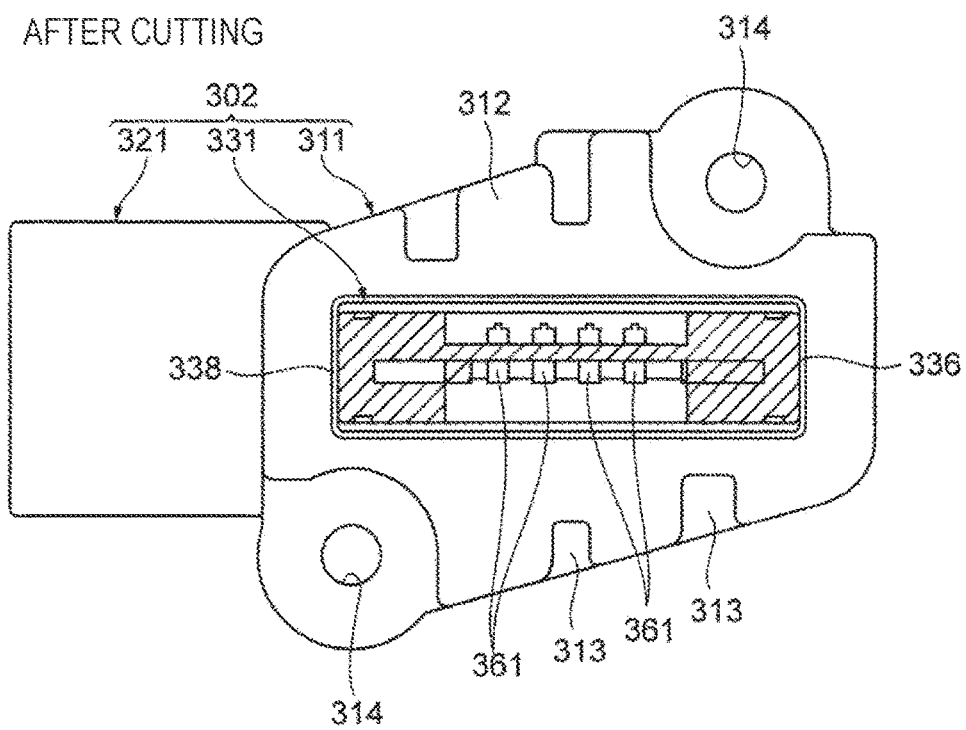

As illustrated in FIG. 10C, the inner end portion 361 is arranged at a position to be substantially flush with the front surface of the circuit board 400. Further, a distal end of the inner end portion is folded from the front surface of the measurement unit 331 toward the rear surface in a substantially L shape, and protrudes to the rear surface of the measurement unit 331. The distal ends of the inner end portions 361 are linked to each other via a linking portion 365 as illustrated in FIG. 10D, and are divided individually by cutting the linking portion 365 away after molding as illustrated in FIG. 10E.

The respective inner end portions 361 are fixed to the housing 302 by resin molding in a molding process such that the inner end portions 361 and the circuit board 400 are arranged on the same plane. The respective inner end portions 361 are fixed to the housing 302 by the resin molding process in a state of being linked and integrated with each other via the linking portion 365 in order to prevent deformation or deviation in arrangement. Further, after being fixed to the housing 302, the linking portion 365 is cut away.

The inner end portion 361 is resin-molded in the state of being sandwiched from the front surface side and the rear surface side of the measurement unit 331. At this time, the mold abuts on a front surface of the inner end portion 361 over the entire surface, and the fixing pin abuts on the rear surface of the inner end portion 361. Accordingly, the front surface of the inner end portion 361 to which the gold wire is welded can be completely exposed without being covered by mold resin due to leakage of resin, and the welding of the gold wire can be easily performed. Incidentally, a pin hole 340 of a mark obtained when the inner end portion 361 is pressed by the fixing pin is formed in the measurement unit 331.

The distal end of the inner end portion 361 protrudes inside a concave portion 341 formed in the rear surface of the measurement unit 331. The concave portion 341 is covered by the rear cover 304, and the perimeter of the concave portion 341 is boded continuously to the rear cover 304 by laser welding and the like, thereby forming the sealed interior space. Accordingly, it is possible to prevent the inner end portion 361 from contacting the measured gas 30 and corroding.

4. Appearance of Circuit Board 400

4.1 Molding of Measurement Flow Path Surface 430 Provided with Measurement Element of Air Flow 602

FIGS. 7A to 7F illustrate appearance of the circuit board 400. Incidentally, inclined portions illustrated on the appearance of the circuit board 400 represent a fixing surface 432 and a fixing surface 434 obtained by covering and fixing the circuit board 400 using resin at the time of molding the housing 302 in the resin molding process.

Figure 7A:
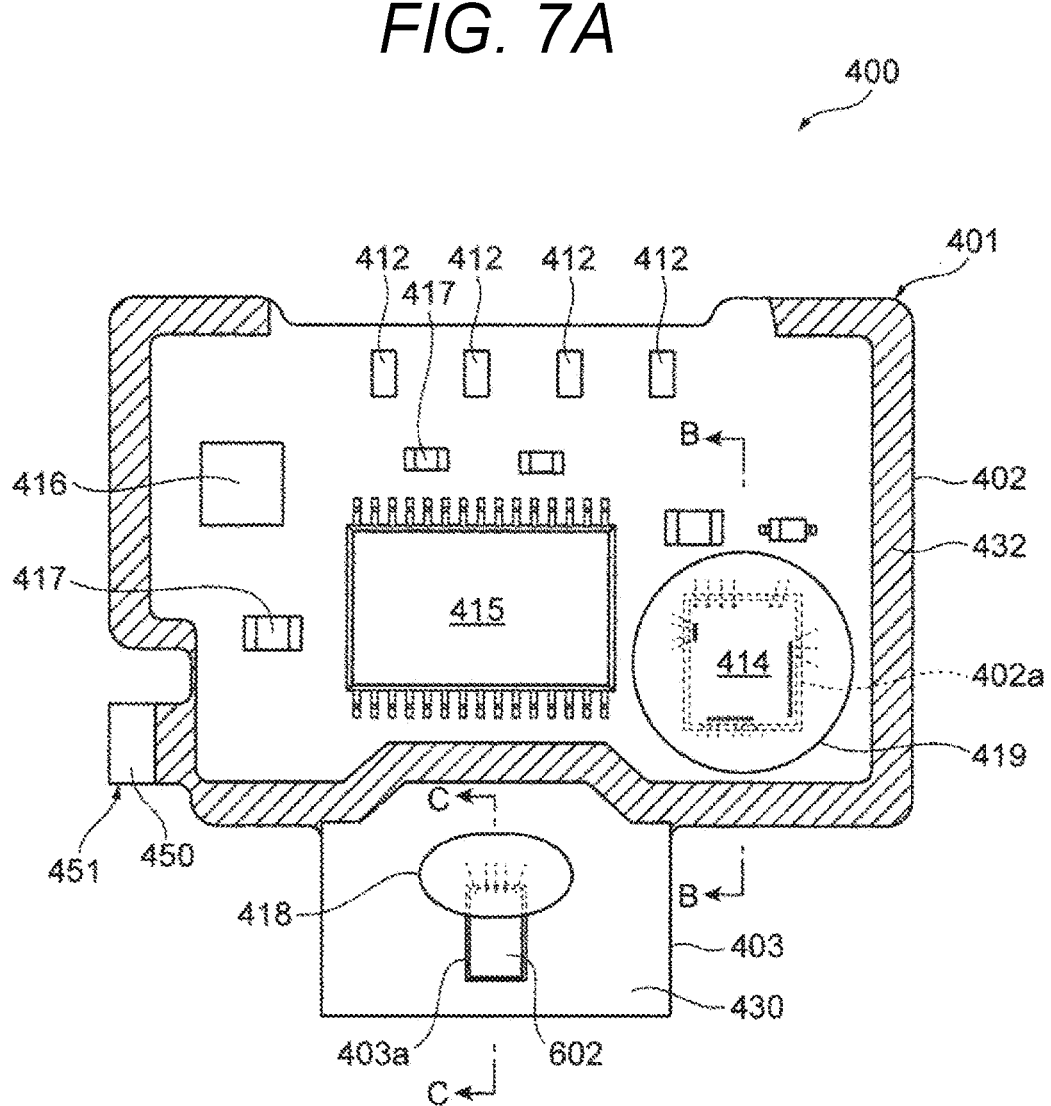
FIG. 7A is a front view of a circuit board.
Figure 7B:
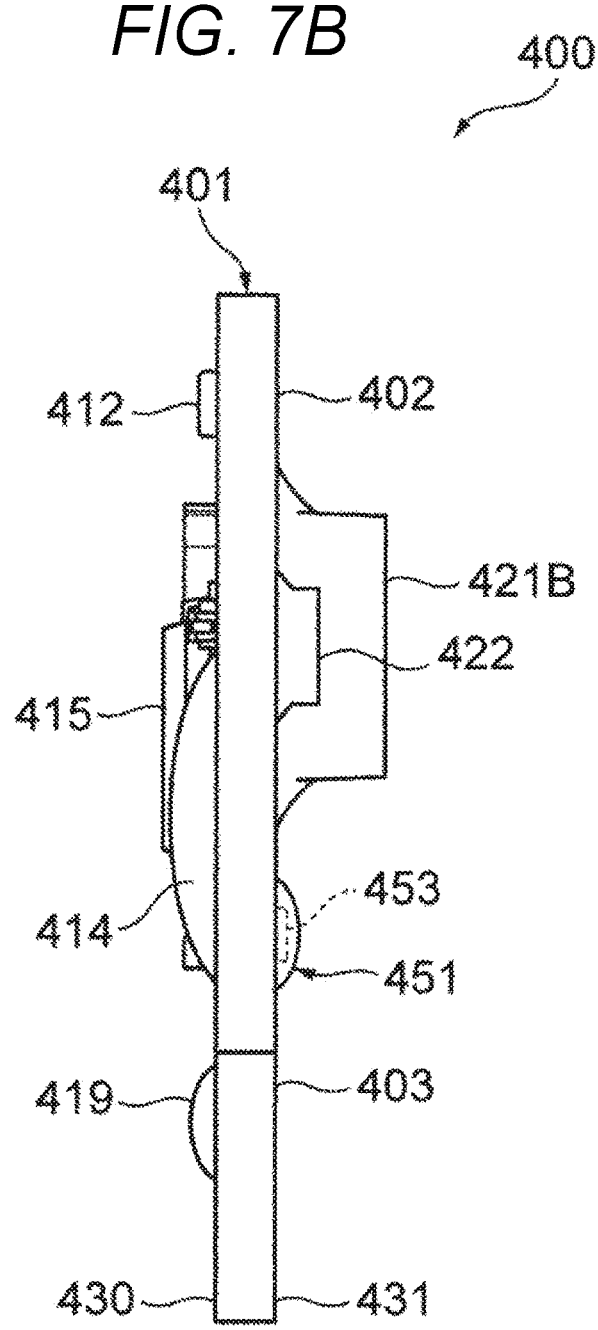
FIG. 7B is a right side view of the circuit board.
Figure 7C:
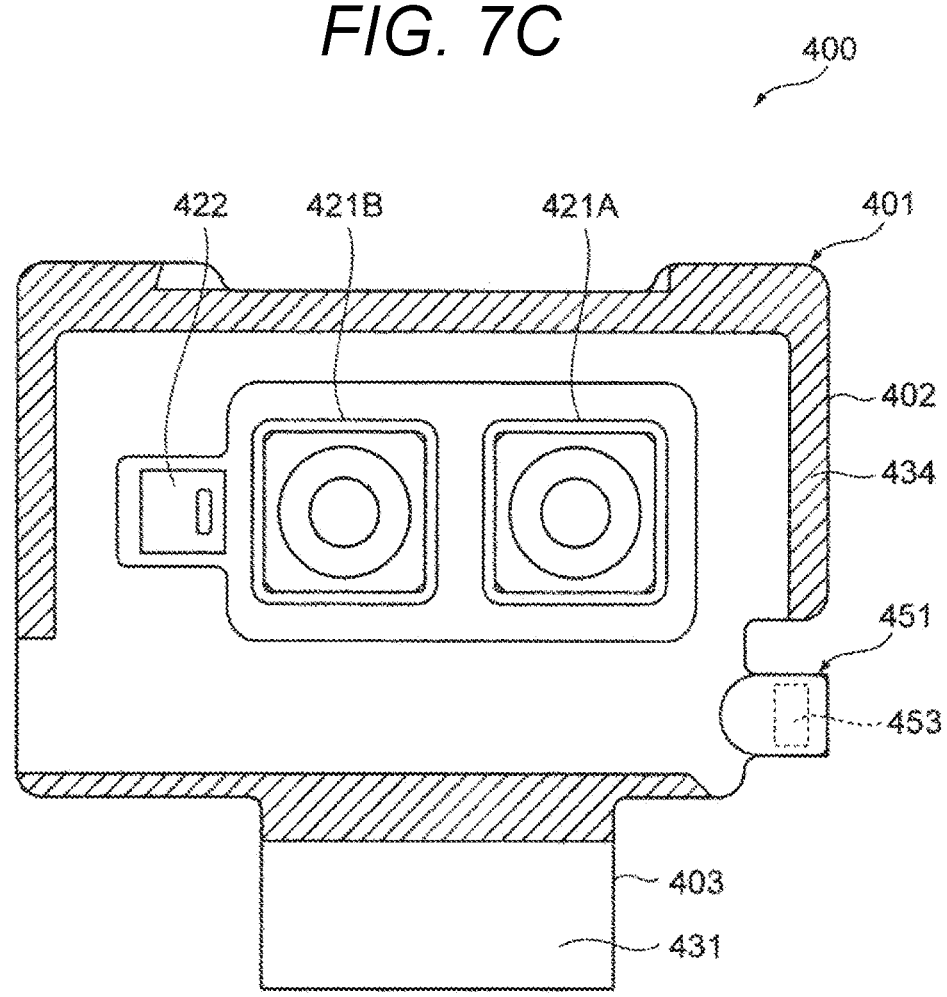
FIG. 7C is a back view of the circuit board.
Figure 7D:
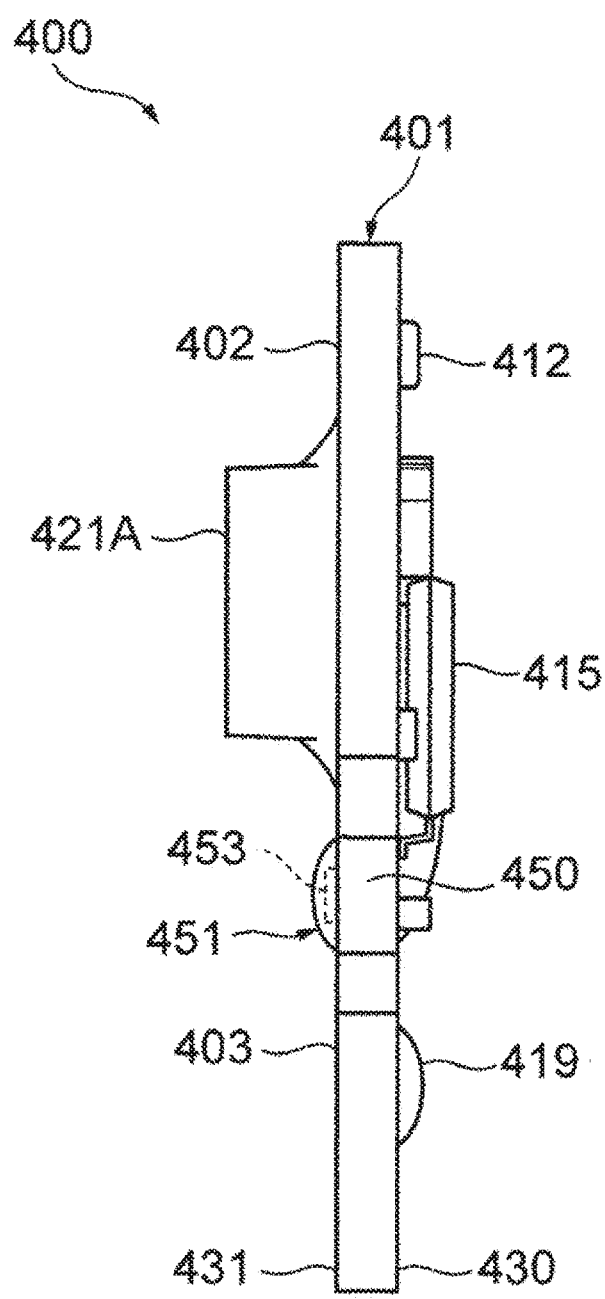
FIG. 7D is a left side view of the circuit board.
Figure 7E:
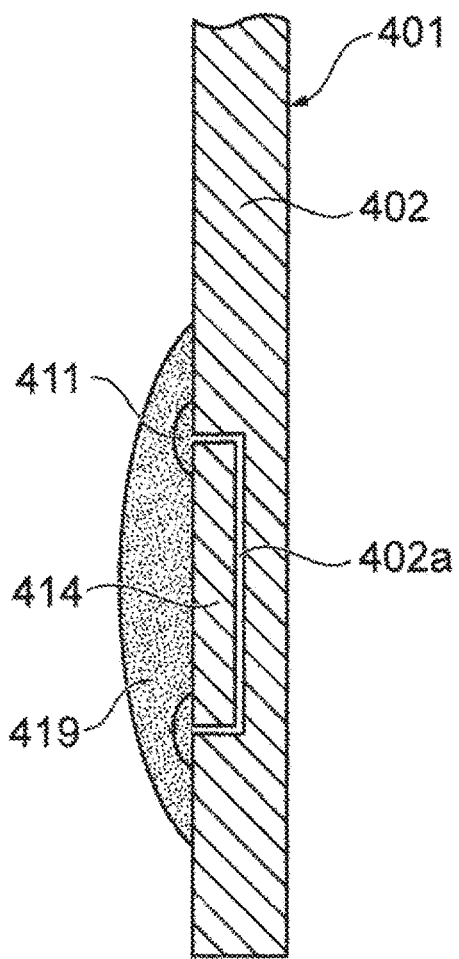
FIG. 7E is a cross-sectional view taken along a line B-B of FIG. 7A.
Figure 7F:
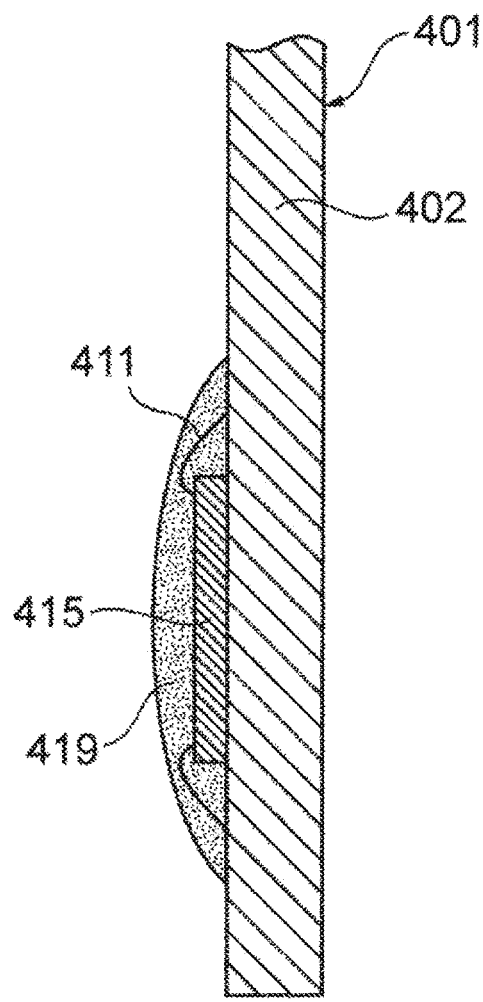
FIG. 7F is a diagram illustrating another embodiment which corresponds to a cross-section taken along the line B-B of FIG. 7A.
Figure 7G:
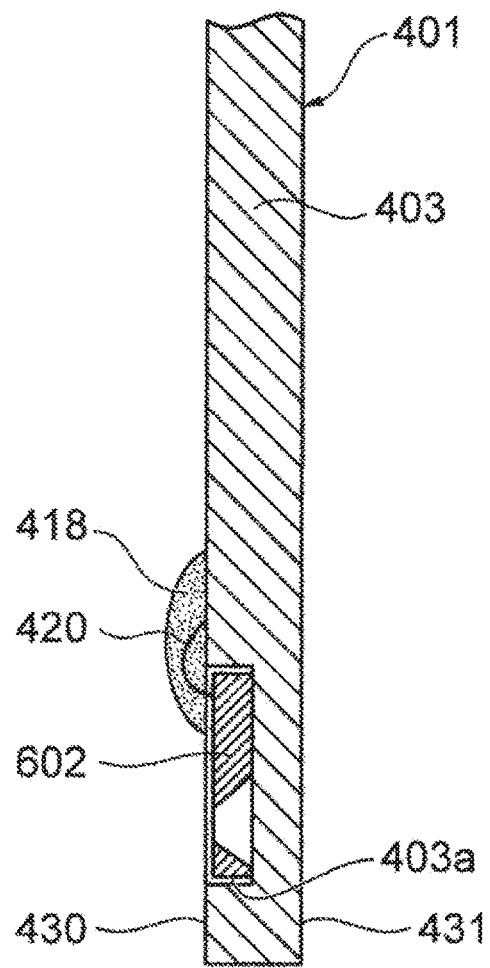
FIG. 7G is a cross-sectional view taken along a line C-C of FIG. 7A.

FIG. 7A is a front view of the circuit board, FIG. 7B is a right side view of the circuit board, FIG. 7C is a back view of the circuit board, FIG. 7D is a left side view of the circuit board, FIG. 7E is a cross-sectional view taken along a line B-B illustrating a cross-section of the LSI part of FIG. 7A, and FIG. 7F is a cross-sectional view taken along a line C-C of the detection unit in FIG. 7A.

The circuit board 400 includes the substrate main body 401. The circuit unit and the measurement element of air flow 602 serving as a sensing element are provided on the front surface of the substrate main body 401, and the measurement element of pressure 421 and the measurement element of relative humidity 422 serving as sensing elements are provided on the rear surface of the substrate main body 401. The substrate main body 401 is configured using a material made of glass epoxy resin, and has a value which is the same as or approximate to a thermal expansion coefficient of thermoplastic resin with which the housing 302 is molded. Accordingly, it is possible to reduce stress caused by a difference in thermal expansion coefficient at the time of being insert-molded in the housing 302, and it is possible to decrease distortion of the circuit board 400.

The substrate main body 401 has a flat shape with a constant thickness, and has a substantially T-shape when seen in a plan view including the substantially square-shaped base portion 402 and the substantially square-shaped protruding portion 403 that protrudes from one side of the base portion 402 and is smaller than the base portion 402 by one size. The circuit unit is provided on a front surface of the base portion 402. The circuit unit is configured by mounting electronic parts such as an LSI 414, a microcomputer 415, a power supply regulator 416 and chip parts 417, such as a resistor and a capacitor, on a circuit wiring (not illustrated). The power supply regulator 416 generates a great amount of heat as compared to the other electronic parts, such as the microcomputer 415 and the LSI 414, and thus, is arranged relatively on the upstream side in the circuit chamber Rc. The entire part of the LSI 414 is sealed by a synthetic resin material 419 so as to include a gold wire 411, thereby improving a handling property of the circuit board 400 at the time of insert-molding.

As illustrated in FIG. 7E, a concave portion 402a to which the LSI 414 is fitted is provided to recess on the front surface of the substrate main body 401. This concave portion 402a can be formed by performing laser processing on the substrate main body 401. The substrate main body 401 made of the glass epoxy resin can be more easily processed than a substrate main body made of ceramic, and accordingly, it is possible to easily provide the concave portion 402. The concave portion 402 has a depth such that a front surface of the LSI 414 is flush with the front surface of the substrate main body 401. When the height of the front surface of the LSI 414 and the height of the front surface of the substrate main body 401 are set to match each other, the wire bonding to connect the LSI 414 and the substrate main body 401 with the gold wire 411 becomes easy, and the manufacturing of the circuit board 400 becomes easy. The LSI 414 can be directly provided on the front surface of the substrate main body 401, for example, as illustrated in FIG. 7F. In such a structure, the process of forming the concave portion 402 in the substrate main body 401 is unnecessary, and it is possible to simplify the manufacturing although the synthetic resin material 419 with which the LSI 414 is coated protrudes greater.

The protruding portion 403 is arranged inside the first auxiliary passage 305 at the time of insert-molding the circuit board 400 in the housing 302, and the measurement flow path surface 430, which is a front surface of the protruding portion 403, extends along the flow direction of the measured gas 30. The measurement element of air flow 602 is provided on the measurement flow path surface 430 of the protruding portion 403. The measurement element of air flow 602 performs heat transfer with the measured gas 30, measures a state of the measured gas 30, for example, flow speed of the measured gas 30, and outputs an electric signal indicating the flow rate of the gas flowing in the air intake system 124. It is desirable that the gas flowing in the vicinity of the measurement flow path surface 430 be laminar flow and have little disorder in order to make the measurement element of air flow 602 measure the state of the measured gas 30 with high accuracy. Thus, it is desirable that the front surface of the measurement element of air flow 602 and a surface of the measurement flow path surface 430 be flush with each other, or a difference therebetween is a predetermined value or smaller.

The concave portion 403a is provided to recess in the front surface of the measurement flow path surface 430, and the measurement element of air flow 602 is fitted thereto. The concave portion 403a can be also formed by performing laser processing. The concave portion 403a has a depth such that the front surface of the measurement element of air flow 602 is flush with the front surface of the measurement flow path surface 430. The measurement element of air flow 602 and a wiring portion thereof are coated with a synthetic resin material 418 so as to prevent electric corrosion caused by adhesion of salt water.

The two measurement elements of pressure 421A and 421B, and the one measurement element of relative humidity 422 are provided on the rear surface of the substrate main body 401. The two measurement elements of pressure 421A and 421B are arranged in a line to be divided into the upstream side and the downstream side. Further, the measurement element of relative humidity 422 is arranged on the downstream side of the measurement element of pressure 421B. These two measurement elements of pressure 421A and 421B and the one measurement element of relative humidity 422 are arranged inside the sensor chamber Rs. Although the case where the two measurement elements of pressure 421A and 421B and the one measurement element of relative humidity 422 are provided in the example illustrated in FIG. 7C, only the measurement element of pressure 421B and the measurement element of relative humidity 422 may be provided as illustrated in FIG. 8C, and further, only the measurement element of relative humidity 422 may be provided as illustrated in FIG. 8E.

In the circuit board 400, the second auxiliary passage 306 is arranged on the rear surface side of the substrate main body 401. Accordingly, the entire substrate main body 401 can be cooled by the measured gas 30 passing through the second auxiliary passage 306.

4.2 Structure of Temperature Detection Unit 451

A temperature detection unit 451 is provided at an upstream end side of the base portion 402 and at a corner on the protruding portion 403 side. The temperature detection unit 451 is configured as one of the detection units for detection of the physical quantity of the measured gas 30 flowing in the air intake system 124 and is provided in the circuit board 400. The circuit board 400 includes a protruding portion 450, which protrudes toward the upstream side of the measured gas 30 from the second auxiliary passage inlet 306a of the second auxiliary passage 306, and the temperature detection unit 451 includes a chip-type temperature sensor 453 provided in the protruding portion 450 on the rear surface of the circuit board 400. The temperature sensor 453 and a wiring portion thereof are coated with a synthetic resin material so as to prevent electric corrosion caused by adhesion of salt water.

For example, the upstream outer wall 336 inside the measurement unit 331 forming the housing 302 is dent toward the downstream side at a central portion of the measurement unit 331 where the second auxiliary passage inlet 306a is provided as illustrated in FIG. 3B, and the protruding portion 450 of the circuit board 400 protrudes toward the upstream side from the dent-shaped upstream outer wall 336. A distal end of the protruding portion 450 is arranged at a position recessing more than a surface of the upstream outer wall 336 on the most upstream side. The temperature detection unit 451 is provided in the protruding portion 450 to face the back surface of the circuit board 400, that is, the second auxiliary passage 306 side.

Since the second auxiliary passage inlet 306a is formed on the downstream side of the temperature detection unit 451, the measured gas 30 flowing from the second auxiliary passage inlet 306a into the second auxiliary passage 306 flows into the second auxiliary passage inlet 306a after contacting the temperature detection unit 451, and the temperature thereof is detected at the time of contacting the temperature detection unit 451. The measured gas 30 contacting the temperature detection unit 451 directly flows into the second auxiliary passage 306 from the second auxiliary passage inlet 306a, and is discharged from the second auxiliary passage outlet 306b to the air intake system 123 passing through the second auxiliary passage 306.

Figure 9A:
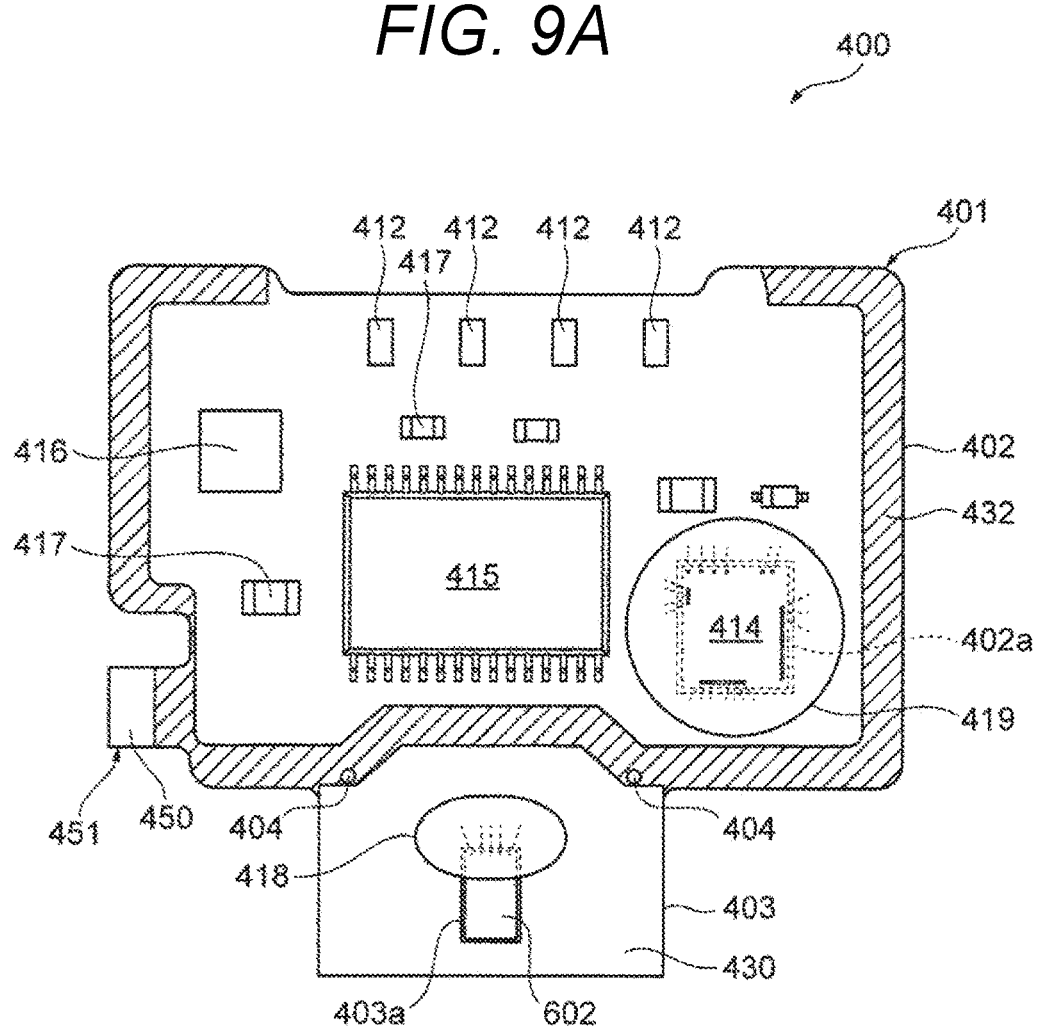
FIG. 9A is a front view illustrating another embodiment of the circuit board.

4.4 Fixing of Circuit Board 400 Using Resin Molding Process and Effect Thereof A shaded portion in FIG. 9A indicates the fixing surface 432 and the fixing surface 434 configured to cover the circuit board 400 with thermoplastic resin used in the resin molding process in order to fix the circuit board 400 to the housing 302 during the resin molding process. It is important to maintain the relationship between the measurement flow path surface 430 and the measurement element of air flow 602 provided in the measurement flow path surface 430, and the shape of the auxiliary passage to be the defined relationship with high accuracy.

Since the circuit board 400 is fixed to the housing 302 forming the auxiliary passage at the same time of molding the auxiliary passage in the resin molding process, it is possible to maintain the relationship between the auxiliary passage, and the measurement flow path surface 430 and the measurement element of air flow 602 with extremely high accuracy. That is, since the circuit board 400 is fixed to the housing 302 in the resin molding process, it is possible to position and fix the circuit board 400 inside the mold for molding of the housing 302 including the auxiliary passage with high accuracy. The auxiliary passage is molded with high accuracy and the circuit board 400 is fixed with high accuracy when the high-temperature thermoplastic resin is injected into the mold. Accordingly, it is possible to suppress the error or the variation generated for each of the circuit board 400 to the extremely small value. As a result, it is possible to significantly improve the measurement accuracy of the circuit board 400.

In this embodiment, an outer circumference of the base portion 402 of the substrate main body 401 is covered by the fixing portions 372 and 373 of mold resin for molding the housing 302 so as to form the fixing surfaces 432 and 434. In the embodiment illustrated in FIG. 9A, a through-hole 404 is provided in the substrate main body 401 of the circuit board 400 as a fixing means for further firm fixation, and the through-hole 404 is filled with mold resin so as to increase a fixing force of the substrate main body 401. The through-hole 404 is provided at a position to be fixed by the partition wall 335, and a front side and a back side of the partition wall 335 are connected to each other via the through-hole 404.

The through-hole 404 is preferably provided at a position corresponding to the partition wall 335. Since the mold resin is thermoplastic resin and the substrate main body 401 is made of glass epoxy, the chemical bonding action therebetween is low and the resin and the substrate main body 401 are hardly brought into close-contact with each other. The partition wall 335 has a long length relative to a width thereof, and has a structure that easily overhangs in a direction away from the substrate main body 401. Therefore, it is possible to cause the partition walls 335 sandwiching the substrate main body 401 to be physically coupled to each other via the through-hole 404 by providing the through-hole 404 at the position corresponding to the partition wall 335. Therefore, the circuit board 400 can be more firmly fixed to the housing 302, and it is possible to prevent a gap from being formed against the protruding portion 403. Therefore, it is possible to prevent the measured gas 30 from passing through the gap between the partition wall 335 and the protruding portion 403 and entering into the circuit chamber Rc, and to completely seal the inside of the circuit chamber Rc in an airtight manner.

Figure 9B:
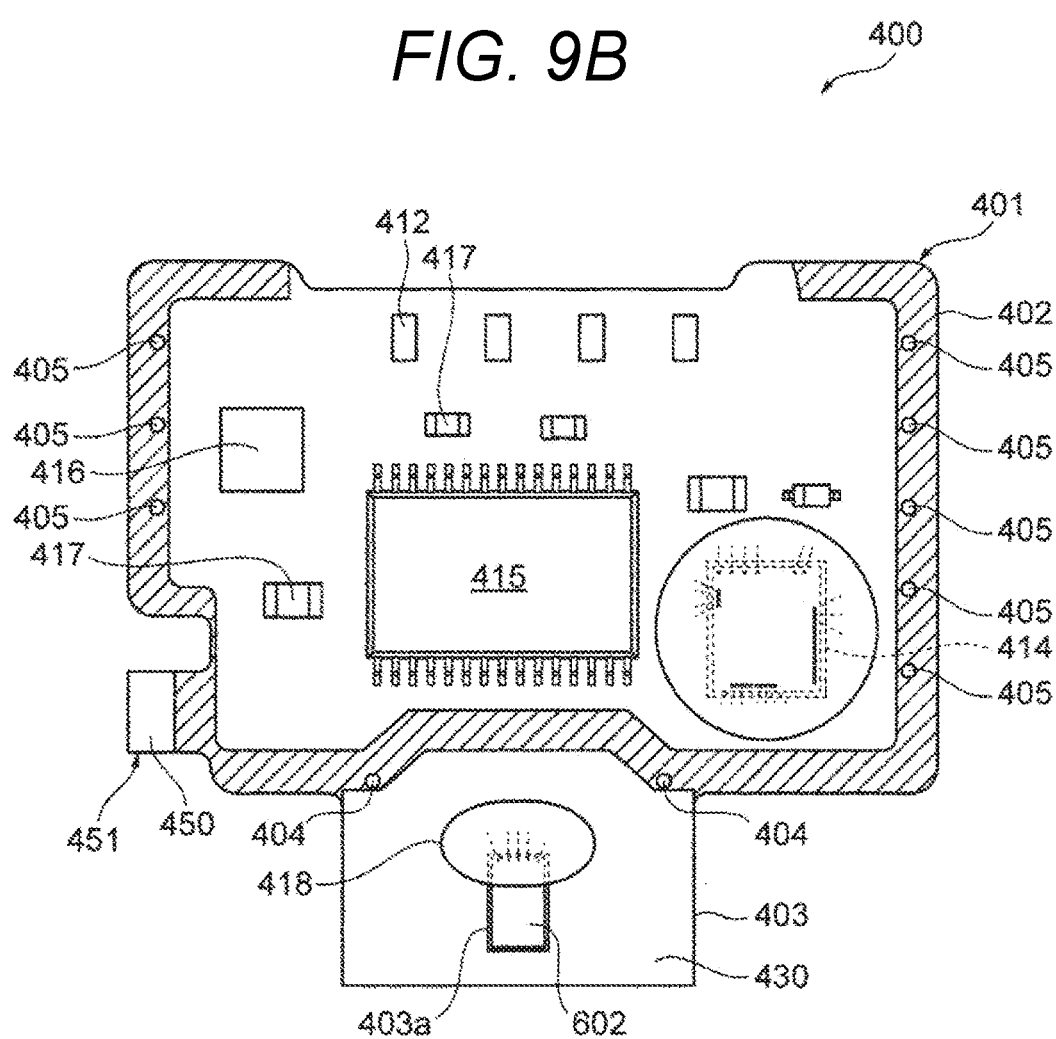
FIG. 9B is a front view illustrating another embodiment of the circuit board.

In an embodiment illustrated in FIG. 9B, not only the through-hole 404 but also round hole-shaped through-holes 405 are provided in each of an upstream end side and a downstream end side of the base portion 402, and these through-holes 405 are filled with mold resin so as to further increase the fixing force of the substrate main body 401. The upstream end side and the downstream end side of the base portion 402 are sandwiched by the fixing portions 372 and 373 from both sides in the thickness direction, and the front side and the back side of the base portion 402 are connected to each other via the through-hole 405. Therefore, the circuit board 400 can be more firmly fixed to the housing 302.

Figure 9C:
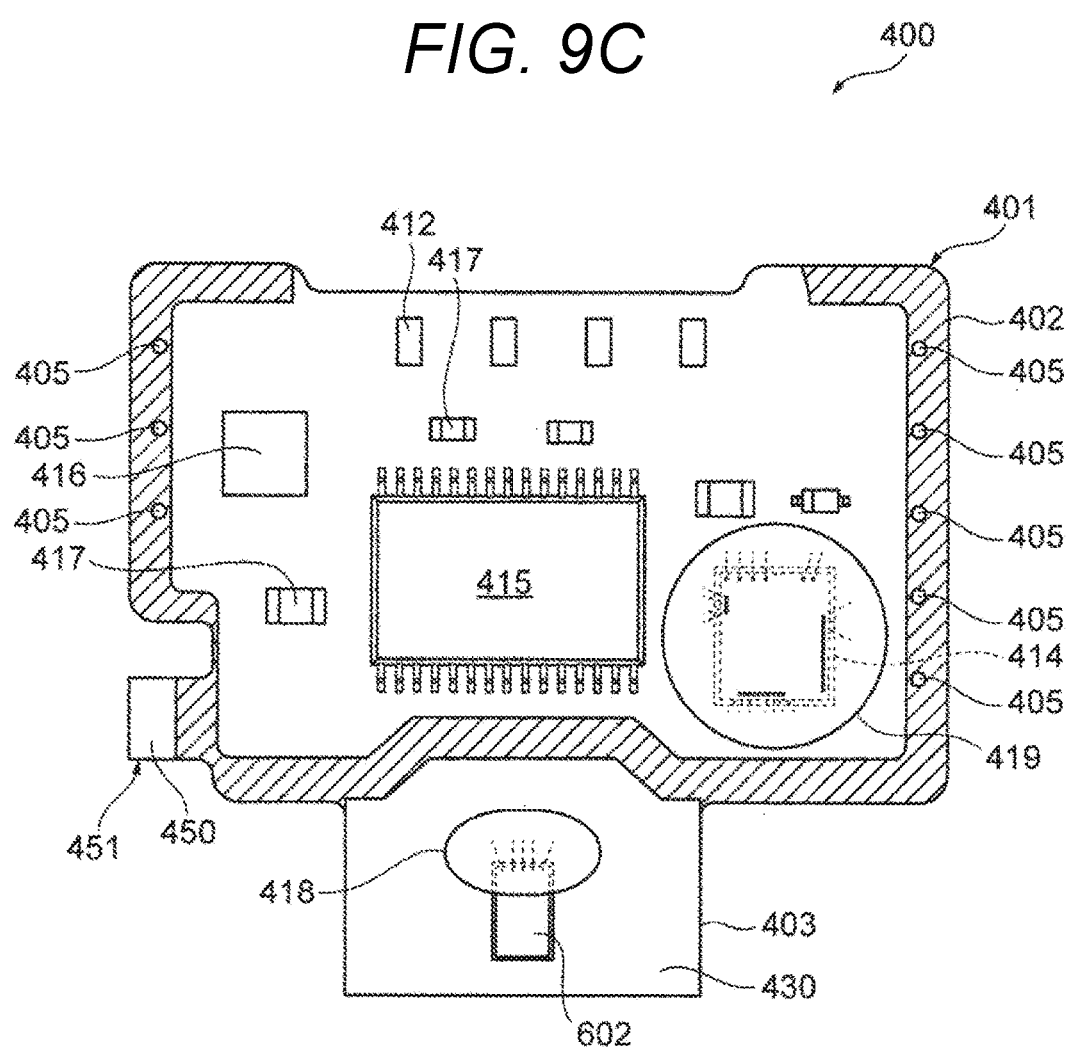
FIG. 9C is a front view illustrating another embodiment of the circuit board.

Incidentally, it is possible to omit the through-hole 404 when the partition wall 335 is fixed to the substrate main body 401 with a predetermined fixing force although it is preferable to provide the through-hole 404 in the partition wall 335. In an embodiment illustrated in FIG. 9C, the through-hole 404 is omitted, and the through-holes 405 are provided on the upstream end side and the downstream end side of the base portion 402. Even with this configuration, the substrate main body 401 of the circuit board 400 can be firmly fixed to the housing 302.

Figure 9D:
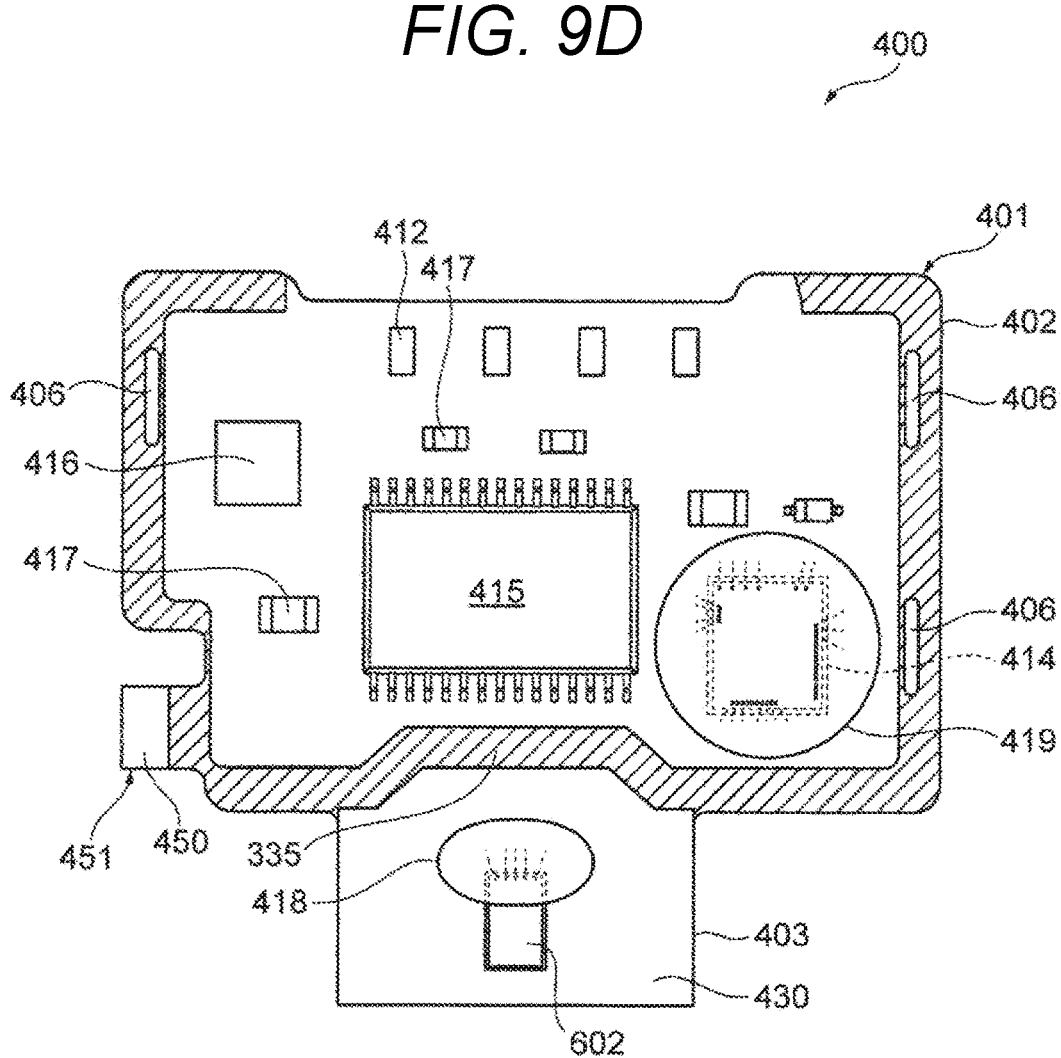
FIG. 9D is a front view illustrating another embodiment of the circuit board.

Incidentally, the through-hole is not limited to the round hole shape, and a long hole-shaped through-hole 406 may be used, for example, as illustrated in FIG. 9D. In this embodiment, the long hole-shaped through-holes 406 are provided so as to extend along the upstream end side and the downstream end side of the base portion 402. As compared to the round hold-shaped through-hole, the amount of resin connecting the front side and the back side of the measurement unit 331 increases in the case of the through-hole 406 so that it is possible to obtain the greater fixing force.

Figure 9E:
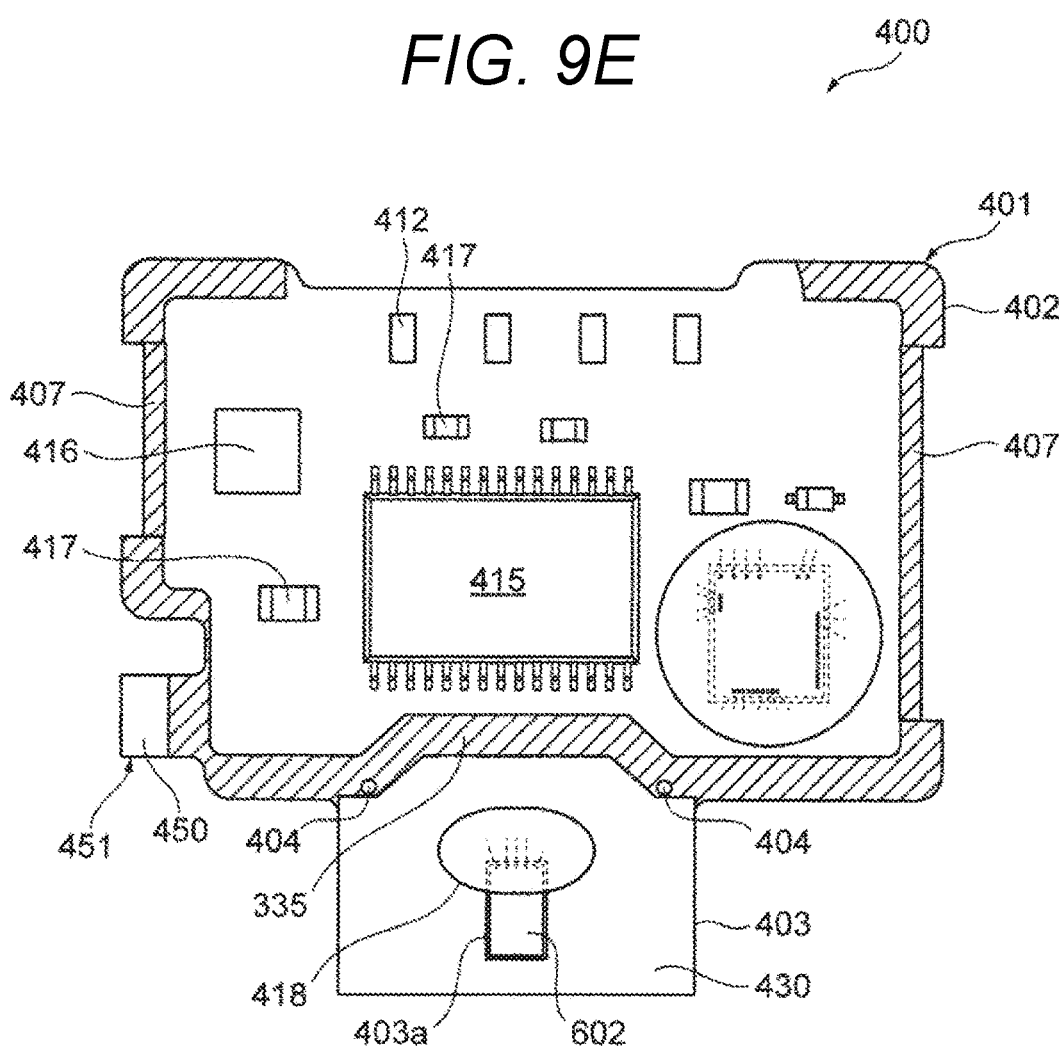
FIG. 9E is a front view illustrating another embodiment of the circuit board.
Figure 9F:
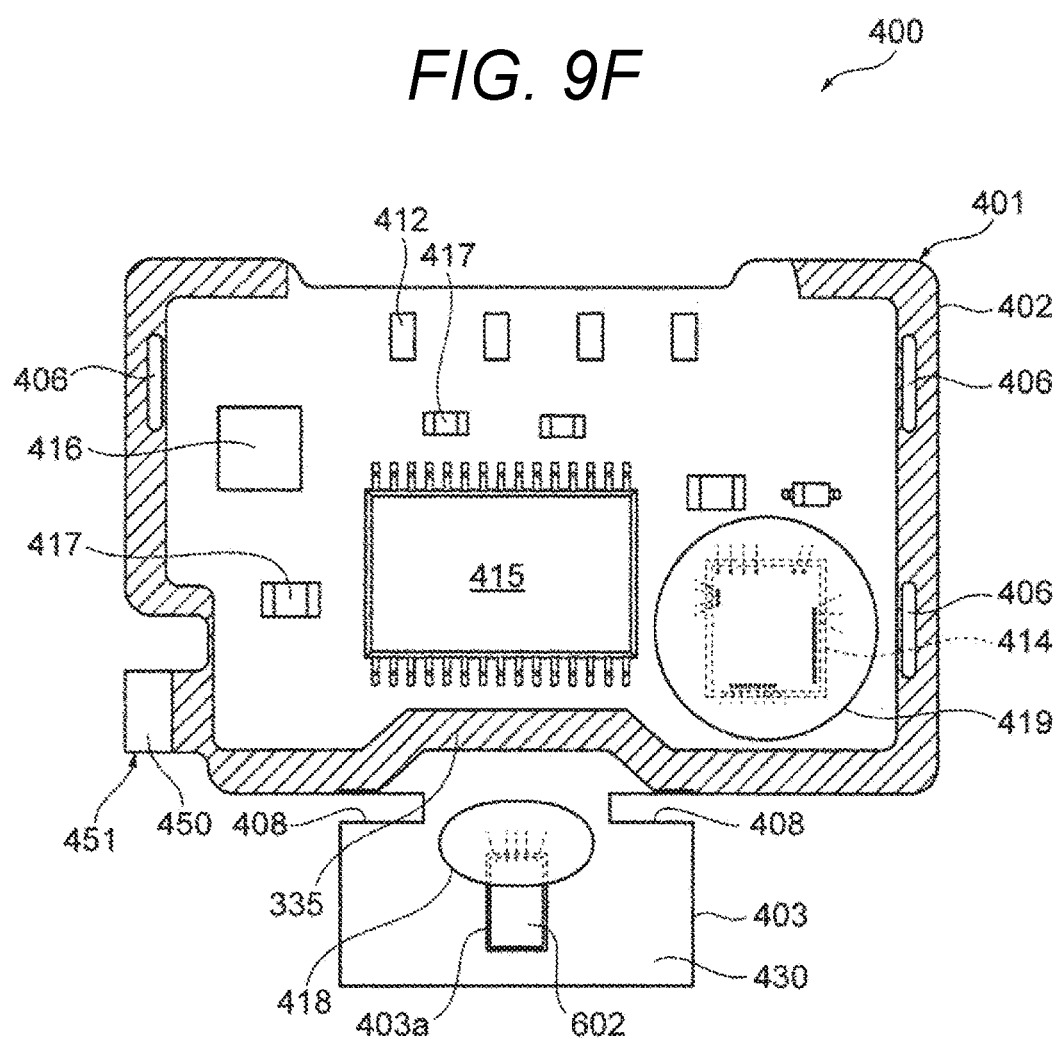
FIG. 9F is a front view illustrating another embodiment of the circuit board.
Figure 9G:
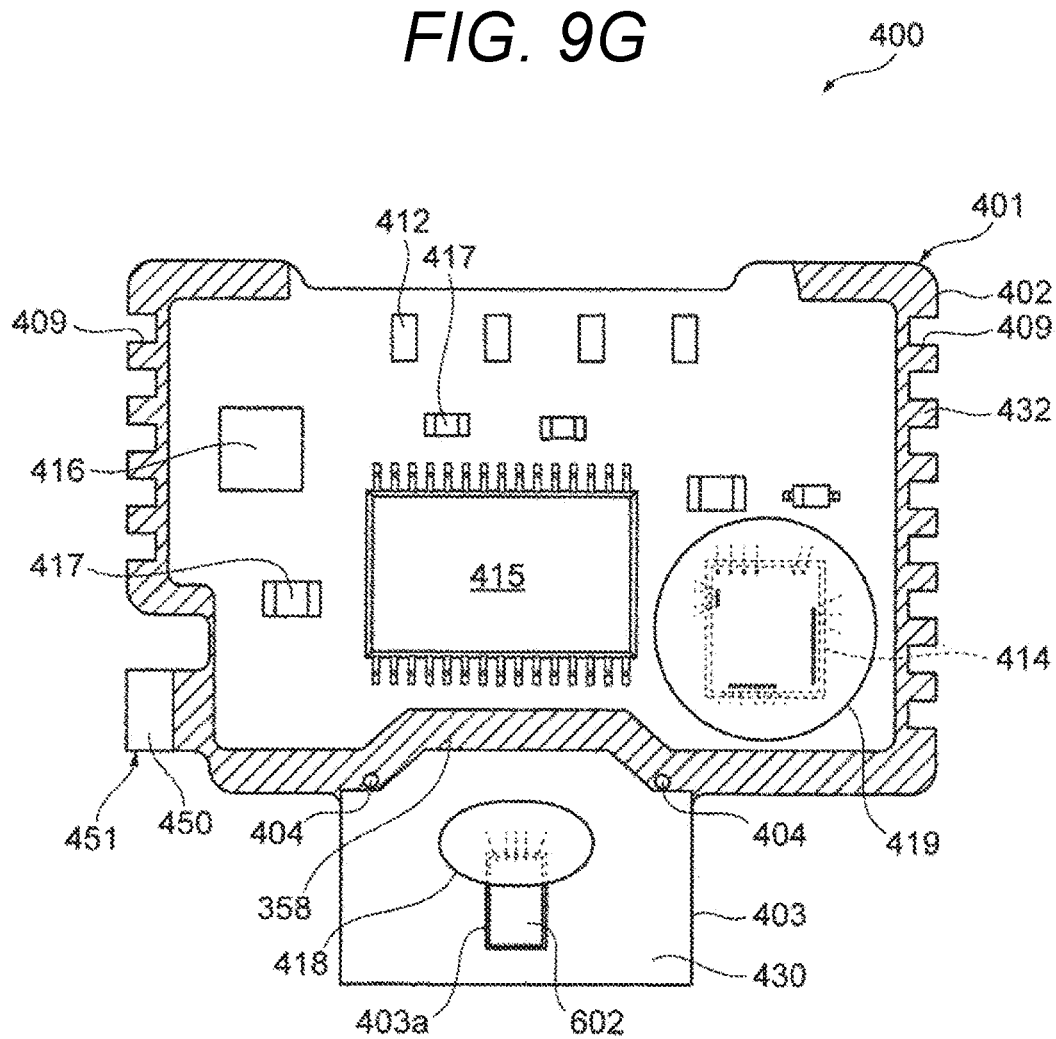
FIG. 9G is a front view illustrating another embodiment of the circuit board.
Figure 9H:
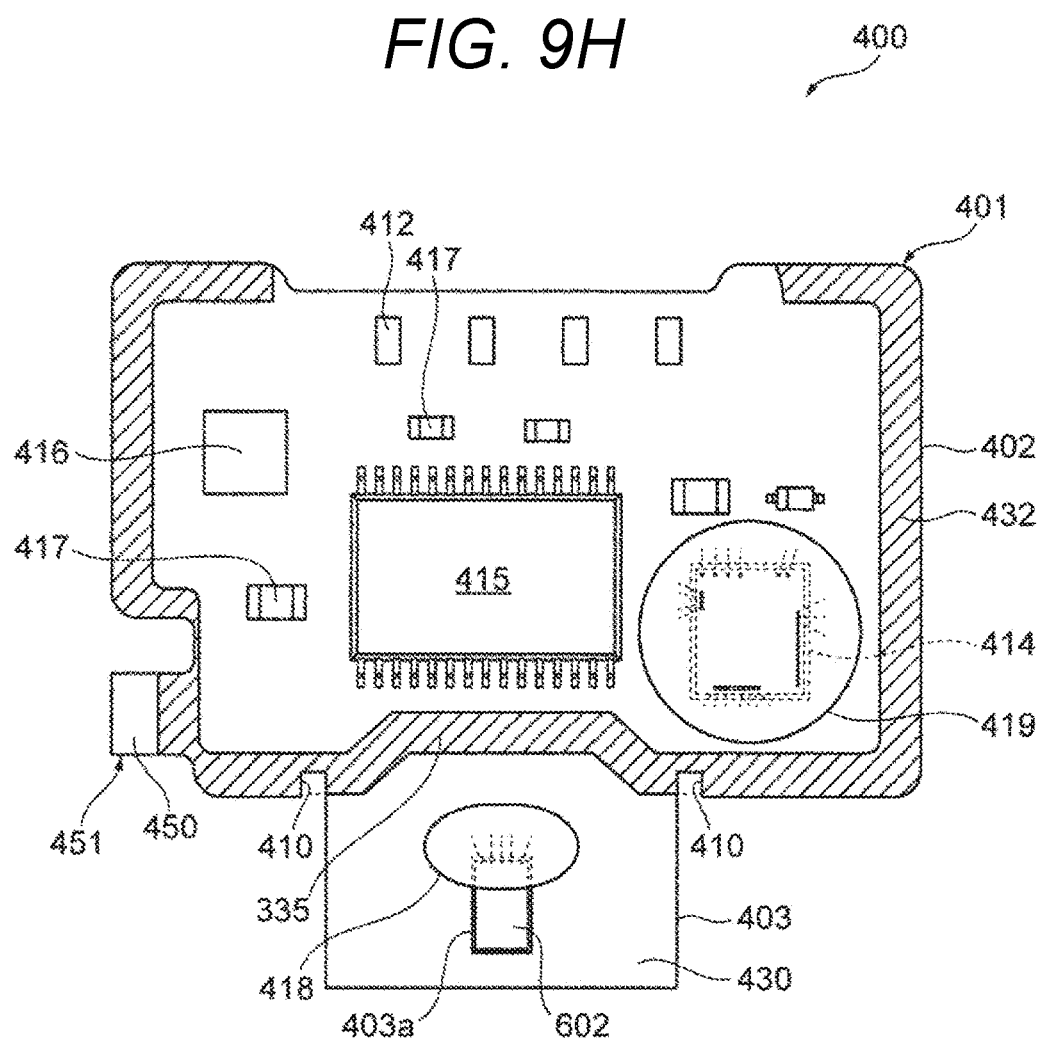
FIG. 9H is a front view illustrating another embodiment of the circuit board.

In addition, each of the through-holes 404, 405, and 406 has been described as an example of the fixing means in the respective embodiments described above, but the fixing means is not limited to the through-hole. For example, a large notched part 407 is provided on each of the upstream end side and the downstream end side of the base portion 402 so as to extend in a length direction thereof in an embodiment illustrated in FIG. 9E. Further, a notched part 408 is provided between the base portion 402 and the protruding portion 403 in an embodiment illustrated in FIG. 9F. In addition, a plurality of notched parts 409 are provided so as to be aligned at a predetermined interval on each of the upstream end side and the downstream end side of the base portion 402 in an embodiment illustrated in FIG. 9G. Further, a pair of notched parts 410 notched from both sides of the protruding portion 403 toward the base portion 402 is provided in an embodiment illustrated in FIG. 9H. Even with these configurations, the substrate main body 401 of the circuit board 400 can be firmly fixed to the housing 302.

5. Circuit Configuration of Physical Quantity Measuring Device 300

5.1 Overall Circuit Configuration of Physical Quantity Measuring Device 300

Figure 11A:
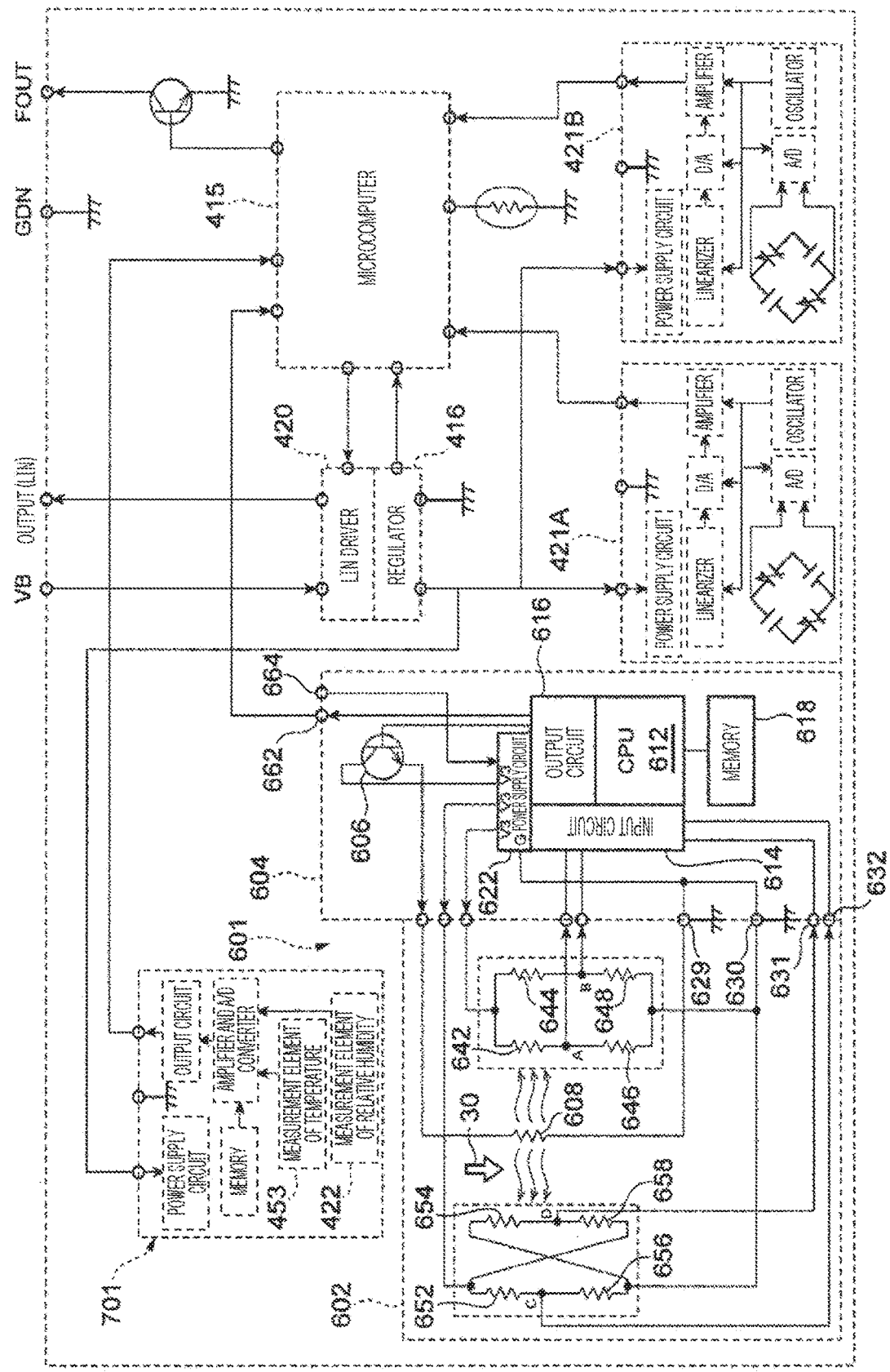
FIG. 11A is a diagram for describing an example of a circuit configuration of the physical quantity measuring device.

FIG. 11A is a circuit diagram of the physical quantity measuring device 300. The physical quantity measuring device 300 includes a flow rate detection circuit 601 and a temperature and humidity detection circuit 701.

The flow rate detection circuit 601 is provided with the measurement element of air flow 602 including a heat-generating body 608 and a processor 604. The processor 604 controls the amount of heat generation of the heat-generating body 608 of the measurement element of air flow 602, and further, outputs a signal indicating a flow rate on the basis of output of the measurement element of air flow 602 to the microcomputer 415 via a terminal 662. In order to perform the above-described process, the processor 604 is provided with a central processing unit (hereinafter, referred to as the CPU) 612, an input circuit 614, an output circuit 616, a memory 618 which holds data indicating a relationship between a corrected value or a measurement value, and a flow rate, and a power supply circuit 622 which supplies a fixed voltage to each circuit that requires the voltage. DC power is supplied to the power supply circuit 622 from an external power supply such as an in-vehicle battery via a terminal 664 and a ground terminal (not illustrated).

The measurement element of air flow 602 is provided with the heat-generating body 608 to heat the measured gas 30. A voltage V1 is supplied to a collector of a transistor 606 forming a current supply circuit of the heat-generating body 608 from the power supply circuit 622, a control signal is applied to a base of the transistor 606 from the CPU 612 via the output circuit 616, and current is supplied to the heat-generating body 608 from the transistor 606 via a terminal 624 on the basis of this control signal. The amount of current to be supplied to the heat-generating body 608 is controlled by the control signal which is applied to the transistor 606 forming the current supply circuit of the heat-generating body 608 from the CPU 612 via the output circuit 616. The processor 604 controls the amount of heat generation of the heat-generating body 608 such that the temperature of the measured gas 30 becomes higher than the initial temperature by predetermined temperature, for example, 100° C. after being heated by the heat-generating body 608.

The measurement element of air flow 602 includes a heat generation control bridge 640 configured to control the amount of heat generated by the heat-generating body 608 and a flow rate detection bridge 650 configured to measure a flow rate. A fixed voltage V3 is supplied to one end of the heat generation control bridge 640 from the power supply circuit 622 via a terminal 626, and the other end of the heat generation control bridge 640 is connected to a ground terminal 630. In addition, a fixed voltage V2 is supplied to one end of the flow rate detection bridge 650 from the power supply circuit 622 via a terminal 625, and the other end of the flow rate detection bridge 650 is connected to the ground terminal 630.

The heat generation control bridge 640 includes a resistance 642 serving as a resistance temperature detector whose resistance value is changed on the basis of the temperature of the heated measured gas 30. The bride circuit is configured of the resistance 642, a resistance 644, a resistance 646, and a resistance 648. A potential difference between an intersection A between the resistance 642 and the resistance 646 and an intersection B between the resistance 644 and the resistance 648 is input to the input circuit 614 via a terminal 627 and a terminal 628, and the CPU 612 controls the current to be supplied from the transistor 606 to control the amount of heat generation of the heat-generating body 608 such that the potential difference between the intersection A and the intersection B becomes a predetermined value (zero volts in this embodiment). The flow rate detection circuit 601 illustrated in FIG. 11A heats the measured gas 30 using the heat-generating body 608 such that the temperature of the measured gas 30 becomes higher than the original temperature thereof by a fixed temperature, for example, 100° C. constantly. Each resistance value of the resistances forming the heat generation control bridge 640 is set such that the potential difference between the intersection A and the intersection B becomes the zero volts when the temperature of the measured gas 30 heated by the heat-generating body 608 becomes higher than the initial temperature by the fixed temperature, for example, 100° C. constantly, in order to perform the heating control with high accuracy. Accordingly, in the flow rate detection circuit 601, the CPU 612 controls the current supplied to the heat-generating body 608 such that the potential difference between the intersection A and the intersection B becomes the zero volts.

The flow rate detection bridge 650 is configured of four resistance temperature detectors including a resistance 652, a resistance 654, a resistance 656, and a resistance 658. These four resistance temperature detectors are arranged along the flow of the measured gas 30 such that the resistance 652 and the resistance 654 are arranged on the upstream side in the flow path of the measured gas 30 as compared to the heat-generating body 608, and the resistance 656 and the resistance 658 are arranged on the downstream side in the flow path of the measured gas 30 as compared to the heat-generating body 608. In addition, the resistance 652 and the resistance 654 are arranged to have substantially the same distance from the heat-generating body 608 in order to raise the measurement accuracy, and the resistance 656 and the resistance 658 are arranged to have substantially the same distance from the heat-generating body 608.

A potential difference between an intersection C between the resistance 652 and the resistance 656 and an intersection D between the resistance 654 and the resistance 658 is input to the input circuit 614 via a terminal 631 and a terminal 632. Each resistance of the flow rate detection bridge 650 is set such that the potential difference between the intersection C and the intersection D becomes zero, for example, in the state of the flow of the measured gas 30 being zero in order to enhance the measurement accuracy. Accordingly, the CPU 612 outputs an electric signal indicating that the flow rate of the air intake system 124 is zero from the terminal 662 on the basis of the measurement result that the flow rate of the measured gas 30 is zero in the zero-volt state, for example of the potential difference between the intersection C and the intersection D.

When the measured gas 30 flows in an arrow direction of FIG. 11A, the resistance 652 and the resistance 654 arranged on the upstream side are cooled by the measured gas 30, and the resistance 656 and the resistance 658 arranged on the downstream side of the measured gas 30 are heated by the measured gas 30 which has been warmed up by the heat-generating body 608 so that each temperature of the resistance 656 and the resistance 658 increases. Thus, the potential difference is generated between the intersection C and the intersection D of the flow rate detection bridge 650, and this potential difference is input to the input circuit 614 via the terminal 631 and the terminal 632. The CPU 612 retrieves data indicating a relationship between the potential difference and the flow rate of the air intake system 124, which has been stored in the memory 618, on the basis of the potential difference between the intersection C and the intersection D of the flow rate detection bridge 650, and obtains the flow rate of the air intake system 124. The electric signal indicating the flow rate of the air intake system 124 obtained in this manner is output via the terminal 662. Incidentally, the terminal 664 and the terminal 662 illustrated in FIG. 11A are denoted by new reference numbers, but is included in the connection terminal 412 illustrated in FIG. 9A which has been described above.

The data indicating a relationship between the potential difference between the intersection C and the intersection D and the flow rate of the air intake system 124 is stored in the memory 618, and further, correction data for reduction of a measurement error such as a variation, obtained on the basis of an actually measured value of the gas after production of the circuit board 400 is stored therein.

The temperature and humidity detection circuit 701 includes an input circuit, such as an amplifier and A/D converter, to which a detection signal is input from the temperature sensor 453 and the measurement element of relative humidity 422, an output circuit, a memory which holds data indicating a relationship between a corrected value or temperature, and specific humidity, the power supply circuit 622 which supplies a fixed voltage to each circuit that requires the voltage, and a heater element 750 (see FIG. 17) that heats the temperature and humidity detection circuit 701. Incidentally, the heater element 750 for heating the temperature and humidity detection circuit may be provided outside the temperature and humidity detection circuit 701 without being limited to the inside of the temperature and humidity detection circuit 701. Each signal output from the flow rate detection circuit 601 and the temperature and humidity detection circuit 701 is input to the microcomputer 415. The microcomputer 415 includes a calculation part of flow rate, a calculation part of temperature, and a calculation part of specific humidity, and calculates a flow rate, temperature, and specific humidity, which are the physical quantities of the measured gas 30, on the basis of the signal, and outputs the calculated value to an ECU 200.

The physical quantity measuring device 300 and the ECU 200 are connected via a communication cable, and communication using a digital signal is performed on the basis of a communication standard such as SENT, LIN, and CAN. In the present embodiment, the signal is input to an LIN driver 420 from the microcomputer 415, and LIN communication is performed through the LIN driver 420. Information output to the ECU 200 from the LIN driver of the physical quantity measuring device 300 is output after being subject to superimposition through digital communication using one or two communication cables.

Figure 12A:
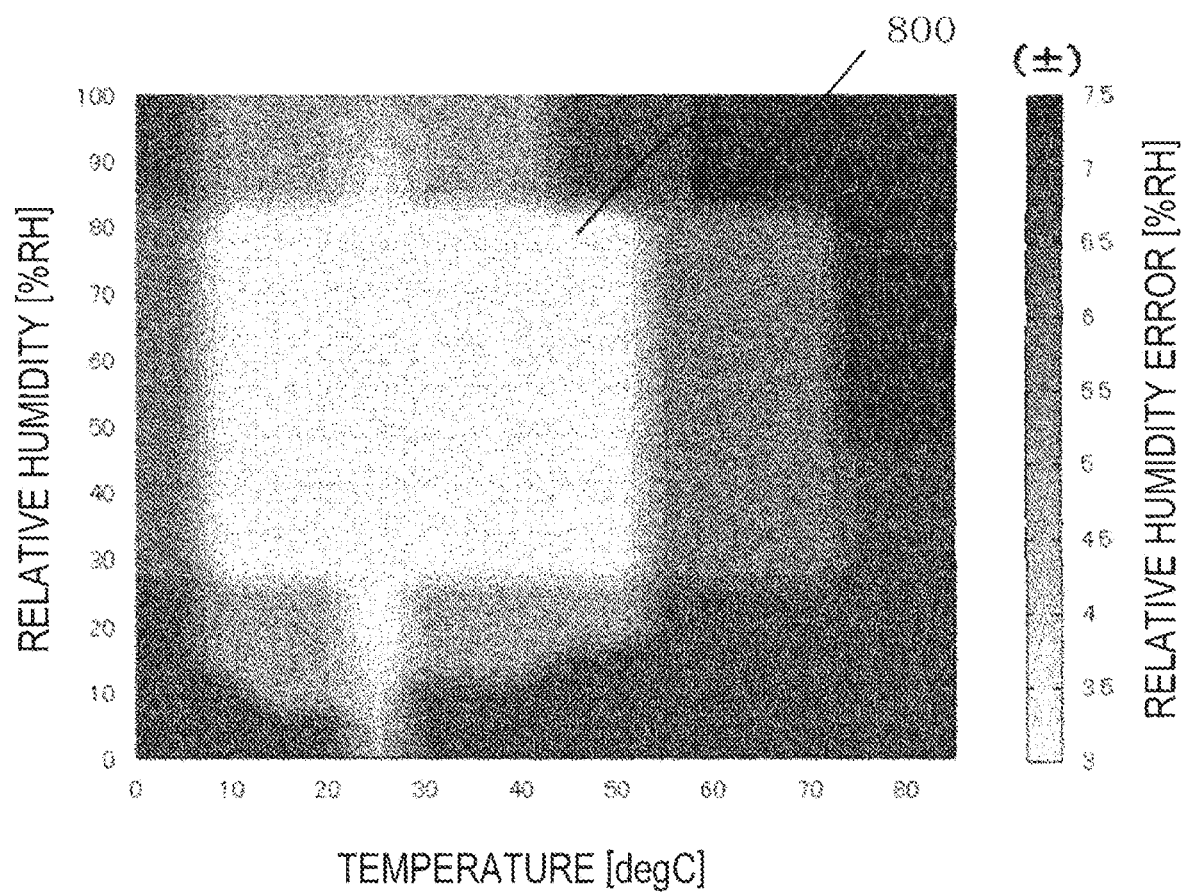
FIG. 12A is a graph for describing an example of a relative humidity detection error of a measurement element of relative humidity.
Figure 12B:
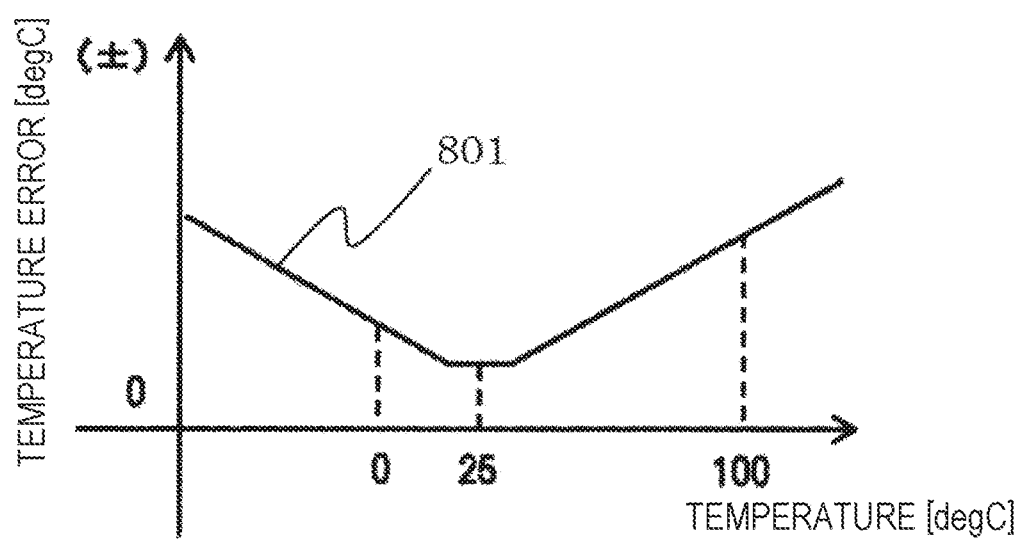
FIG. 12B is a graph for describing an example of a temperature detection error of the measurement element of relative humidity.
Figure 13:
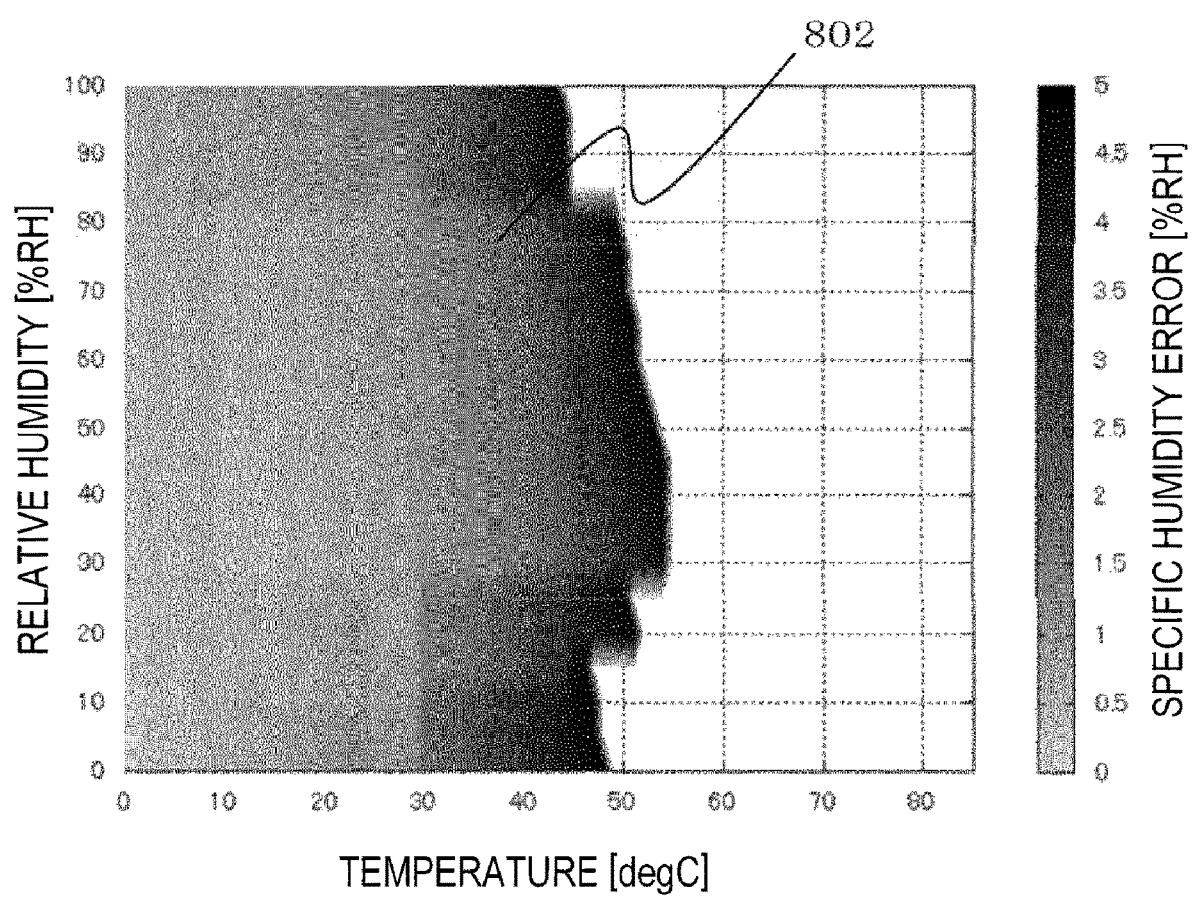
FIG. 13 is a (partial) graph for describing an error of specific humidity obtained from relative humidity including an error and temperature.

A calculation part of specific humidity 807 of the microcomputer 415 calculates specific humidity on the basis of the relative humidity information and the temperature information output from the measurement element of relative humidity 422. Meanwhile, the relative humidity information output from the measurement element of relative humidity 422 is affected by temperature characteristics of a humidity sensing part at this time, and thus, has characteristics of relative humidity error 800 based on temperature and relative humidity of environment to be measured as illustrated in FIG. 12A, and the temperature information output from the temperature sensor 453 has characteristics of temperature error 801 based on temperature of environment to be measured as illustrated in FIG. 12B. Thus, a specific humidity error due to the characteristics of relative humidity error 800 and the characteristics of temperature error 801 have complicated characteristics of specific humidity error 802 on the relative humidity-temperature plane as illustrated in FIG. 13. Incidentally, the errors illustrated in FIGS. 12A, 12B, and 13 are merely examples, and the present invention is not limited thereto.

Figure 14A:
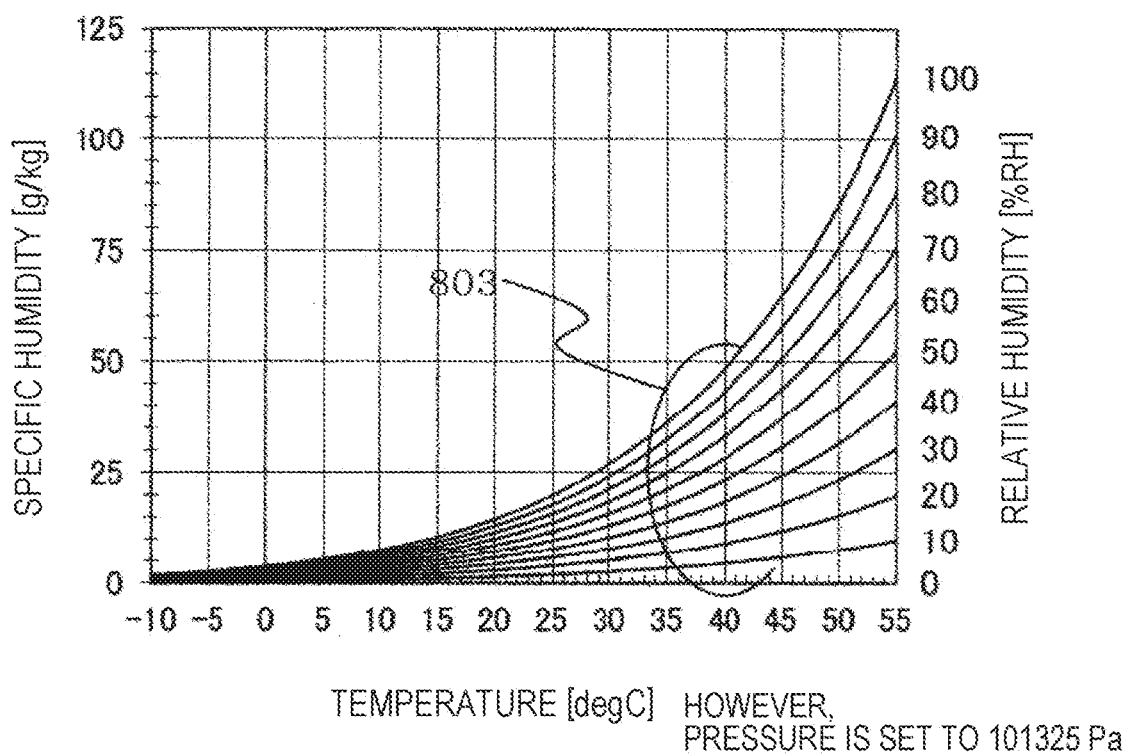
FIG. 14A is a graph for describing characteristics of specific humidity (a contour line of relative humidity).
Figure 14B:
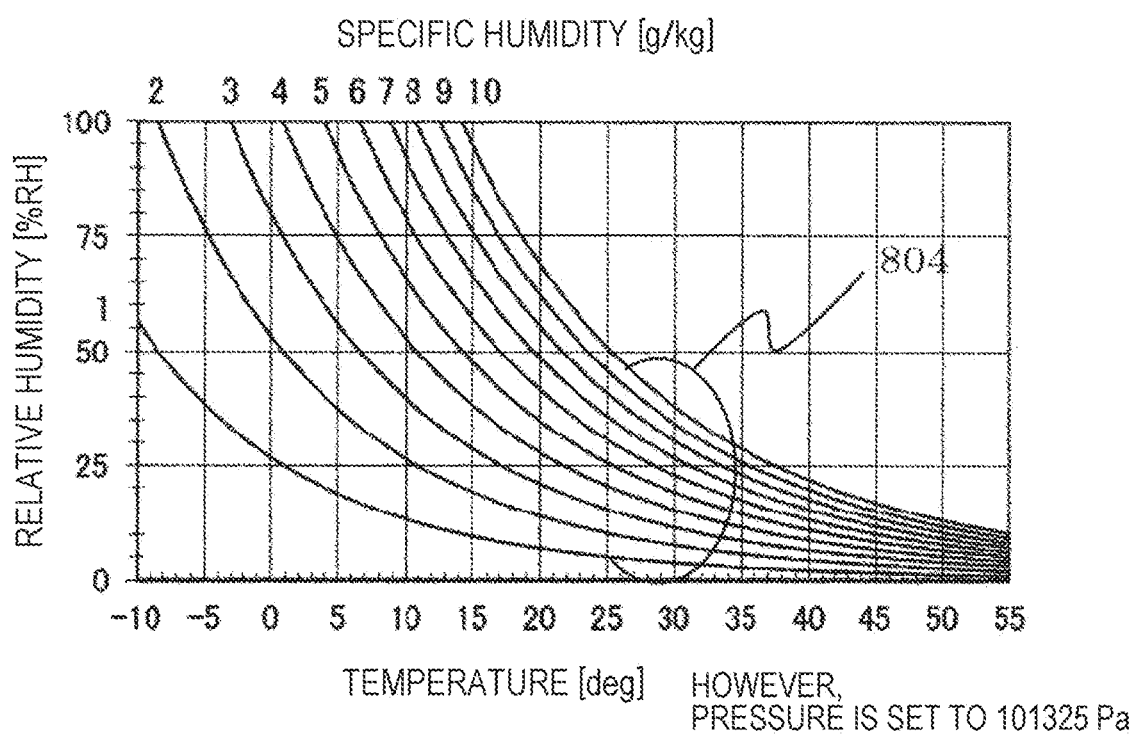
FIG. 14B is a graph for describing characteristics of specific humidity (a contour line of specific humidity).
Figure 15:
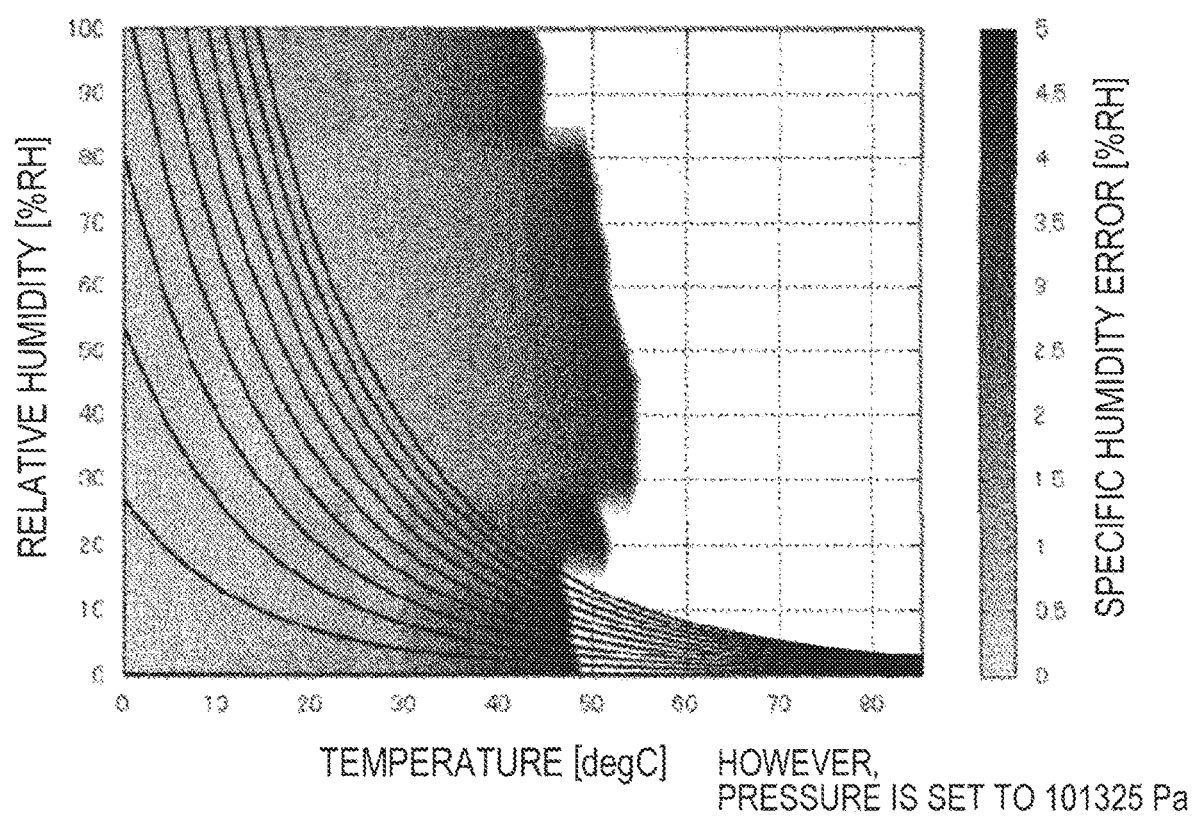
FIG. 15 is a graph for describing error characteristics of specific humidity obtained from relative humidity including an error and temperature.

Here, there is a characteristic between the temperature and relative humidity that a change in relative humidity depends on a change in temperature if specific humidity of the environment to be measured is constant as illustrated in a contour line of relative humidity 803 in FIG. 14A. Heating using the heater element 750 that heats the temperature and humidity detection circuit 701 or heat radiation by stopping the heating is performed utilizing such a characteristic, thereby making a shift on a contour line of specific humidity 804 illustrated in FIG. 14B. In other words, as illustrated in FIG. 15, from the state of the relative humidity error and the temperature error in the environment to be measured before heating or before stopping the heating and releasing heat with respect to the temperature and the relative humidity depending on the temperature, either the relative humidity error or the temperature error, or both the relative humidity error and the temperature error are shifted to a state where the error becomes small, thereby reducing the error of the specific humidity.

The physical quantity measuring device of the present invention includes the measurement element of relative humidity (relative humidity measurement element) 422, the heating element such as the heater element 750 for heating the measurement element of relative humidity 422, the measurement element of relative humidity 422 having a humidity detection function and a temperature detection function, and the microcomputer 415. Further, the amount of heat generation of the heating element is controlled by performing heating using the heating element or stopping the heating, and the environment to be measured is controlled at least to room temperature (for example, 25° C.), which is the temperature at which a detection characteristic of relative humidity by the measurement element of relative humidity 422 and a detection characteristic of temperature become favorable, thereby improving the accuracy in detection of an absolute water content.

Figure 16:
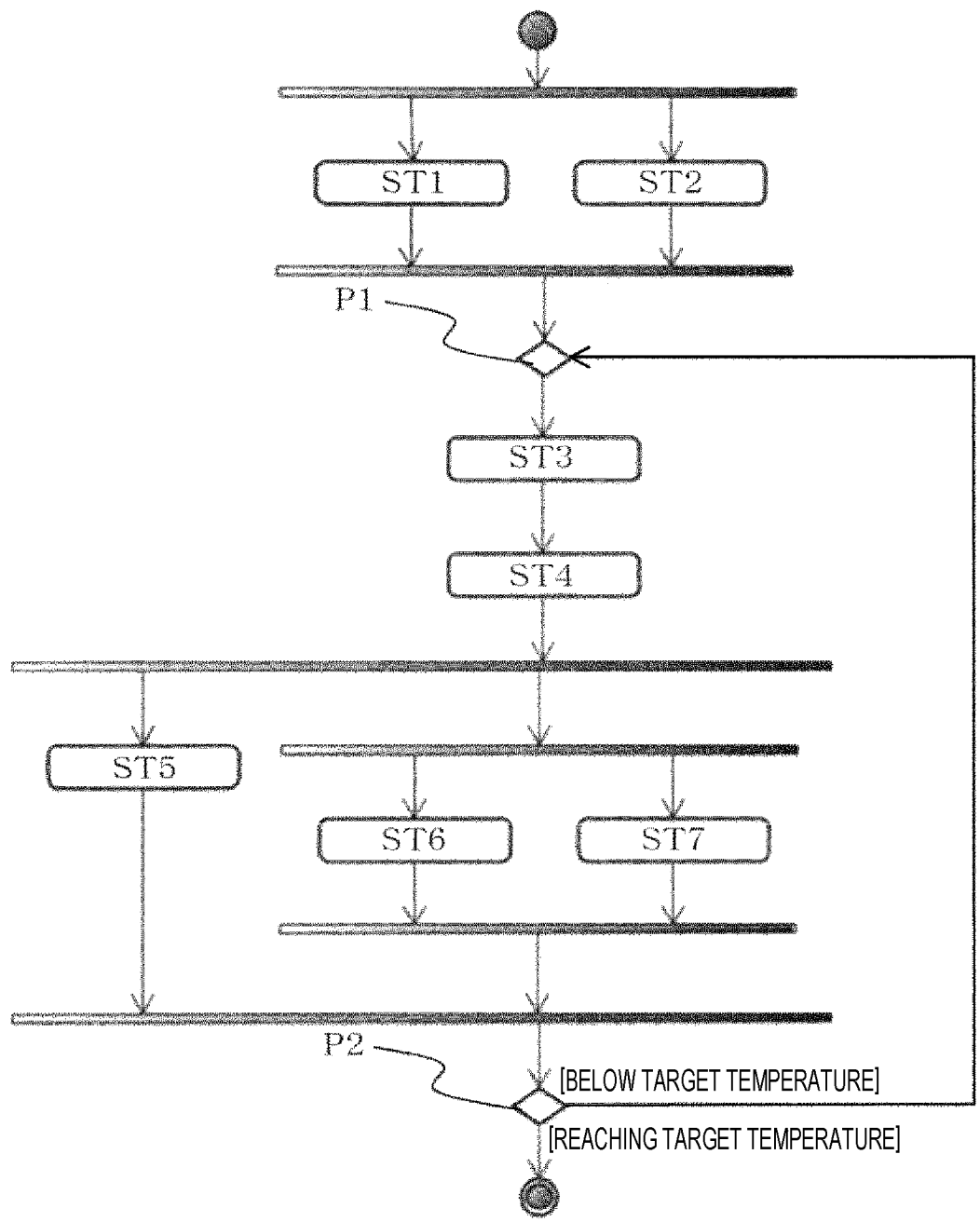
FIG. 16 is a diagram for describing a control sequence.
Figure 17:
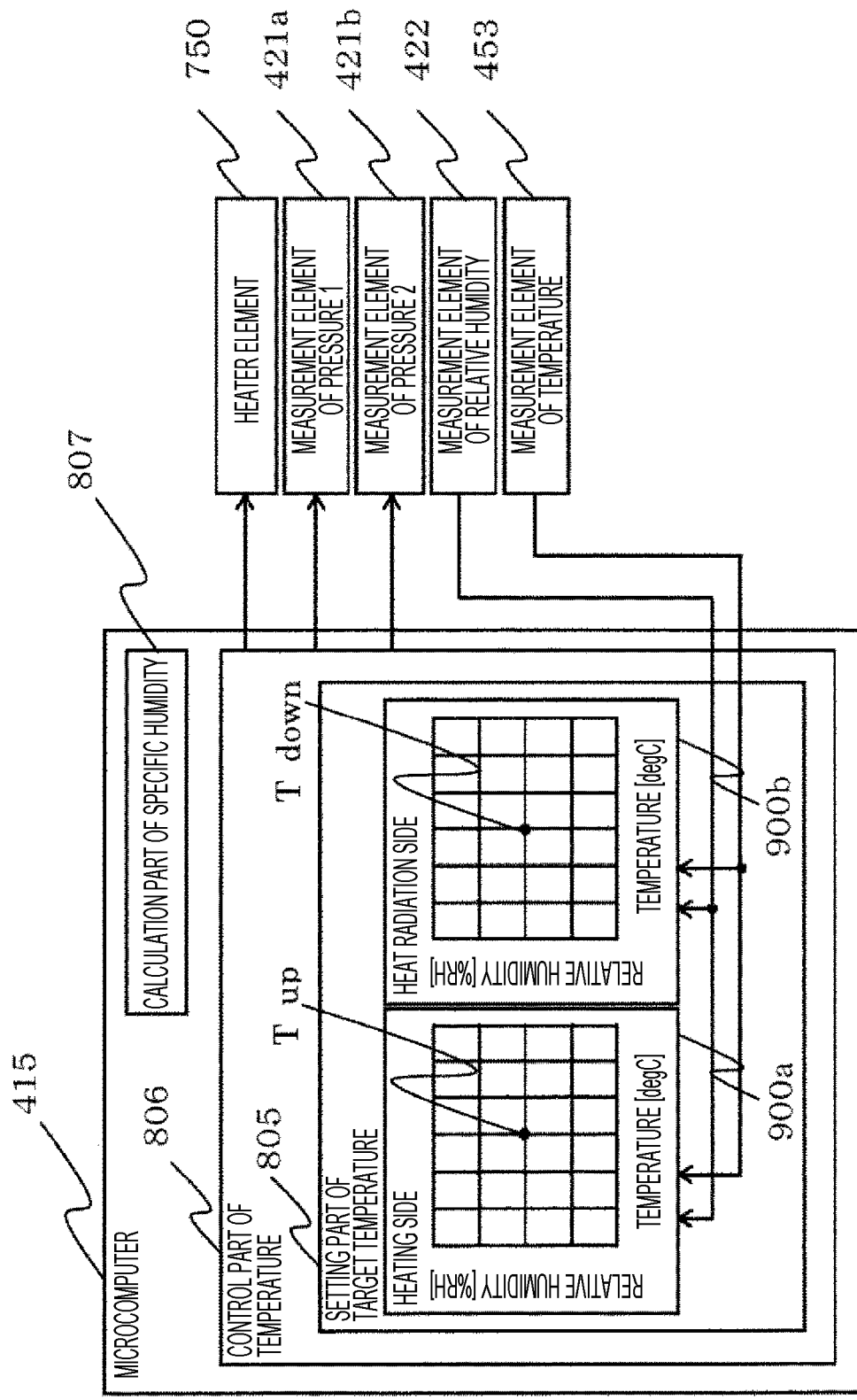
FIG. 17 is a diagram for describing a map used for temperature control.

Control for reducing the specific humidity error will be described with reference to FIGS. 16 and 17. First, a step for temperature measurement ST1 of measuring temperature using the measurement element of relative humidity 422 and a step for relative humidity measurement ST2 of measuring relative humidity using the measurement element of relative humidity 422 are performed in parallel, thereby obtaining the temperature and the relative humidity of the environment to be measured. Next, a step for grasping the amount of heat generation ST3 and a step for calculating the control amount of temperature ST4 are sequentially performed, and parallel processes of a step for temperature control ST5, a step for temperature measurement ST6, and a step for relative humidity measurement ST7 are performed in parallel.

In the step for grasping the amount of heat generation ST3, a heating amount T_heat of the measurement element of relative humidity 422 is calculated using a drive state of the heater element 750, drive states of the elements (physical quantity measurement IC) in the vicinity of the measurement element of relative humidity 422, such as the LSI 414, the microcomputer 415, and the measurement element of pressure (3rd element) 421, a power loss accompanying the driving, distance from the measurement element of relative humidity 422, and a product of thermal resistance. A controllable temperature range is a range obtained by multiplying the power loss accompanying the driving of the elements provided in the vicinity of the measurement element of relative humidity 422, such as the heater element for heating the temperature and humidity detection circuit and the measurement element of pressure (3rd element) 421, by the distance from the measurement element of relative humidity 422 and the thermal resistance.

The step for calculating the control amount of temperature ST4 is executed by a setting part of target temperature 805. A temperature control amount T'_heat at which a specific humidity error after controlling the temperature decreases is calculated on the basis of the temperature obtained in the previous step for temperature measurement and the relative humidity obtained in the previous step for relative humidity measurement with respect to the heating amount T_heat calculated in the step for grasping the amount of heat generation ST3. The temperature control amount is searched from map data 900 stored in the microcomputer 415 as heating temperature or heat radiation temperature. Incidentally, target temperature may be stored as the temperature control amount in the map data 900, and the map data 900 may be stored in another place, such as the LSI 414, other than the microcomputer 415.

Since the controllable temperature range has the two directions of the heating side and the heat radiation side by stopping heating, two sides of map data for heating side 900a and map data for heat radiation side 900b are provided, and a temperature control amount for heating side T_up and a temperature control amount for heat radiation side T_down with respect to temperature and relative humidity in certain environment to be measured are searched when searching the map data 900. Incidentally, output adjustment is performed near room temperature (for example, 25° C.) upon a manufacturing process of the measurement element of relative humidity itself, and thus, the map data 900 has at least a region for storing the temperature control amount for control to the room temperature.

$$T\_up = T\_max - T\_heat \ldots T\_up - T\_heat > T\_max \quad T\_down = -T\_heat \ldots T\_heat - T\_down < 0 \quad \text{[Formula 1]}$$

In Formula 1, T_max is an upper limit temperature [degC.] of the controllable temperature range, and T_heat is the heating amount [degC.] calculated in the step for grasping the amount of heat generation ST3. The heating amount T_heat at a point in time at which the step for calculating the control amount of temperature ST4 is executed is not constant, a limiter is applied to the temperature control amount searched from the map data so as to fall within the controllable temperature range.

$$T'\_heat = T\_up \ldots [T\_up] < [T\_down] \quad T'\_heat = T\_down \ldots [T\_up] \geq [T\_down] \quad \text{[Formula 2]}$$

In Formula 2, T'_heat is the temperature control amount [degC.]. The temperature control amount in the heating direction and the temperature control amount in the heat radiation direction, which fall within the controllable temperature range, are compared with each other, and the smaller temperature control amount is adopted.

The step for temperature control ST5 is executed by a control part of temperature 806. The heating amount T_heat of the measurement element of relative humidity 422 based on the drive states of the elements in the vicinity of the measurement element of relative humidity 422, such as the heater element 750 for heating the temperature and humidity detection circuit and the measurement element of pressure (3rd element) 421, the power loss accompanying the driving, the distance from the measurement element of relative humidity 422, and the product of thermal resistance, is controlled according to the temperature control amount in the heating direction or the heat radiation direction calculated by the step for calculating the control amount of temperature ST4.

The temperature of the environment to be measured under the temperature control is obtained by the step for temperature measurement in the feedback loop ST6, and the relative humidity of the environment to be measured under the temperature control is obtained by the step for relative humidity measurement in the feedback loop ST7.

The temperature obtained in the step for temperature measurement ST1 of measuring the temperature of the environment to be measured, the target temperature according to the temperature control amount in the heating direction or the heat radiation direction calculated by the step for calculating the control amount of temperature ST4, and the temperature obtained in the step for temperature measurement in the feedback loop ST6 are compared at a judgement point whether current temperature reaches target temperature or not P2. If there is a difference, the processing is shifted to a feedback point P1, a temperature control amount is calculated again, and temperature control is performed. If there is no difference, the processing is ended. Incidentally, a threshold may be set at the judgement point whether current temperature reaches target temperature or not P2 so that the processing is shifted to the feedback point P1 if the difference is out of the threshold and is ended if the difference is within the threshold.

The corrected specific humidity calculated by the calculation part of specific humidity is used for various kinds of engine operation control in a control unit 62 of an ECU 18. In addition, the ECU 18 can also directly use information on the total error for various kinds of engine operation control.

Figure 11B:
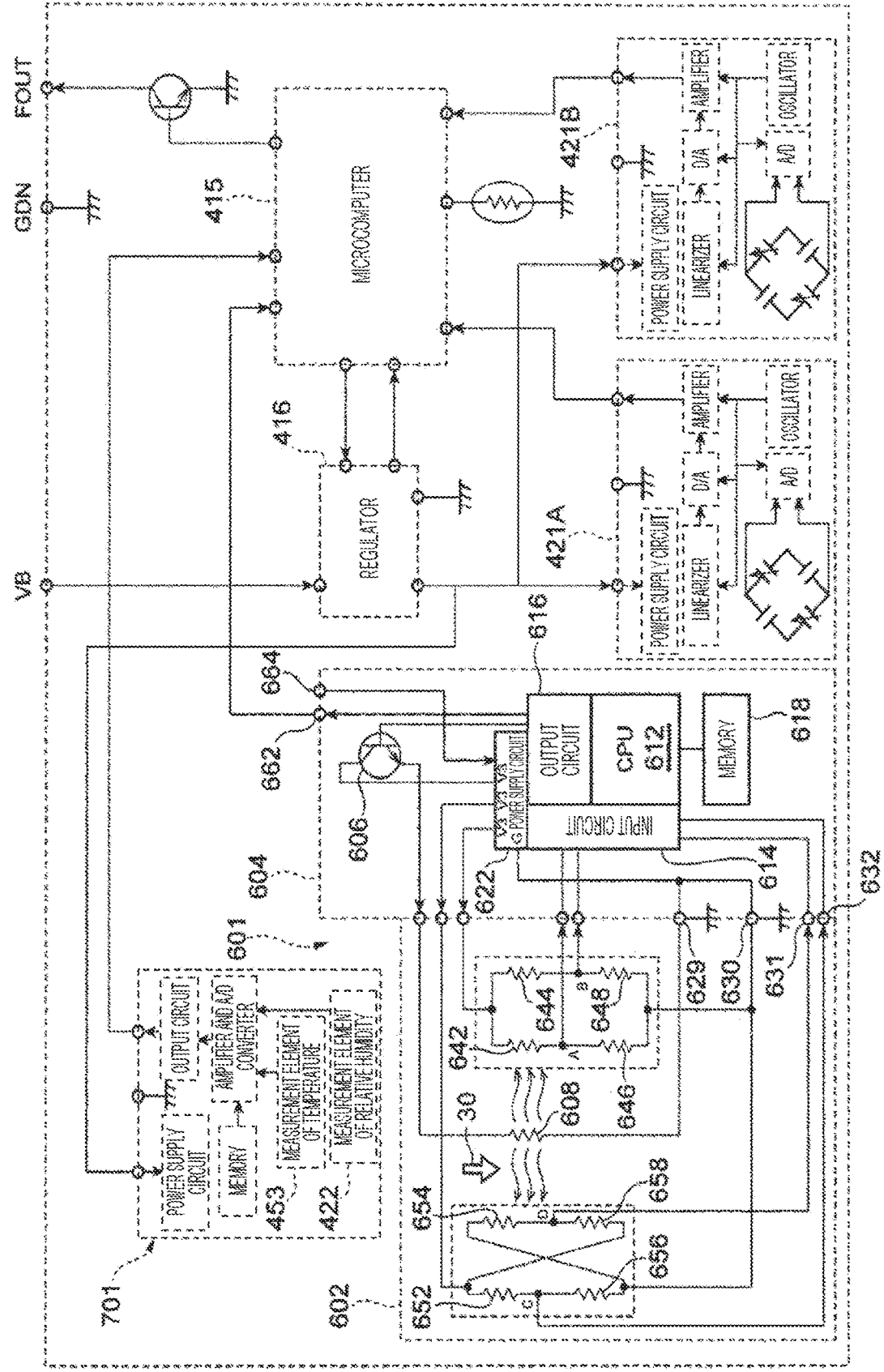
FIG. 11B is a diagram for describing another embodiment of the circuit configuration of the physical quantity measuring device.

Incidentally, the description has been given in the above-described embodiment illustrated in FIGS. 11A and 11B regarding the case where the physical quantity measuring device 300 includes the LIN driver 420 to perform the LIN communication, but the invention is not limited thereto. As illustrated in FIG. 11B, the communication with the microcomputer 415 may be directly performed without using the LIN communication.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion or substitution of other configurations can be made with respect to some configurations of each embodiment.

REFERENCE SIGNS LIST

30 measured gas
124 air intake system
300 physical quantity measuring device
302 housing
400 circuit board
404, 405, 406 through-hole
407, 408 notched part
415 microcomputer
421A, 421B measurement element of pressure (3rd element)
422 measurement element of relative humidity (2nd element)
602 measurement element of air flow (1st element)
800 characteristics of relative humidity error
801 characteristics of temperature error
802 characteristics of specific humidity error
803 contour line of relative humidity
804 contour line of specific humidity
805 setting part of target temperature
806 control part of temperature
807 calculation part of specific humidity
750 heater element
900 map data
900a map data for heating side
900b map data for heat radiation side
T_up temperature control amount for heating side
T_down temperature control amount for heat radiation side
ST1 step for temperature measurement
ST2 step for relative humidity measurement
ST3 step for grasping amount of heat generation
ST4 step for calculating control amount of temperature
ST5 step for temperature control
ST6 step for temperature measurement in feedback loop
ST7 step for relative humidity measurement in feedback loop
P1 feedback point
P2 judgement point whether current temperature reaches target temperature or not

The invention claimed is:

1. A measuring device comprising:
a relative humidity measurement element;
a heating element for heating the relative humidity measurement element;
a temperature measurement element; and
a microcomputer, wherein
specific humidity is measured by controlling an amount of heat generation of the heating element by performing heating using the heating element or stopping the heating so as to radiate heat, and by controlling environment to be measured to a temperature set on the basis of a detection characteristic of the relative humidity measurement element and a detection characteristic of the temperature measurement element,
a heating temperature, a heat radiation temperature, or a target temperature in temperature control of the heating element is held as map data, the map data having a relative humidity and a temperature on its axes; and
wherein the map data of the target temperature has two sides of a heating side and a heat radiation side by stopping heating.

2. The measuring device according to claim 1, wherein which of the map data of the target temperature having two sides of a heating side and a heat radiation side is selected depends on a control state of the heating element.

3. The measuring device according to claim 2, wherein in selecting the map data of the target temperature, a temperature control amount in a heating direction and a temperature control amount in a heat radiation direction, which fall within a controllable temperature range, are compared with each other, and a smaller temperature control amount is adopted.

4. The measuring device according to claim 1, wherein
a heating amount of the relative humidity measurement element received from the heating element and a measurement IC arranged in the vicinity of the relative humidity measurement element is calculated on the basis of a drive state of the heating element and a drive state of the measurement IC, and
a temperature control amount is calculated with respect to the calculated heating amount, the temperature control amount being adapted to reduce a specific humidity error after the temperature is controlled on the basis of the temperature obtained in a previous step for temperature measurement and the relative humidity obtained in a previous step for relative humidity measurement, so that the heating amount is controlled on the basis of the temperature control amount.

* * * * *